US011539751B2

(12) United States Patent
Zou et al.

(10) Patent No.: US 11,539,751 B2
(45) Date of Patent: Dec. 27, 2022

(54) DATA MANAGEMENT PLATFORM

(71) Applicant: Helios Data Inc., Mountain View, CA (US)

(72) Inventors: Fei Zou, Menlo Park, CA (US); Huiyu Zhang, Menlo Park, CA (US); Yi Sun, San Jose, CA (US)

(73) Assignee: Helios Data Inc., Mountain View, CA (US)

( * ) Notice: Subject to any disclaimer, the term of this patent is extended or adjusted under 35 U.S.C. 154(b) by 348 days.

(21) Appl. No.: 16/747,507

(22) Filed: Jan. 20, 2020

(65) Prior Publication Data
US 2020/0236143 A1 Jul. 23, 2020

Related U.S. Application Data

(60) Provisional application No. 62/794,981, filed on Jan. 21, 2019.

(51) Int. Cl.
H04L 29/06 (2006.01)
H04L 9/40 (2022.01)
G06N 20/00 (2019.01)
G06F 16/23 (2019.01)
G06N 5/04 (2006.01)

(52) U.S. Cl.
CPC .......... *H04L 63/20* (2013.01); *G06F 16/2365* (2019.01); *G06N 5/04* (2013.01); *G06N 20/00* (2019.01); *H04L 63/0428* (2013.01)

(58) Field of Classification Search
CPC combination set(s) only.
See application file for complete search history.

(56) References Cited

U.S. PATENT DOCUMENTS

| 5,103,476 A | 4/1992 | Waite et al. |
| 6,199,197 B1* | 3/2001 | Engstrom ............. G06F 16/289 717/100 |
| 10,594,484 B2* | 3/2020 | Rodriguez ............ H04L 9/0861 |
| 2006/0294238 A1* | 12/2006 | Naik ................... H04L 43/0817 709/226 |
| 2010/0246827 A1* | 9/2010 | Lauter .................. H04L 9/0836 380/278 |

(Continued)

FOREIGN PATENT DOCUMENTS

| WO | 98/58306 | 12/1998 |
| WO | 2013/002821 | 1/2013 |

OTHER PUBLICATIONS

International Search Report and Written Opinion in Appl. No. PCT/US2020/14260 dated Apr. 3, 2020, 8 pages.

*Primary Examiner* — Mahfuzur Rahman
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to the management of data. A data provider computer system may store particular data of a user. The data provider computer system may commence sharing of a portion of the particular data with a data consumer computer system. The data provider computer system may continue sharing additional portions of the particular data with the data consumer computer system in response to receiving a report from a verification environment indicating that the particular data is being utilized by the data consumer computer system in accordance with a specified usage policy.

21 Claims, 24 Drawing Sheets

(56) References Cited

U.S. PATENT DOCUMENTS

| | | | |
|---|---|---|---|
| 2011/0294520 A1* | 12/2011 | Zhou | H04W 8/02 |
| | | | 455/456.1 |
| 2012/0069131 A1* | 3/2012 | Abelow | G06Q 30/02 |
| | | | 345/589 |
| 2016/0209220 A1* | 7/2016 | Laetz | G06Q 10/047 |
| 2017/0235848 A1* | 8/2017 | Van Dusen | G06N 20/00 |
| | | | 705/12 |
| 2018/0176017 A1* | 6/2018 | Rodriguez | H04L 63/20 |
| 2018/0240040 A1* | 8/2018 | Morimura | G06Q 30/02 |
| 2020/0233968 A1* | 7/2020 | Sun | G06F 21/602 |
| 2021/0045640 A1* | 2/2021 | Poltorak | A61B 5/6847 |

\* cited by examiner

DATA MANAGEMENT PLATFORM

RELATED APPLICATIONS

The present application claims priority to U.S. Provisional Appl. No. 62/794,981 filed Jan. 21, 2019; this application is incorporated by reference herein in its entirety.

BACKGROUND

Technical Field

This disclosure relates generally to a data management platform.

Description of the Related Art

Many companies collect and store data about their users. Such data may include, without limitation, any manner of information, such as user profile information, financial information, medical information, and user activity information (e.g., location data). The creation of such data is growing at an unprecedented rate. Companies often use data to help improve their own systems (e.g., by analyzing the data), or they provide that data to other companies that use the data for some particular purpose. For example, a telecommunication company may analyze geolocation data in order to improve quality of service. Accordingly, data is often considered a valuable resource and thus it is desirable to collect and store. Furthermore, data collected by one entity (e.g., geolocation data collected by a telecommunications company) may often be valuable to another entity (e.g., a retail company that wishes to use the geolocation data to market goods to the user). For this reason, there has been motivation for one company, a "data provider," to share data of a user or "data subject" with another company, a "data consumer"—an exchange which may be termed a "data economy."

The collection and management of such data is often problematic for companies, however. Companies are often not aware of all the different types of user data that they have on their systems and even where that data is stored. Thus, it may be extremely difficult for many companies to identify and locate all data of individual customers/users stored across myriad computers and networks within an entity. Accordingly, in many cases, companies cannot benefit from their data if they are not completely aware of it. Still further, even assuming such data can be properly located, ensuring proper internal and external usage of the data—that is, usage that corresponds to company policies for that data—can also be very difficult. As a result, data is often a hindrance to companies, particularly when it is necessary or desirable to share data with another company. The result is that data breaches or misuses are growing increasingly common, and reflect poorly upon the companies that act as the data custodian.

These problems have further been exacerbated with the introduction of various data privacy provisions, including the General Data Protection Regulation (GDPR) promulgated by the European Union. GDPR introduces strict requirements regarding explicit user consent in relation to data usage and ensuring that users or data subjects can request copies of their personal data. Moreover, under the GDPR and other regimes, the question of who owns data has become ambiguous; as such, sharing a user's data without authorization from the user may lead to legal troubles (e.g., large fines) for a company. Accordingly, in this increased regulatory environment, data management has become a cost, a liability, and a headache for many companies that store data about their users, particularly for those companies that lack the mechanisms to protect that data and ensure compliance with various data management regulations and internal policies.

But even apart from the reality that many companies cannot adequately locate and control data about their customers or comply with burgeoning privacy regulations, there is also the fundamental problem that companies are unfairly using the data of their customers to profit by sharing this data with other entities without any form of compensation being provided to the individuals whose data is being used. This allows companies, particularly those that have large amounts of private user data, to reap huge profits by trading on data. Meanwhile, the users are not compensated for such usage, and end up bearing the costs of such usage if a breach or misuse of their data occurs. Each of these issues presents a flaw in today's data economy.

Figure 1:
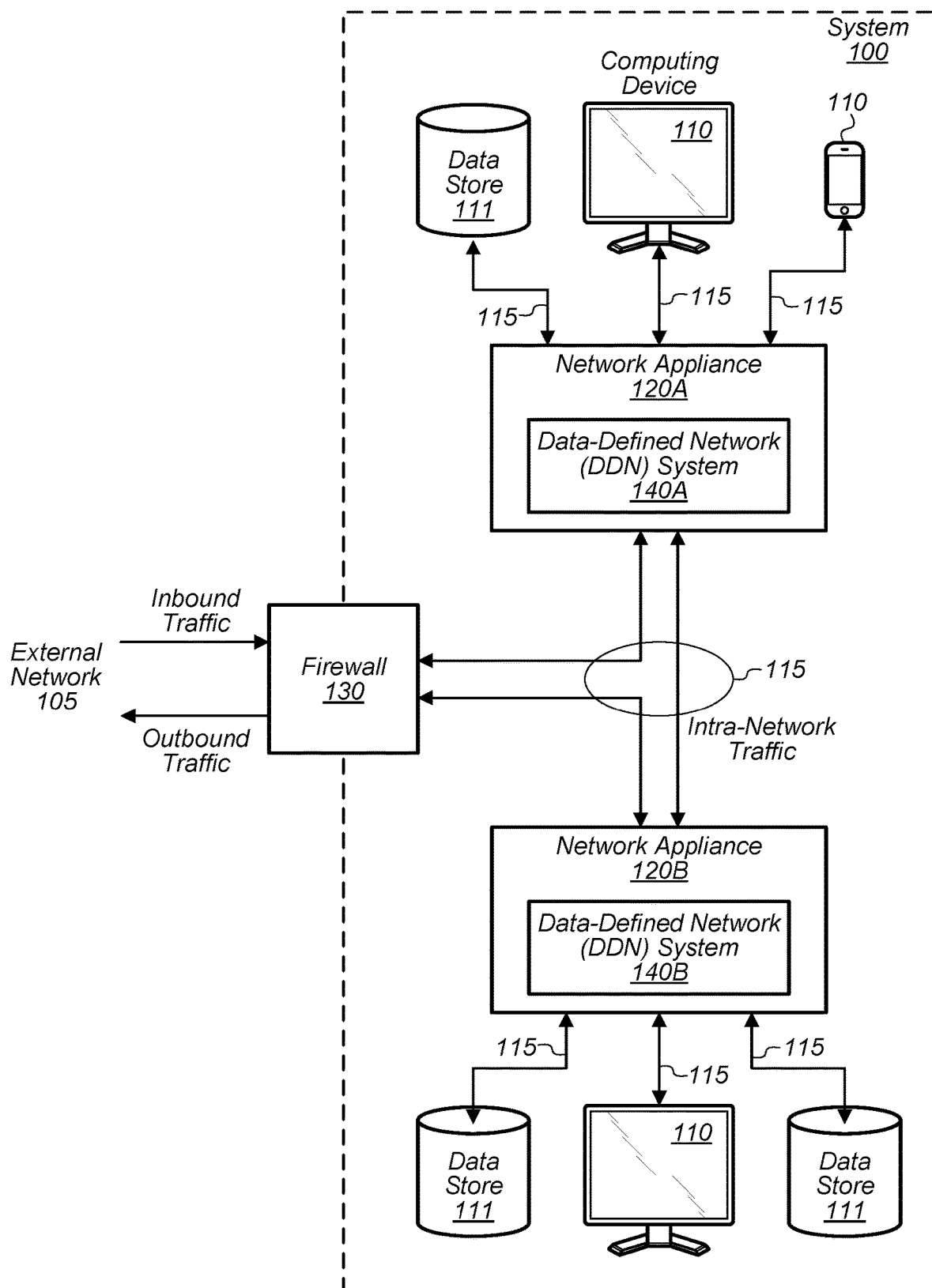
FIG. 1 is a block diagram illustrating example elements of a system that includes a data-defined network (DDN) system, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. As an example, for data that has multiple portions, the terms "first" portion and "second" portion can be used to refer to any portion of that data. In other words, the first and second portions are not limited to the initial two portions of the data.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

The present disclosure describes various techniques for enabling a data provider system to obtain authorization from a user to share particular data and to securely share that particular data with a data consumer system. In various embodiments described below, the data provider system is evaluated to determine what user data is stored at that system. Thereafter, a user may be presented with a description of their personal data, and a set of proposals that relate to proposed usages of that data by the data provider and/or one or more third parties. If the user provides assent to one or more of these proposals, the data provider system may initiate sharing of the specified portions of their data in a secure manner that is in accordance with the agreed-to proposals. These techniques may thus allow data ownership and custodianship of user data to be clarified, while permitting internal and external use of the data while complying with data usage policies of the data provider or a regulatory body or government.

This disclosure initially describes, with reference to FIGS. 1-12, various techniques for discovering what data is stored at a data provider system and segmenting that data into different data segmentations that may be used to protect the data within those data segmentations. This disclosure then describes, with reference to FIGS. 13-17, various techniques for implementing a data sharing architecture in which data may be shared with a data consumer system by a data provider system. The data sharing may include two distinct phases: a setup phase and a sharing phase. Finally, this disclosure describes, with reference to FIGS. 18-22, various techniques that utilize techniques discussed with reference FIGS. 1-17 to enable a data provider system to obtain authorization from a user to share particular data and to securely share that particular data with a data consumer system.

Turning now to FIG. 1, a block diagram of a system 100 that incorporates multiple data-defined network systems 140 is depicted. In the illustrated embodiment, system 100 includes computing devices 110, data stores 111, network appliances 120, and a firewall 130. As further depicted, each network appliance 120 includes a DDN system 140. While system 100 is shown as a single network of computing systems enclosed by a firewall, in some embodiments, system 100 expands across multiple networks that each have computing systems that are enclosed by their own respective firewalls. In some embodiments, system 100 is implemented differently than shown—e.g., system 100 may include DDN systems 140, but not firewall 130.

Managing data from the vantage point of the network perimeter is increasingly challenging, particularly with the current and expected further proliferation in governmental data usage regulations worldwide. To address such problems, the present disclosure sets forth a "data-defined" approach to data management. In this approach, data management problems can largely be seen as anomalous behavior of data, which can be addressed by classifying data in a network, defining "normal behavior" (or "anomalous behavior," which refers to any improper use of data relative to some standard or data policy, whether or not that use is malicious), and then instituting an enforcement mechanism that ensures that anomalous data usage is controlled.

The current content and nature of data within a given computer network is typically poorly understood. Conventional infrastructure-driven approaches to network organization and data management are not concerned with what different types of data are present within a network and how that data normally behaves (whether that data is in use, at rest, or in transit), which puts such data management paradigms at a severe disadvantage when dealing with novel threats.

Data management broadly refers to the concept of ensuring that data is used in accordance with a policy objective. (Such "use" of the data includes the manner in which the data is stored, accessed, or moved.) The concept of data management thus includes data security (e.g., protecting data from malware attacks), data compliance (e.g., ensuring control of personal data is managed in accordance with a policy that may be established by a governmental organization), as well as permissioning that enforces entity-specific policies (e.g., certain groups in a company can access certain projects). The present disclosure describes a "data-defined" approach to data management, resulting in what is described as a "data-defined network" (DDN)—that is, a network (or portion of a network) that implements this data-defined approach.

Broadly speaking, a DDN stores one or more data structures in which data in a network is organized and managed on the basis of observed attributes of the data, rather than infrastructure-driven factors, such as the particular physical devices or locations where that data is stored. In this manner, a group of DDN data structures may form the building block of a DDN and incorporate multiple dimensions of relevant data attributes to facilitate capturing the commonality of data in a network. In some embodiments, a given one of the group of DDN data structures in a particular network may correspond to a set of data objects that have similar content (e.g., as defined by reference to some similarity metric) and indicate baseline behavior for that set of objects. As used herein, the term "observed behavior" refers to how data objects are observed to be used within a network; observed behavior may be determined through a learning or training phase as described in this disclosure. For example, if a document is exchanged between two computer systems, then exchanging that document between those two systems is said to be an example of observed behavior for that document.

When describing the behavior of data, the term "behavior" refers to actions performed on data, characteristics of those actions, and characteristics of those entities involved in the actions. Actions performed on the data may include without limitation reading, writing, deleting, transmitting, etc. Characteristics of those actions refers to properties of the actions being performed beyond the types of actions being performed on the data. Such characteristics may include without limitation the protocols used in those actions, the time when the action was initiated, the specific data involved in the action, parameters passed as part of the action, etc. Finally, data behavior also includes the identity and/or characteristics of the entities involved in the actions. Thus, if observed data behavior includes the transmission of data from user A to user B from a software entity C, data behavior can include information about user A, user B, and software entity C. Characteristics of the entities involved in the actions may include without limitation type of application transmitting the data, the type of system (e.g., client, server, etc.) running the application, etc. Accordingly, data behavior is intended to broadly encompass any information that can be extracted by a computer system when an operation is performed on a data object.

Once the observed behavior of a data object is determined, this information may be used to define the baseline behavior of the data object. The term "baseline behavior" (alternatively, "normal behavior" or "typical behavior") refers to how a data object is expected to behave within a network, which, in many cases, is specified by observed behavior, as modified by any user-defined rules. Baseline behavior may thus be the observed behavior, or the observed behavior plus modifications specified by the user. Consider an example in which one observed behavior of a document is that the document is exchanged between three computer systems A, B, and C. The baseline behavior may be that the document can be exchanged between the three computer systems (which matches the observed behavior) or, because of user-intervention for example, the baseline behavior may also be that the document can be exchanged between computer systems A and B and D. When later evaluating data behavior, the term "anomalous behavior" refers to behavior of a data objects that deviates from the baseline behavior of that data object. A given DDN data structure may, in some cases, indicate policies for handling anomalous usage (e.g., preventing such usage or generating a message).

The organization of a DDN data structure that indicates content and behavior information is described herein as including a "content class" and a "behavior class." This description is to be interpreted broadly to include any information that indicates a set of data objects that have similar content, in addition to baseline or typical behaviors for those data objects. As used herein, the term "class" refers to a collection of related information derived from a classification process. For example, a content class may identify individual data objects that are determined to be related to one another based on their content, and may further include features that describe the data objects and/or attributes of their content. A behavioral class may indicate a behavior of a data object, and may include specific behavioral features that define the associated behavior. These terms are not intended to be limited to any particular data structure format such as a "class" in certain object-oriented programming languages, but rather are intended to be interpreted more broadly.

In various embodiments that are described below, one or more DDN data structures are generated utilizing artificial intelligence (AI) algorithms (e.g., machine learning algorithms) to associate or link data objects having similar data content with their behavioral features and are then deployed to detect anomalous behavior and/or non-compliance with policy objectives. In various cases, the generation and deployment of DDN data structures may occur in two distinct operational phases.

During a learning phase, similarity detection and machine learning techniques may be used to associate data objects having similar data content and to identify the behavioral features of those data objects in order to generate a DDN data structure. In various embodiments, a user provides data object samples to be used in the learning phase. The data object samples that are provided by a user may be selected to achieve a particular purpose. In many cases, a user may select data object samples that have data that is deemed critical or important by the user. For example, a user may provide data object samples that have payroll information. Each of these samples may form the initial building block of a DDN data structure. After the data object samples have been received and processed, network traffic may be evaluated to extract data objects that may then be classified (e.g., using a similarity detection technique or a content classification model) in order to identify at least one of the data object samples with which the extracted data object shares similar content attributes. The content and behavioral features of that extracted data object may be collected and then provided to a set of AI algorithms to train the content classification model and a behavioral classification model. A DDN data structure, in various embodiments, is created to include a content class (of the content classification model) that corresponds to a sample and extracted data objects that are similar to that sample and to include one or more behavioral classes (of the behavioral classification model) that are associated with the behavioral features exhibited by those data objects.

During an enforcement phase, network traffic may be evaluated to extract data objects and to determine if those extracted data objects are behaving anomalously. In a similar manner to the learning phase, extracted data objects may be classified to determine if they fall within a content class of one of the DDN data structures—thus ascertaining whether they include content that is similar to previously classified content. In some embodiments, if a data object is associated with a content class, then its behavioral features are collected and classified in order to identify whether the current behavior of that data object falls within any of the behavioral classes associated with that content class. If the current behavior falls within one of the behavioral classes, then that data object can be said to exhibit normal or typical behavior; otherwise, that data object is behaving anomalously and thus a corrective action may be taken (e.g., prevent the data object from reaching its destination and log the event). In various cases, however, a data object may not comply with a policy objective and thus a corrective action may also be taken in such cases.

These techniques may be advantageous over prior approaches as these techniques allow for better data management based on a better understanding of the behavior of data. More specifically, in using these techniques, a baseline behavior may be identified for data objects (e.g., files) along with other information such as the relationships between those data objects. By understanding how a data object is routinely used, anomalous behavior may be more easily detected as the current behavior of a data object may be compared against how it is routinely used. This approach is distinct from, and complementary to, traditional perimeter-based solutions.

Because a DDN data structure may be used to identify data objects and their associated behavior and to enforce policy objectives against those data objects, this may enable a user to modify or refine the behavior of those data objects. As an example, subsequent to discovering a data management issue involving the misuse of certain data objects, a user may alter a policy to narrow the acceptable uses of those data objects. After mitigating a data management issue, a DDN data structure may adjust (or a new one may be generated) to identify the new baseline behavior of the data objects in view of the data management issue being mitigated. As such, a DDN data structure may continue to be used to track data behavior and identify any anomalous behavior, thereby helping to protect data from known and unknown data management issues.

Additionally, the techniques of the present disclosure may be used to discover previously unknown locations in a user's network where data of interest is stored. As such, a user may benefit from a greater insight into where data is located and/or the relationships that exist among data, users, applications, and/or networks that is provided by these techniques. As another example, users may be able to more easily comply with governmental regulations that attempt to control how certain data (e.g., PHI) should be handled because these techniques may establish the behavior of data and permit those users to conform that behavior in accordance with those governmental regulations. Various embodiments for implementing these techniques will now be discussed.

System 100, in various embodiments, is a network of components that are implemented via hardware or a combination of hardware and software routines. As an example, system 100 may be a database center housing database servers, storage systems, network switches, routers, etc., all of which may comprise an internal network separate from external network 105 such as the Internet. In some embodiments, system 100 includes components that may be located in different geological areas and thus may comprise multiple networks. For example, system 100 may include multiple database centers located around the world. Broadly speaking, however, system 100 may include a subset or all of the components associated with a given entity (e.g., an individual, a company, an organization, etc.).

Computing devices 110, in various embodiments, are devices that perform a wide range of tasks by executing arithmetic and logical operations (via computer programming). Examples of computing devices 110 may include, but are not limited to, desktops, laptops, smartphones, tablets, embedded systems, and server systems. While computing devices 110 are depicted as residing behind firewall 130, a computing device 110 may be located outside firewall 130 (e.g., a user may access a data store 111 from their laptop using their home network) while still being considered part of system 100. In various embodiments, computing devices 110 are configured to communicate with other computing devices 110, data stores 111, and devices that are located on external network 105, for example. That communication may result in intra-network traffic 115 that is routed through network appliances 120.

Network appliances 120, in various embodiments, are networking systems that support the flow of intra-network traffic 115 among the components of system 100, such as computing devices 110 and data stores 111. Examples of network appliances 120 may include, but are not limited to, a network switch (e.g., a Top-of-Rack (TOR) switch, a core switch, etc.), a network router, and a load balancer. Since intra-network traffic 115 flows through network appliances 120, they may serve as a deployment point for a DDN system 140 or at least portions of a DDN system 140 (e.g., an enforcement engine that determines whether to block intra-network traffic 115). In various embodiments, network appliances 120 include a firewall application (and thus serve as a firewall 130) and a DDN system 140; however, they may include only a DDN system 140.

Firewall 130, in various embodiments, is a network security system that monitors and controls inbound and outbound network traffic based on predetermined security rules. Firewall 130 may establish, for example, a boundary between the internal network of system 100 and an untrusted external network, such as the Internet. During operation, in various cases, firewall 130 may filter the network traffic that passes between the internal network of system 100 and networks external to system 100 by dropping the network traffic that does not comply with the ruleset provided to firewall 130. For example, if firewall 130 is designed to block telnet access, then firewall 130 will drop data packets destined to Transmission Control Protocol (TCP) port number 23, which is used for telnet. While firewall 130 filters the network traffic passing into and out of system 100, in many cases, firewall 130 provides no internal defense against attacks that have breached firewall 130 (i.e., have passed through firewall 130 without being detected by firewall 130). Accordingly, in various embodiments, system 100 includes one or more DDN systems 140 that serve as part of an internal defense mechanism.

DDN systems 140, in various embodiments, are data management systems that monitor and control the flow of network traffic (e.g., intra-network traffic 115) and provide information that describes the behavior of data and its relationships with other data, applications, and users in order to assist users in better managing that data. As mentioned earlier, a DDN system 140 may use DDN data structures to group data objects that have similar content and to establish a baseline behavior for those data objects against which policies may be applied to modify the baseline behavior in some manner. The generation and deployment of a DDN data structure may occur in two operational phases.

In a learning phase, in various embodiments, a DDN system 140 (or a collection of DDN systems) learns the behavior of data objects by inspecting intra-network traffic 115 to gather information about the content and behaviors of data objects in traffic 115 and by training content and behavioral models utilizing that gathered information. Accordingly, through continued inspection of intra-network traffic 115, baseline or typically behaviors of data objects may be learned, against which future intra-network traffic 115 observations may be evaluated to determine if they conform to the expected behavior, or instead represent anomalous behavior that might warrant protective action. The set of typical behaviors may be altered by a user such as a system administrator in some embodiments, resulting in an updated baseline set of operations permissible for a given group of data objects. That is, if a user finds that the typical behavior of a data object is undesirable, then the user may restrict that behavior by defining policies in some cases.

In an enforcement phase, in various embodiments, a DDN system 140 determines if a data object is exhibiting anomalous behavior by gathering information in a similar manner to the learning phase and by classifying that gathered information to determine whether that data object corresponds to a particular DDN data structure and whether its behavior is in line with the behavior baseline and the policy objectives identified by that DDN data structure. If there is a discrepancy between how the data object is being used and how it is expected to be used, then a DDN system 140 may perform a corrective action. It is noted that a data object may be determined to exhibit anomalous behavior based on either its content or its detected behavior attributes, or a combination of these. Anomalous behavior may include use of malicious content (e.g., a virus) as well as unexpected use of benign (but possibly sensitive) content. Thus, the techniques described herein can be used to detect content that should not be in the system, as well as content that is properly within the system, but is either in the wrong location or being used by users without proper permissions or in an improper manner.

By identifying a baseline behavior for a data object and then taking corrective actions (e.g., dropping that data object from intra-network traffic 115) for anomalous behavior, a DDN system 140 may enforce policy objectives. For example, if malware is copying PHI records to an unauthorized remote server, a DDN system 140 can drop those records from intra-network traffic 115 upon determining that copying those records to that unauthorized remote server is not baseline behavior or in line with HIPPA policies, for example. Moreover, by continually observing data, a DDN system may provide users with an in-depth understanding of how their data is being used, where it is being stored, etc. With such knowledge, users may learn of other issues pertaining to how data is being used in system 100 and thus may be able to curtail those issues by providing new policies or altering old policies. The particulars of a DDN system 140 will now be discussed in greater detail below.

Figure 2:
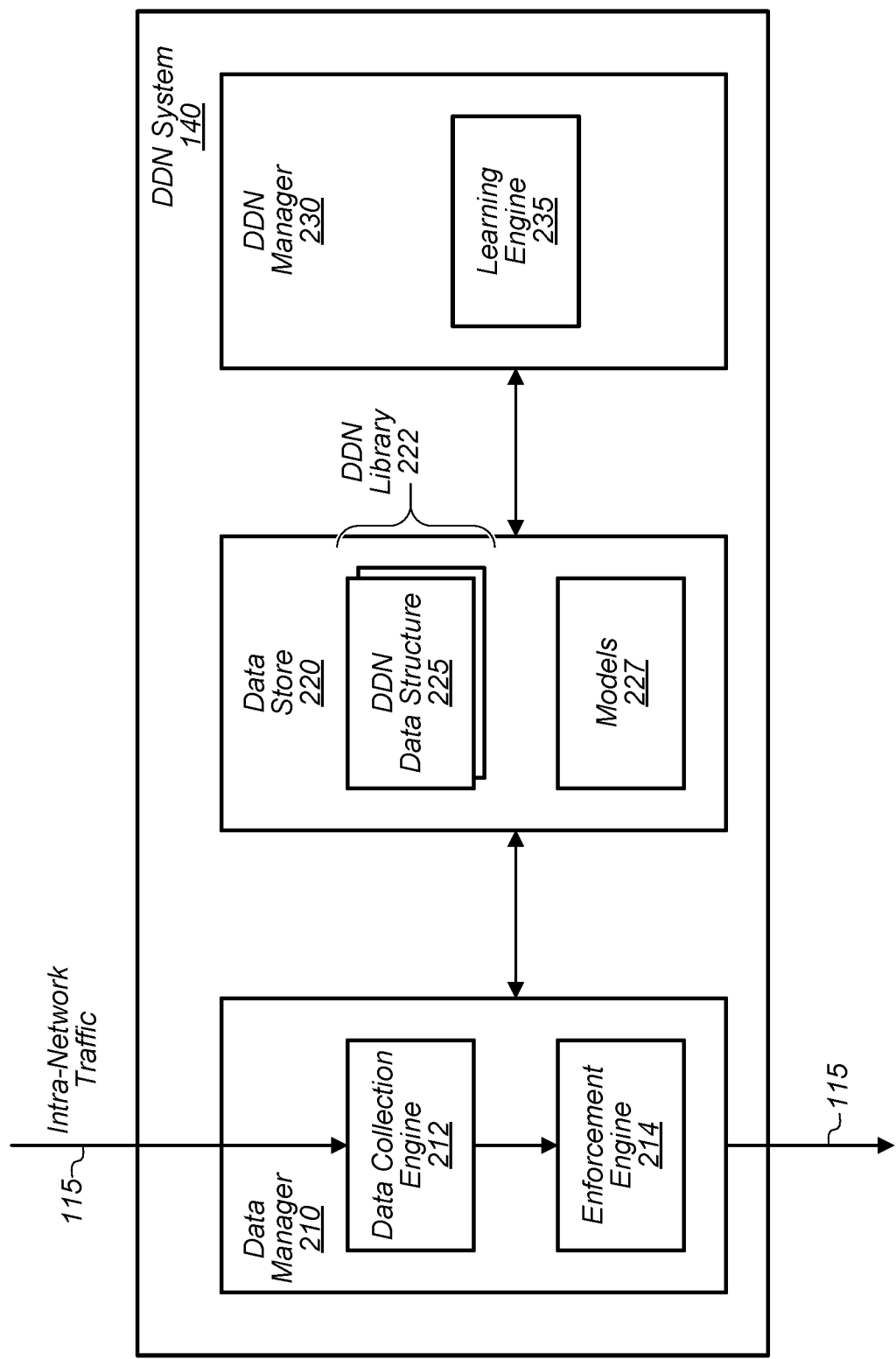
FIG. 2 is a block diagram illustrating example elements of a DDN system, according to some embodiments.

Turning now to FIG. 2, a block diagram of an example DDN system 140 is shown. In the illustrated embodiment, DDN system 140 includes a data manager 210, a data store 220, and a DDN manager 230. As shown, data manager 210 includes a data collection engine 212 and an enforcement engine 214; data store 220 includes a DDN library 222 (which in turn has a set of DDN data structures 225) and models 227; and DDN manager 230 includes a learning engine 235. While DDN systems 140 are shown as residing at network appliances 120 in FIG. 1, some components of a DDN system 140 may reside at other locations—e.g., because learning engine 235 may not need to inspect intra-network traffic 115, it may be located at a different place in system 100. In some embodiments, DDN system 140 may be implemented differently than is shown—e.g., data manager 210 and DDN manager 230 may be the same component.

Data manager 210, in various embodiments, is a set of software routines that monitors and controls the flow of data in intra-network traffic 115. For example, data manager 210 may monitor intra-network traffic 115 for data objects that are behaving anomalously and drop the data objects from intra-network traffic 115. To monitor and control the flow of data, in various embodiments, data manager 210 includes data collection engine 212 that identifies and collects the content and behavioral features (examples of which are discussed with respect to FIG. 4) of data objects that correspond to data samples provided by users of DDN system 140. (Such samples may be those types of data deemed important from the standpoint of an entity—for example, Social Security numbers or a user's private health information.) The content and behavioral features may then be stored in data store 220 for analysis by DDN manager 230. Data collection engine 212 is described in greater detail below with respect to FIG. 3.

Data store 220, in various embodiments, is a repository that stores DDN data structures 225 and models 227. In a sense, data store 220 may be considered a communication mechanism between data manager 210 and DDN manager 230. As an example, the content and behavioral features extracted from data objects may be stored in data store 220 so that learning engine 235 may later use those features to train machine learning models 227 and to create a DDN library 222 of DDN data structures 225. Moreover, enforcement engine 214 may retrieve models 227 and DDN data structures 225 from data store 220 in order to control the flow of intra-network traffic 115.

DDN manager 230, in various embodiments, is a set of software routines that facilitates the generation and maintenance of DDN data structures 225. Accordingly, the features that are collected from data objects may be passed to learning engine 235 for training models 227. For example, as described below, machine learning classification algorithms may be performed to classify data objects by their content, their behavior, or both. The content classes that are created, in various embodiments, are each included in (or indicated by) a respective DDN data structure 225. Accordingly, when identifying a particular DDN data structure 225 to which a data object belongs, a general content model 227 may be used to classify the data object into a DDN data structure 225 based on its content class. The behavioral classes that are created, for a given behavioral model 227 (as there might, in some cases, be a behavioral model 227 for each DDN data structure 225), may all be included in the same DDN data structure 225. Thus, in various embodiments, a DDN data structure 225 includes a content class and one or more behavioral classes. The contents of a DDN data structure 225 are discussed in greater detail with respect to FIG. 2 and learning engine 235 is discussed in greater detail with respect to FIG. 5.

After DDN data structures 225 are created and the behavior baselines are learned (and potentially updated by a user), for any data objects detected within intra-network traffic 115, the content and behavioral features of that data object along with DDN data structures 225 may be pushed to enforcement engine 214 to detect possible anomalous behavior. The machine learning classification algorithms that were mentioned earlier may be performed on the content and behavioral features to ascertain if that data object is similar to established data objects (e.g., based on its content) and whether its behavior conforms to what is normal for those established data objects (e.g., in compliance with specified policy objectives), or what is instead anomalous.

Figure 8:
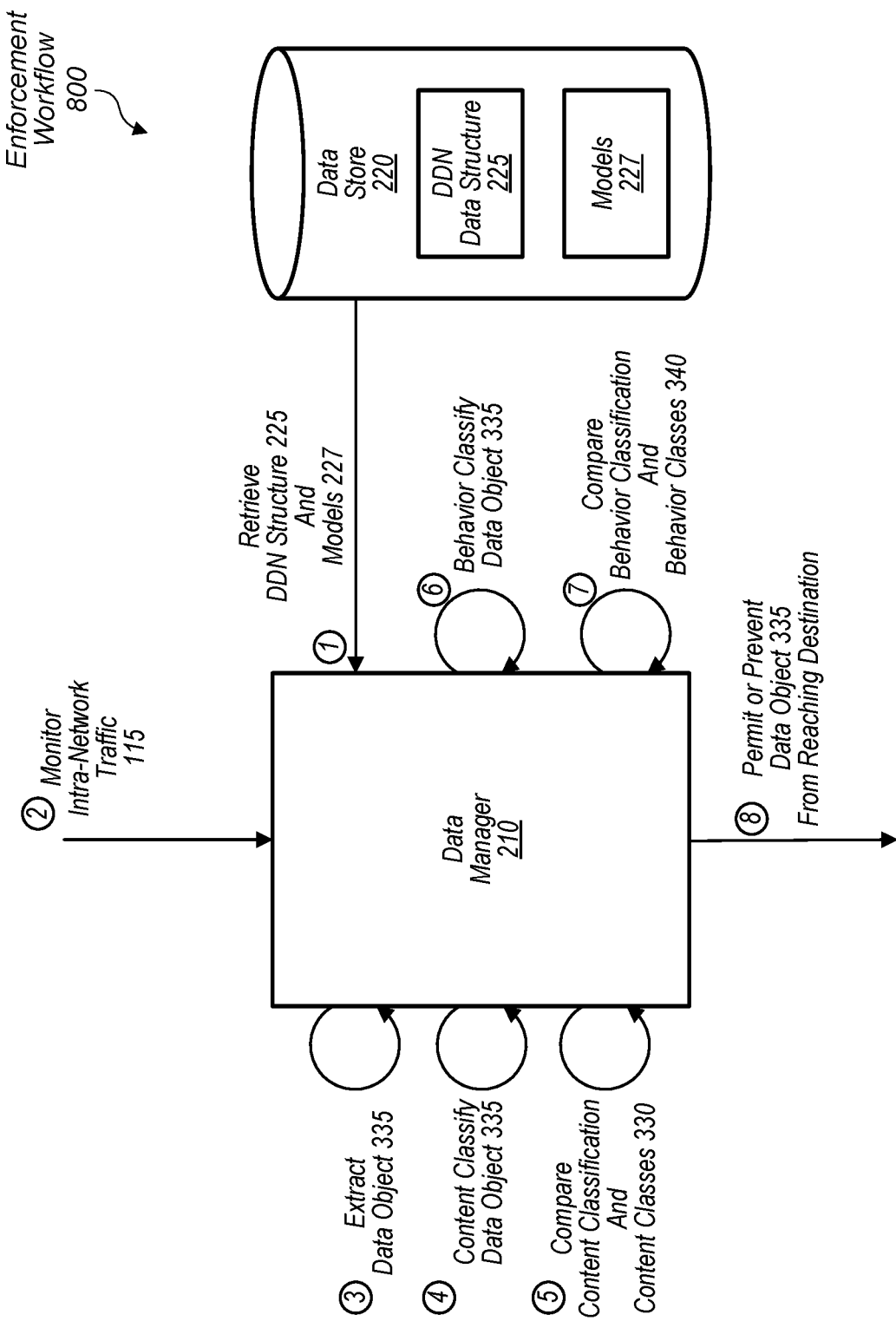
FIG. 8 is a block diagram illustrating example elements of an enforcement workflow, according to some embodiments.

In the discussions that follow, examples of how the learning phase is implemented are discussed (with an example of a learning workflow presented in FIG. 6), followed by examples of how the enforcement phase is implemented (with an example of an enforcement workflow presented in FIG. 8).

Figure 3:
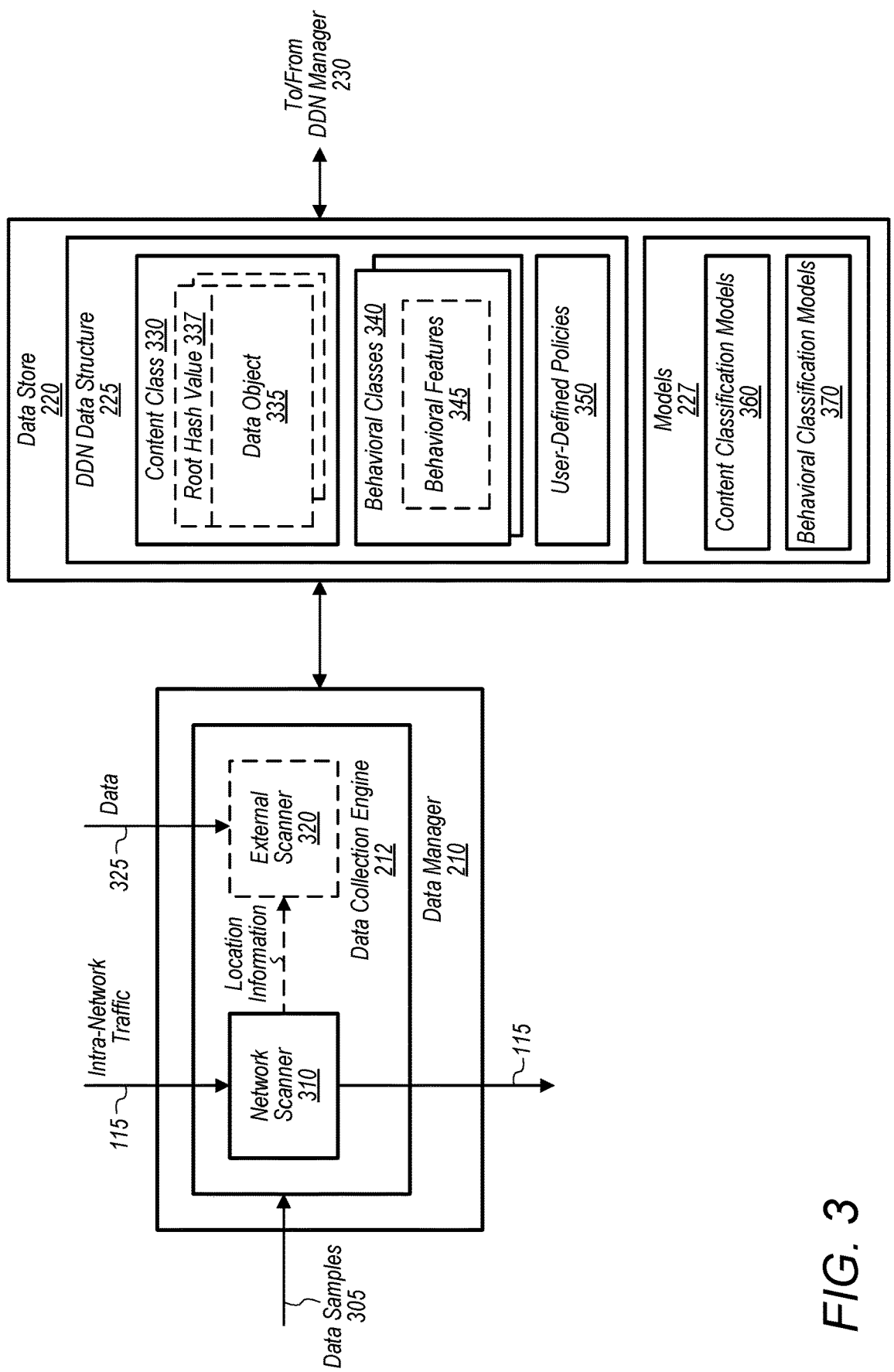
FIG. 3 is a block diagram illustrating example elements of a DDN data structure and a data collection engine of a DDN system, according to some embodiments.

Turning now to FIG. 3, a block diagram of an example data manager 210 and data store 220 in the learning phase are shown. In the illustrated embodiment, data manager 210 includes a data collection engine 212, and data store 220 includes a DNN data structure 225 and models 227. As further depicted, data collection engine 212 includes network scanner 310 and external scanner 320. Also as shown, DDN data structure 225 includes a content class 330, data objects 335, behavioral classes 340, behavioral features 345, and user-defined policies 350; models 227 include content classification model 360 and behavioral classification model 370. In some embodiments, data manager 210 and/or data store 220 may be implemented differently than is shown—e.g., external scanner 320 may be omitted.

The learning phase, in various embodiments, starts with a user providing data samples 305 that the user identifies. In some cases, these may be types of data deemed important to a particular organization. Data samples 305 may include, for example, documents that contain PHI, business secrets, user information, and other personal information. By providing data samples 305, the user may establish a baseline of the types of data that the user wishes to monitor and protect. That is, a user may not care, for example, about advertisements being improperly used, but may care about protecting Social Security numbers from being leaked and thus the user may provide data samples 305 in order to initially teach a DDN system 140 about the types of data that it should be monitoring and controlling.

Moreover, data samples 305 (which include content that user is aware of) may be used to discover similar or even the same content in locations that the user does not know store such content. For example, system 100 may store large amounts of unstructured data (e.g., PDFs, WORD documents, etc.) and thus files containing data that is relevant to the user may be buried in a directory that the user has forgotten about or did not know included this type of data. Accordingly, data samples 305 may be used to identify that a particular type of data is stored in previously unknown network locations. Furthermore, DDN data structures 225 (which may be built upon data samples 305), in some embodiments, may be used to discover data exhibiting similar properties to the data samples. This approach may provide a user with knowledge about data that is similar to the data samples.

Users provide data samples 305, in various embodiments, by granting access to the file storage (e.g., a network file system, a file transfer protocol server, or an application data store, each of which may be implemented by a data store 111) where those samples (e.g., data objects 335) are located. Data objects 335 may include files defined within a file system, which may be stored on storage systems (e.g., data stores 111) that are internal to the network of system 100, within the cloud (e.g., storage external to the network that may or may not be virtualized to appear as local storage), or in any other suitable manner. Although the following discussion refers to files, any type of data objects 335 may be employed, and it is not necessary that data objects 335 be defined within the context of a file system. Instead of granting access to a file storage, in some embodiments, users may directly upload data samples 305 to data manager 210.

After accessing or receiving data samples 305, data collection engine 212 may generate a respective root hash value 337 (also referred to as a "similarity hash value") for one or more of the provided data samples 305. In various embodiments, when generating a root hash value 337, a data sample 305 is passed into a similarity algorithm that hashes that data sample using a piecewise hashing technique such as fuzzy hashing (or a rolling hash) to produce root hash values 337. The piecewise hashing technique may produce similar hash values for data objects 335 that share similar content and thus may serve as a way to identify data objects 335 that are relatively similar. Accordingly, each root hash value 337 may represent or correspond to a set or group of data objects 335. That is, each root hash value 337 may serve to identify the same and/or similar data objects 335 to a corresponding data sample 305 and may be used as a label for those data objects 335 (as illustrated) in order to group those data objects 335 with that data sample. In some embodiments, root hash values 337 are stored in data store 220 in association with their corresponding data sample 305 for later use. In some cases, data collection engine 212 may continuously monitor the provided data samples 305, and update the root hash value 337 when a corresponding data sample 305 is updated.

Once root hash values 337 have been calculated for the provided data samples 305, in various embodiments, data collection engine 212 may begin evaluating intra-network traffic 115 to identify data objects 335 that are similar to provided data samples 305. In some embodiments, this data collection process used in the learning phase only monitors intra-network traffic 115 without actually modifying it. (For this reason, enforcement engine 214 has been omitted from FIG. 3). In contrast, the data collection process used in the enforcement phase may operate to discard or otherwise prevent the transmission of intra-network traffic 115 that is determined to exhibit anomalous behavior. (In some cases, the enforcement phase can include taking some other action other than discarding or preventing transmission of a data object.)

Network scanner 310, in various embodiments, evaluates intra-network traffic 115 and attempts to reassemble the data packets into data objects 335 (e.g., files). Because data objects 335 are in transition to an endpoint that is assumedly going to use those data objects, network scanner 310 (and DNN system 140 as whole) may learn the behavioral features 345 (e.g., who uses those data objects, how often are they used, what types of applications request them, etc.) of those data objects. This approach provides greater visibility relative to only observing data objects 335 that are stored. For each data object 335 extracted from intra-network traffic 115, network scanner 310 may generate a root hash value 337 (e.g., using a piecewise hashing technique). If the root hash value 337 matches any root hash value 337 of the provided data samples 305 (note that a root hash value 337, in some embodiments, matches another root hash value 337 even if they are not exactly the same, but instead satisfy a similarity threshold (e.g., they are 80% the same root hash value 337)) and thus the corresponding data object 335 is at least similar to one of the provided data samples 305, then network scanner 310, in various embodiments, extracts the content and behavioral features 345 of that data object 335 and stores that information in data store 220. The content of that data object 335 (which may include a subset or all of a data object 335) may be labeled with the matching root hash value 337 (as illustrated with data object 335 having a root hash value 337) and associated with a content class 330 that may be labeled with the matching root hash value 337. (Note that the relationship between data objects 335 and content class 330 is depicted by data objects 335 being within content class 330, although data objects 335 are not necessarily stored in content class 330. In other words, content class 330 may simply include an indication of what data objects 335 correspond to this class.)

In some cases, network scanner 310 may not be able to evaluate data objects 335 from intra-network traffic 115 as those data objects may be, for example, encrypted. It is noted that if a data object 335 is encrypted, then the piecewise hashing technique may not be effective in determining if that data object is similar to a data sample 305. Accordingly, network scanner 310 may evaluate intra-network traffic 115 to identify, for data objects 335 in that traffic, where those data objects are stored (in addition to extracting their behavioral features 345). Network scanner 310 may then cause external scanner 320 to obtain the appropriate credentials and scan the repository where those data objects are stored to determine if they contain information that is relevant to users of DDN system 140. For example, if network scanner 310 extracts query results from intra-network traffic 115 that were sent by a MYSQL server, but the query results were encrypted by the MYSQL server, then external scanner 320 may be used to notify a user about the query results and to ask for access credentials so that it may scan the repository that is associated with that MYSQL server for relevant data. As shown, external scanner 320 may retrieve data 325 from locations where relevant data might be stored. Thus, external scanner 320, in various embodiments, is used when network scanner 310 cannot fully understand the contents of data objects 335.

While data objects 335 that have similar content to particular data samples 305 may be discovered by extracting them directly from intra-network traffic 115, in various embodiments, network scanner 310 and external scanner 320 may identify locations where data objects 335 are stored and then scan those locations to determine if there are data objects 335 of interest. In order to identify these locations, network scanner 310 may first discover a data object 335 that has similar content to a data sample 305 and then may determine the location where that data object is stored. That location may be subsequently scanned by, e.g., external scanner 320 for other matching data objects 335 (e.g., by determining if their root hash value 337 matches one of the root hash values 337 for samples 305). In some embodiments, users of DDN system 140 may direct data collection engine 212 to scan particular data repositories (e.g., data stores 111). Thus, instead of reactively discovering data objects 335 that have desired information by extracting them from intra-network traffic 115, data collection engine 212 may proactively find such data objects 335 by scanning data repositories. The content (e.g., data object 335) obtained through external scanner 320 and behavioral features 345 obtained through network scanner 310 may be stored in data store 220 for later processing. This process of identifying locations and scanning the locations may assist in identifying areas where relevant data is stored that are unknown to users of DDN system 140.

When a particular data object 335 matches a data object 335 (e.g., a data sample 305) already in data store 220 and its contents and behavioral features 345 have been extracted, then those contents and behavioral features 345 may be processed for training content classification model 360 and behavioral classification model 370, respectively. In various embodiments, this involves the application of unsupervised machine learning techniques to perform both content classification and identification of baseline behaviors of data objects 335, as discussed in more detail below. After content classification model 370 has been trained, this model may assist (or be used in place of) the piecewise hashing technique to identify data objects 335 that have similar content to data objects 335 associated with DDN data structures 225. For example, the piecewise hashing technique may not identify a desired data object 335 if that data is arranged or ordered in a significantly different manner than, e.g., data samples 305. But content classification model 360 may still be able to identify that such a data object 335 includes data of interest (e.g., by using a natural language processing (NLP)-based approach). Content classification model 360 may further allow for different types of data objects 335 (e.g., PDFs versus WORD documents) to be classified.

Moreover, after a possible location of specified data has been determined (, in some embodiments, data collection engine 212 drives machine learning algorithms (that utilize an NLP-based content classification model 360) to classify data objects 335 at that location to determine whether they correspond to a content class 330 of a DDN data structure 225. If a data object 335 contains data of interest, then its behavioral features 345 may be used by machine learning algorithms to train behavioral classification model 370 as part of building a behavioral baseline. Before providing the content and behavioral features 345 of a data object 335 to data store 220 and/or DDN manager 230, data collection engine 212 may normalize that information (e.g., by converting it into a text file). The normalized data object 335 may then be stored at data store 220 and a data ready message may be sent to the DDN manager 230 so that DDN manager may download that data object 335 and train content classification model 360.

While the resulting classes (e.g., content classes 330 and behavioral classes 340) from trained content and behavioral classifications models 360 and 370, respectively, may form a portion of the DDN data structures 225 stored at data store 220, a DDN data structure 225 may also include user-defined policies 350. These user-defined policies 350 refer to user-supplied data that is used to supplement or modify the baseline set of behaviors set forth by model 370—this may form a new baseline behavior. In some instances, user-defined policies 350 may be included with other policies that are derived (e.g., by a DDN system 140) by translating model 370 into those other policies, which may be used to detect abnormal behavior.

As an example, consider a scenario in which model 370 records the transmission of PHI outside system 100. A user-defined policy may remove this operation from the set of baseline behaviors that are permitted for the PHI. In this manner, a user-defined policy 350 may take an initial set of baseline behaviors from model 370 and produce a final set of baseline behaviors (which may of course be further altered as desired). Note that in some embodiments, the set of baseline behaviors as modified by user-defined policies 350 may all have an implicit action—for example, all baseline behaviors are permitted, and any non-baseline behavior is not permitted. In other embodiments, additional information may be associated with the set of baseline behaviors that specifies a particular action to be performed in response to a particular behavior.

As will be discussed below, because DDN system 140 collects the contents and behavioral features 345 of data objects 335, DDN system 140 may provide users with an understanding of how data is being used along with other insightful information (e.g., the relationships between data objects 335). A user may realize that certain data is being used in a manner that is not desirable to the user based on the baseline behavior exposed to the user by DDN system 140. For example, a user may become aware that banking data is accessed by applications that should not have access to it. Accordingly, a user may provide a user-defined policy 350 that curtails the baseline behavior by preventing particular aspects of that behavior such as not allowing the banking data to be accessed by those applications that should not have access to it.

A DDN data structure 225, in various embodiments, is built by a DDN system 140 to contain a content class 330, behavioral classes 340, and user-defined policies 350 that allow data to be managed in an effective manner. A DDN data structure 225 may be metadata that is maintained by a DDN system 140. It is noted that a DDN data structure 225 is intended to not have any dependency on the underlying physical infrastructure built to store, transport or access data. Rather, it presents a logical view of all the data and their features for the same content class 330. Examples of behavioral features 345 will now be discussed.

Figure 4:
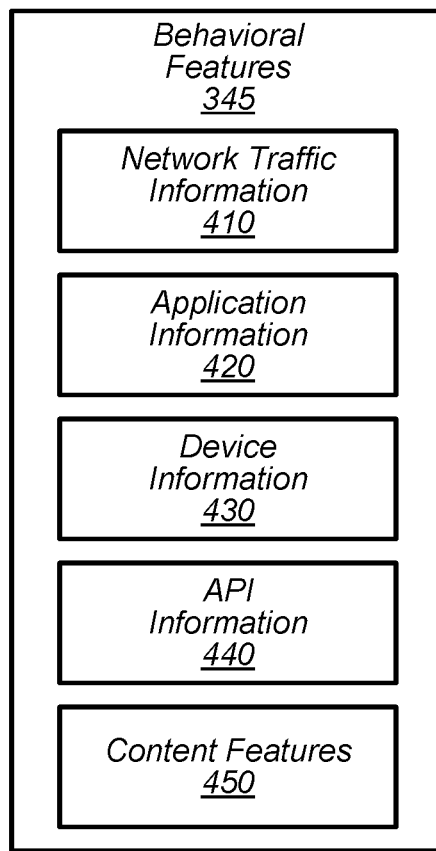
FIG. 4 is a block diagram illustrating example behavioral features, according to some embodiments

Turning now to FIG. 4, a block diagram of example behavioral features 345 that might be collected for data objects 335 are shown. In the illustrated embodiment, behavioral features 345 include network traffic information 410, application information 420, device information 430, API information 440, and content features 450. In some embodiments, other types of behavioral features may be collected in addition to the behavioral features 345 discussed below. All of these types of behavioral features need not be collected in all embodiments.

As explained earlier, a piecewise hashing algorithm and/or content classification model 360 may be used to identify data objects 335 (e.g., files) for further analysis. Once a data object 335 matches a root hash value 337 of, e.g., a data sample 305 or corresponds to a content class 330, then that data object 335 itself (its contents) may be collected and then used for training content classification model 360. But in addition to collecting the content of a data object 335, behavioral features 345 related to that data object 335 may further be collected to help inform the expected behavior of that data object 335. Any combination of the behavioral features 345 discussed below along with other features may be collected and stored with the content of a data object 335 for subsequent training of behavioral classification models 370.

Network traffic information 410, in various embodiments, includes information about the transmission of a data object 335. When a data object 335 is extracted from intra-network traffic 115, that data object 335 is nearly always in transit from some origin to some destination, either of which may or may not be within the boundary of system 100. As such, the origin and destination of a data object 335 in transit may be collected as part of network traffic information 410. Different protocols and applications may have different ways to define the origin and the destination and thus the information that is collected may vary. Examples of information that may be used to define the origin or the destination may include internet protocol (IP) addresses or other equivalent addressing schemes.

Information identifying any combination of the various open system interconnect (OSI) layer protocols associated with the transmission of a data object 335 may be collected as part of network traffic information 410. As an example, whether a data object 335 is sent using the transmission control protocol (TCP) or the user datagram protocol (UDP) in the transport layer of the OSI model may be collected.

Application information 420, in various embodiments, includes information about the particular application receiving and/or sending a data object 335. For example, the information may include the name of an application and the type of the application. Moreover, a data object 335 may be routinely accessed by a certain group of applications that may share configuration parameters. Such parameters may be reflected in, for example, command-lines options and/or other application or protocol-related metadata that is conveyed along with a data object 335 in traffic 115. These parameters may be collected to the extent that they can be identified.

An application associated with a data object 335 may be associated with a current data session that may be related to other network connections. When there are related sessions, the behavioral features 345 from the related sessions may further be collected, as they may inform the behavior of that data object. Within a given data session, there may be many queries and responses for access to a certain data object 335. The frequency of access of that certain data object 335 over time may be collected as part of application information 420. Related to access frequency, the volume of data throughput may also be collected since, for example, an anomaly in the volume of data transfer may be indicative of a data breach.

Device information 430, in various embodiments, includes information about the agent or device requesting a data object 335. Examples of such information may include whether the device is a server or a client system, its hardware and/or operating system configurations, and any other available system-specific information. In some instances, the particular data storage being accessed to transfer a data object 335 may present a known level of risk (e.g., as being accessible by a command and control server, and thus more vulnerable than storage accessible by a less privileged system, etc.). Accordingly, information regarding the level of security risk associated with data storage may be collected as part of device information 430.

API information 440, in various embodiments, includes information about application programming interfaces (API) that are used to access a data object 335. As an example, a data object 335 may be accessed using the hypertext transfer protocol (HTTP) GET command, the file transfer protocol (FTP) GET command, or the server message block (SMB)

read command and thus such information may be collected as part of API information 440. An anomaly in the particular API calls or their sequence can be an indicator of a data breach. Accordingly, API sequence information may be collected as a behavioral feature 345.

Content features 450 may include information that identifies properties of the content of a data object 335. For example, for a WORD document, content features 450 may identify the length of the document (e.g., the number of words in the document), the key words used in the document, the language in which the document is written (e.g., English), the layout of the document (e.g., introduction→body→conclusion), etc. Content features 450 may also identify the type of a data object 335 (e.g., PDF, MP4, etc.), the size of a data object 335 (e.g., the size in bytes), whether a data object 335 is in an encrypted format, etc. Content features 450, in various embodiments, are used to detect abnormal behavior. For example, if a data object 335 is normally in an unencrypted format, then obtaining a content feature 450 that indicates that the data object 335 is in an encrypted format may be an indication of abnormal behavior. In some embodiments, content features 450 may be used to train a content classification model 360 and to determine to which content class 330 that a data object 335 belongs.

It is noted that not all of the aforementioned features 345 are necessarily used together in each embodiment. In some embodiments, the particular features 345 that are collected may be dynamically altered during system operation, e.g., by removing some features and/or adding others. The particulars of one embodiment of DDN manager 230 will now be discussed with respect to FIG. 5.

Figure 5:
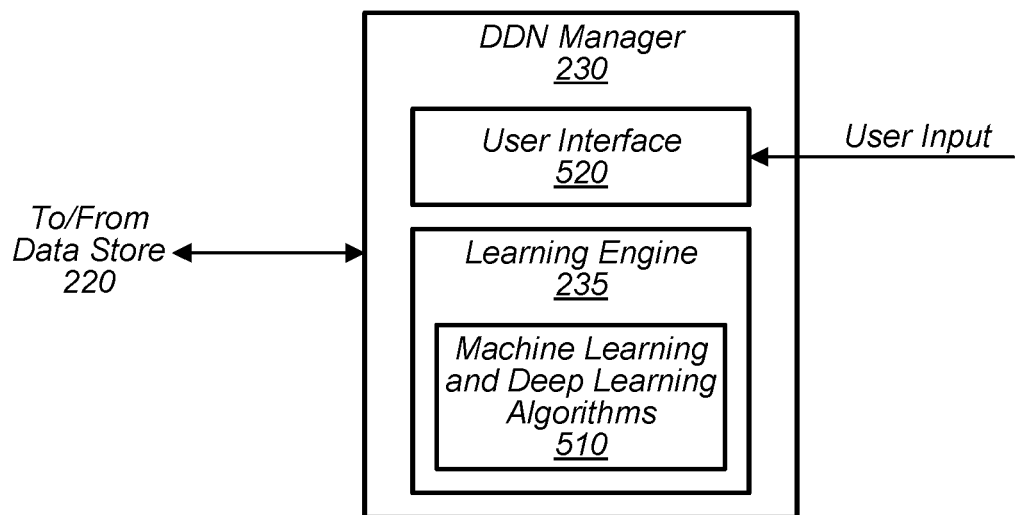
FIG. 5 is a block diagram illustrating example elements of a DDN manager, according to some embodiments.

Turning now to FIG. 5, a block diagram of an example DDN manager 230 is shown. In the illustrated embodiment, DDN manager 230 includes a learning engine 235 (having machine learning and deep learning algorithms 510) and a user interface 520. In some embodiments, a DDN manager 230 may be implemented differently than shown—e.g., user interface 520 may be separate from DDN manager 230.

As explained earlier, to collect data for machine learning training purposes, a piecewise hashing algorithm may initially be used to discover, based on evaluating intra-network traffic 115, data objects 335 with content similar to provided data samples 305. Under this approach, the assumption is that data objects 335 sharing enough content similarity should be in the same content class 330. The piecewise hashing algorithm may be further assisted, however, by using machine learning content classification methods to help identify more data objects 335 that are similar to provided data samples 305. As an example, machine learning content classification may facilitate similarity detection in cases that are difficult for the piecewise hashing algorithm to handle such as content that is contextually the same, but is ordered in a reasonably different manner than the provided data samples 305. It is noted, however, that in various embodiments, machine learning content classification may be omitted (e.g., in the cases where the piecewise hashing algorithm provides sufficient coverage and accuracy).

Learning engine 235, in various embodiments, trains content classification models 360 using machine learning and deep learning algorithms 510. For example, learning engine 235, in some embodiments, uses algorithms 510 such as support vector machine (SVM) algorithms and convolutional neural network (CNN) algorithms to train content classification models 360 such as a set of SVM models in conjunction with a set of CNN models, although many other architectures that use different algorithms 510 are possible and contemplated. Root hash values 337 (discussed above) may serve as labels for the content classes 330 that result from content classification models 360.

In some embodiments, learning engine 235 uses machine learning and deep learning algorithms 510 to identify specific types of data objects 335 and to generate pattern matching rules (e.g., regex expressions) or models that may be used on a specific type of data object 335 to identify whether that data object 335 includes data of interest. More specifically, discovering information of interest (e.g., PHI) in different types of unstructured data (e.g., PDFs, pictures, etc.) may be challenging for, e.g., a piecewise hashing algorithm. Accordingly, learning engine 235 may train a set of natural language processing (NLP) content classification models (which are examples of content classification models 360) to classify a data object 335 to determine if that data object 335 is part of a content class 330. If that data object 335 belongs to a content class 330 within DDN system 140, then pattern matching rules (which may be generated using algorithms 510) may be used on that data object 335 to extract any information of interest. For example, content classification models 360 may classify a credit card PDF form as belonging to a PII content class 330 and thus regular expressions (which may be selected specific to PDFs) may be used to identify whatever PII is in that credit card PDF form.

Learning engine 235, in various embodiments, further trains behavioral classification models 370 using machine learning and deep learning algorithms 510. For example, learning engine 235, in some embodiments, uses algorithms 510 such as convolutional neural network (CNN) algorithms and recurrent neural networks (RNN) algorithms to train behavioral classification model 370 such as a set of CCN models in conjunction with a set of RNN models, although many other architectures that use different algorithms 510 are possible and contemplated. In some cases, RNN models may be used for tracking time series behavior (e.g., temporal sequences of events) while CNN models may be used for classifying behavior that is not time-dependent. Behavioral class 340, in some embodiments, are labeled with a unique identifier and associated with a content class 330. Accordingly, a single content class 330 may be associated with a set of behavioral classes 340. Together, a content class 330 and behavioral classes 340 may define the behavioral benchmark of a data object 335 (i.e., the baseline behavior, which may be based on the observed behavior of that data object 335 within intra-network traffic 115).

Thus, the collected content and behavioral features 345 may be used by learning engine 235 for training content classification models 360 and behavioral classification models 370 to perform content and behavioral classification, respectively. The process of classification may result in classes, such as content classes 330 and behavioral classes 340. It is noted, however, that although machine learning classification techniques may be used to generate classes, any suitable classification technique may be employed.

When machine learning classification training is complete, in various embodiments, the resulting models 227 may be deployed for real-time enforcement, either in the network device that completed the learning phase, or in other devices within the network. As an example, models 227 may be packed into Python objects and pushed to data manager 210 that can perform real-time enforcement (e.g., which, as discussed earlier, may be situated within a network appliance 120 in such a manner that it may intercept anomalous traffic and preventing it from being further transmitted within the network of system 100). In order to support real-time enforcement, in various embodiments, DDN data structures 225 are provided to data manager 210.

User interface 520, in various embodiments, provides information maintained by DDN system 140 to users for better understanding their data. That information may include the data objects 335, content classes 330, behavioral features 345, behavioral classes 340, and policies 350 of DDN data structures 225 maintained at data store 220 in addition to models 227. Thus, interface 520, in various embodiments, issues different query commands to the data stores 220 to collect information and present DDN data structure 225 details to users. DDN data structure 225 information may be presented to users in a variety of ways.

User interface 520 may provide users with access and history information (e.g., users, their roles, their location, the infrastructure used, the actions performed, etc.). This information may be presented in, e.g., tables, graphs, or maps, and may indicate whether an access involves one DDN data structure 225 or multiple difference DDN data structures 225. This information may, in various cases, be based on collected behavioral features 345.

User interface 520 may provide users with content information that presents a measure of distance (or similarity) between different data objects 335. For example, two different data objects 335 may have a certain level of content similarity (e.g., 80% similar), but have different behavioral features 345. By viewing content information in this manner, users may be enabled to evaluate related DDN data structures 225 and modify data usage patterns. For example, if two data objects 335 are quite similar in content but have divergent behaviors, administrators may intervene to change the data access structure (e.g., by changing rules or policies 350) to bring those data objects into better conformance, which may help improve performance and/or security, for example.

User interface 520 may provide users with data dependency information that presents the data dependencies among various objects (e.g., in order to display a web page, the database record x in table z needs to be accessed). This dependency information may span across DDN data structures 225, creating a content dependency relationship between them. If an anomaly is detected with respect to one DDN data structure 225, dependency information may facilitate determination of the potential scope of that anomaly. For example, if the data objects 335 that are associated with a DDN data structure 225 are to be isolated after detection of an anomaly, then dependency information may facilitate determining how widespread the impact of such isolation might be. The dependency information may be part of the behavioral information that is collected for a data object 335. For example, a data object 335 may be observed on multiple occasions to be in transit with another object 335 or may be observed in response to particular requests that are extracted from network traffic. Accordingly, the behavior of that data object 335 may indicate that it depends on that other data object 335 or that the object depends on it. Also, when investigating an actual attack or malicious event, considering the lateral impact may be more comprehensively performed from a content or even application dependency level than from just the network level. This information may also be extended to include application dependencies (e.g., application A uses data C that has a content dependency on data D that is also created/managed by application B).

User interface 520 may provide users with security information, such as information regarding security best practices for certain types of data and the status of security compliance of various data objects 335. User interface 520 may also provide users with user-defined rule information. As noted elsewhere, users may provide their own policies 350 used for similarity detection, content classification, behavioral classification, and enforcement. Accordingly, user interface 520 may enable users to view, change, and create rules Thus, user interface 520 may provide users with a better understanding of their data, and based on that understanding, allow them to improve their data protection and optimize data usage. Particularly, it may help users to construct a data usage flow across different DDN data structures 225, and map these into user-defined business intents—enabling a user to evaluate how data is being used at various steps of the flow, and whether those steps present security risks. An example learning workflow will now be discussed.

Figure 6:
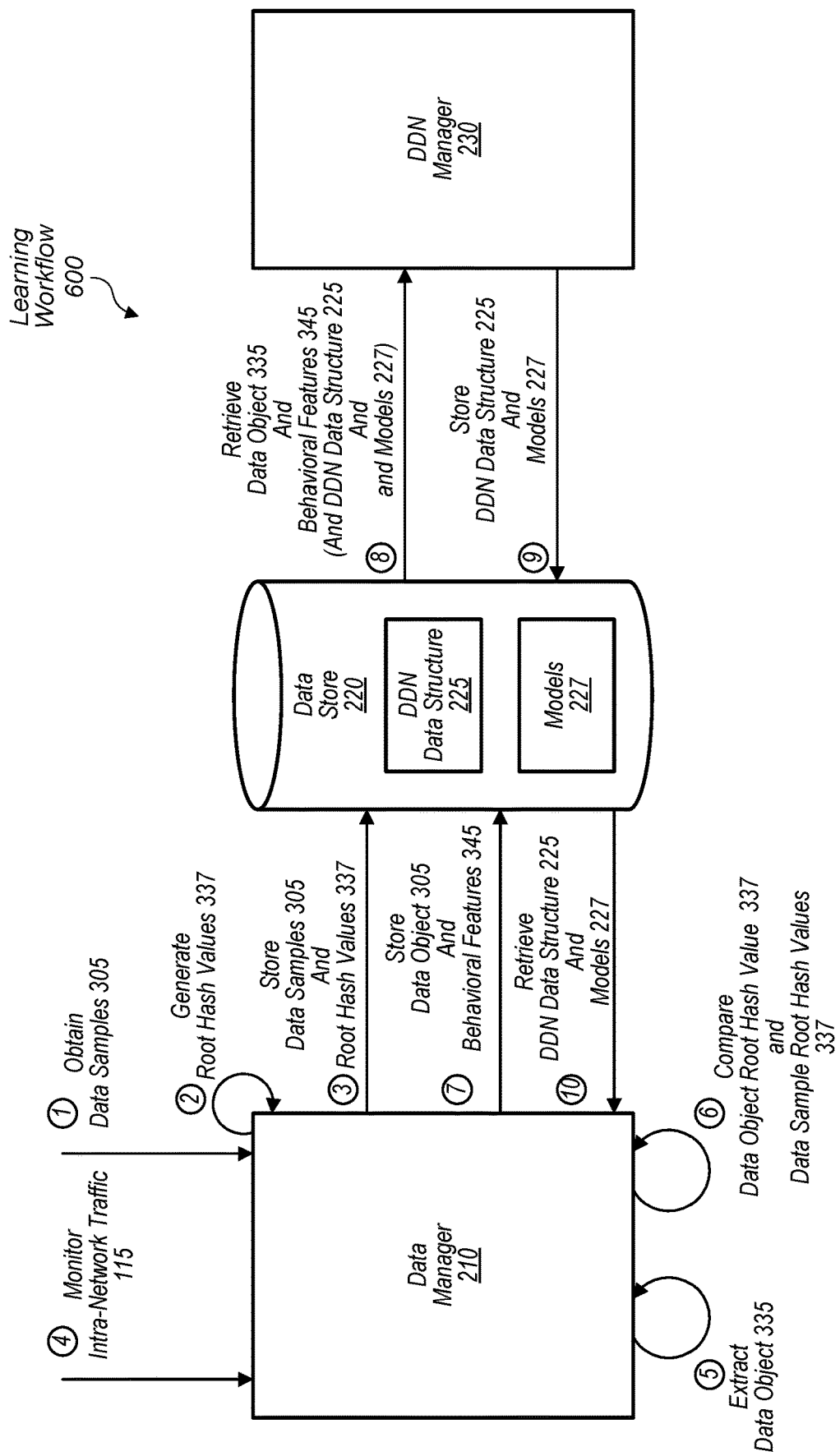
FIG. 6 is a block diagram illustrating example elements of a learning workflow, according to some embodiments.

Turning now to FIG. 6, a block diagram of an example learning workflow 600 is shown. In the illustrated embodiment, learning workflow 600 involves a data manager 210, a data store 220, and a DDN data structure 225. As shown, the illustrated embodiment includes numerical markers indicating one possible ordering of the steps of learning workflow 600.

As illustrated, data samples 305, in various embodiments, are initially provided to data manager 210 (e.g., by a user of DDN system 140). Those data samples 305 may be copied to a local or external storage that is accessible to data manager 210 or may be directly uploaded to data manager 210. Once data samples 305 have been obtained, in various embodiments, data manger 210 uses a piecewise hashing algorithm (as explained earlier) to generate a root hash value 337 for each of the provided data samples 305, and then stores those root hash values 337 along with those data samples in data store 220.

Thereafter, data manager 210 may begin monitoring intranetwork traffic 115 and may extract a data object 335 from that traffic. Accordingly, in various embodiments, data manager 210 normalizes that data object 335, generates a root hash value 337 for it, and compares the generated root hash value 337 with the root hash values 337 associated with the provided data samples 305. If the generated root hash value 337 meets some specified matching criteria (e.g., 80% correspondence) for a root hash value 337 of a data sample 305, then data manager 210 may store the corresponding data object 335 and its behavioral features 345 in association with the same set as the matching data sample 305. In some instances, that data object 335 and its behavioral features 345 may be labeled with the root hash value 337 of the relevant data sample 305.

The data object 335 and its behavioral features 345, in various embodiments, are passed through DDN manager 230 in order to create a DDN data structure 225 and thus, to create the initial baseline behavior for that data object 335. If a DDN data structure 225 already exists for the group corresponding to that data object 335, then the DDN data structure 225 and models 227 may also be retrieved and trained using that data object 335 and its behavioral features 345. In various embodiments, once a DDN data structure 225 and models 227 are created or updated, DDN manager 230 stores them in data store 220. Thereafter, data manager 210 may retrieve the DDN structure 225 and models 227 to be used for future learning or enforcement. As discussed, the initial baseline behavior set for a data object may be modified by user-defined policies in order to create an updated baseline behavior set.

Accordingly, once sufficient information has been collected during the learning phase, the enforcement may be enabled. (In some embodiments, the learning phase may continue to operate during enforcement, enabling enforcement to dynamically adapt to data behavior over time.)

As shown in FIG. 1, system 100 may include multiple DDN systems 140, each of which may implement the learning phase as discussed above. In some cases, the information obtained by one DDN system 140 during its learning phase may be passed to another DDN system 140 for use. As an example, a DDN data structure 225 generated by one DDN system 140 may be provided to another DDN system 140 to be used during its enforcement phase. In this manner, the learning performed by one DDN system 140 augment the learning of another DDN system 140. Moreover, the learning phases between DDN systems 140 may be different. For example, one DDN system 140 may receive a user-defined policy 350 that is different than one received by another DDN system 140. Particular embodiments of the enforcement phase based on data created and modified in the learning phase will be discussed next.

Figure 7:
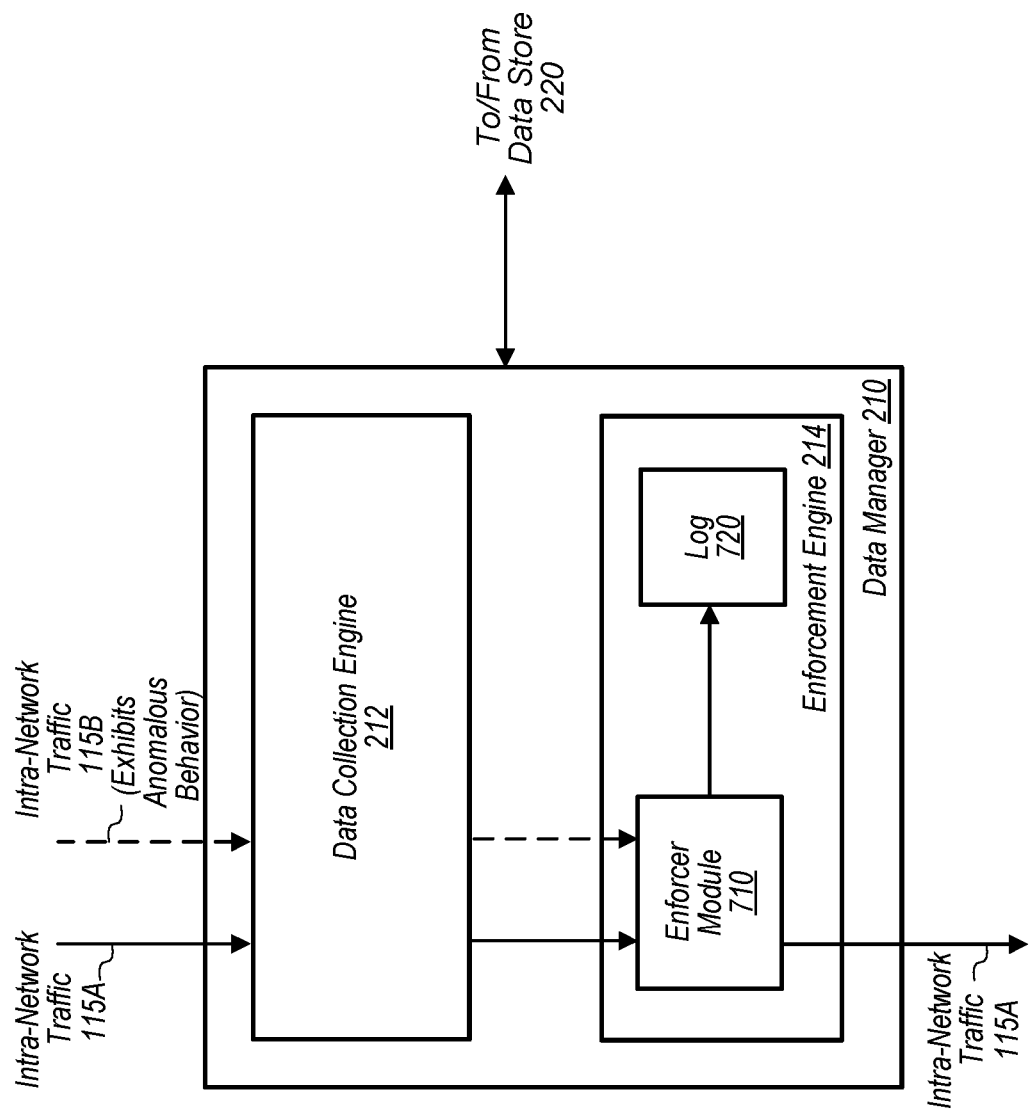
FIG. 7 is a block diagram illustrating example elements of an enforcement engine, according to some embodiments.

Turning now to FIG. 7, a block diagram of an example data manager 210 implementing an enforcement phase is shown. In the illustrated embodiment, data manager 210 includes data collection engine 212 and enforcement engine 214. As further shown, enforcement engine 214 includes an enforcer module 710 and a log 720. For illustrative purposes, two different types of intra-network traffic are depicted: intra-network traffic 115A that is normal (i.e., expected or permissible) and intra-network traffic 115B that exhibits anomalous or unwanted behavior. In some embodiments, data manager 210 may be implemented differently than shown—e.g., enforcement engine 214 may not include log 720.

Similar to the learning phase, in various embodiments, the enforcement phase involves collecting content and behavioral features 345 from the data objects 335 that are extracted from intra-network traffic 115. Accordingly, as shown, intra-network traffic 115 may pass through data collection engine 212 so that content and behavioral features 345 can be collected before that traffic passes through enforcement engine 214. The content and/or behavioral features 345 that are collected may be provided to enforcer module 710 for further analysis. In some embodiments, behavioral features 345 collected for enforcement may be the same as those features collected for the learning phase, although in other embodiments the features may differ.

Enforcer module 710, in various embodiments, monitors and controls the flow of intra-network traffic 115 (e.g., by permitting data objects 335 to pass or dropping them) based on user-defined policies 350. Accordingly, enforcer module 710 may obtain DDN data structures 225 and models 227 from data store 220 and use them to control traffic flow. In various embodiments, content and behavioral features 345 are classified using models 227 that were trained in the learning phase into a content class 330 and a behavioral class 340, respectively, in order to determine whether the corresponding data object 335 is associated with normal or anomalous behavior. Enforcer module 710 may first classify a data object 335, based on its content, into a content class 330 in order to determine whether that data object 335 belongs to a particular DDN data structure 225. If a data object 335 falls into a content class 330 that is not associated with any DDN data structure 225, then it may be assumed that the data object 335 does not include content that is of interest to the users of DDN system 140 and thus the data object 335 may be allowed to be transmitted its destination, but may also be logged in log 720 for analytical purposes. But if a data object 335 falls into a content class 330 that is associated with a certain DDN data structure 225, then its behavioral features 345 may be classified. As such, behavioral classification in some embodiments may be performed only on data objects 335 identified during content classification. In other embodiments, however, it is contemplated that content and behavioral classification may occur concurrently. Moreover, in yet some embodiments, enforcement decisions may be made solely on the basis of behavioral classification.

Behavioral features 345, in various embodiments, are classified by using the behavioral classification model 370, which may then produce a behavioral classification output, e.g., in the form of a list of behavior class scores. If the classification of the behavioral features 345 of the data object 335 falls into a behavioral class 340 of the corresponding DDN data structure 225, then the behavior of that data object 335 may be deemed normal and the data object 335 may be allowed to pass, but a record may be stored in log 720. If, however, the classification does not fall into any behavioral classes 340 of the corresponding DDN data structure 225 (i.e., the DDN data structure 225 that the data object 335 belongs to by virtue of its content being classified into the content class 330 of that DDN data structure 225), then the behavior of the data object 335 may be deemed anomalous and a corrective action may be taken. In various embodiments, a data object 335 exhibiting anomalous behavior is dropped from intra-network traffic 115 (as illustrated by intra-network traffic 115B not passing beyond enforcer module 710) and a record is committed to log 720. Log 720, in various embodiments, records activity pertaining to whether data objects 335 are allowed to pass or dropped from traffic and can be reviewed by users of DDN system 140.

User-defined policies 350, in various embodiments, may permit the behavior of a data object 335 to be narrowed or broadened. For example, even if a data object is not indicated to be anomalous based on the content and/or behavioral classifications, it may fail to satisfy one or more user-defined policies 350, and may consequently be identified as anomalous. Such a data object 335 may be handled in the same manner as data objects 335 that otherwise fail the machine learning classification process, or it may be handled in a user-defined fashion. For example, if a data object 335 has been regularly used by a group of users and an administrator learns of this behavior via DDN system 140 and updates a policy 350 preventing that group of users from using that data object 335, then when that data object 335 is classified by enforcer module 710, it will still appear to be behaving normally. Enforcer module 710, however, may drop the data object 335 from intra-network traffic 115 because of a policy 350 (and/or a policy derived by a DDN system 140 based on behavioral features 345).

Thus, in various embodiments, using content and behavioral classification results along with policies 350, enforcer module 710 can verify if a data object 335 has the desired behavior and/or content. If the results of classification or policies 350 indicate that the data object is anomalous (either with respect to its content or its behavior, or both) further transmission of the data object will be prevented (e.g., by discarding or otherwise interdicting the traffic associated with that data object 335).

In some embodiments, in order to enable consistent data management at different areas of system 100, the data (e.g., DDN data structure 225 and models 227) maintained at data store 220 may be spread around to different components of system 100 (e.g., copies may be sent to each DDN system 140 in system 100). Accordingly, enforcers 710 at different areas in system 100 may each monitor and control intra-network traffic 115 using the same DDN information; however, in some cases, each DDN system 140 may maintain variations of that information or its own DDN information. As an example, a DDN system 140 that receives traffic from a data store 111 that stores PHI and PII may monitor that traffic for those types of information while another DDN system 140 in the same system 100 that receives traffic from another data store 111 that stores PII and confidential information may monitor that traffic for those types. These DDN systems 140, however, may in some cases share DDN information relevant to controlling PII since they both monitor and control that type of information.

In various embodiments, data-based segmentation may be used in which logical perimeters are built around data of interest to protect that data in many cases. These perimeters allow for policies to be employed against that data. Enforcer modules 710 may, in some cases, be deployed at locations near data of interest and ensure that anomalous use of that data (e.g., the data is not being used in accordance with a particular policy 350 and/or a policy that may be derived from behavioral classification model 370) is prevented. For example, a user may wish to protect Social Security numbers. Accordingly, using DDN data structures 225 and enforcer modules 710, a logical, protective perimeter may be established around areas where Social Security numbers are stored, despite those numbers possibly being stored within different data stores that are remote to each other. The user may define a set of policies 350 that are distributed to the enforcer modules 710 for preventing behavior that is not desired by the user. In various embodiments, DDN information (e.g., DDN data structures 225) may be shared between enforcer modules 710 that are protecting the same data of interest. Data-based segmentation is discussed in greater detail with respect to FIG. 12. An example enforcement workflow will now be discussed.

Turning now to FIG. 8, a block diagram of an example enforcement workflow 800 is shown. In the illustrated embodiment, enforcement workflow 800 involves a data manager 210 and a data store 220. As shown, the illustrated embodiment includes numerical markers that indicate one possible ordering of the steps of enforcement workflow 800.

As illustrated, data manager 210, in various embodiments, initially retrieves DDN data structures 225 and models 227 from data store 220. Thereafter, data manager 210 may monitor intra-network traffic 115 and may extract a data object 335 from that traffic 115. As such, data manager 210, in some embodiments, classifies that data object 335 using content classification model 360 into a content class 330. That content class 330 may then be used determine if the data object 335 falls into a content class 330 associated with a DDN data structure 225. If not, then that data object 335 may be allowed to reach its destination; otherwise, data manager 210, in some embodiments, classifies that data object 335 using behavioral classification model 370 into a behavioral class 340. That behavioral class 340 may then be used to determine if the data object 335 falls into a behavioral class 340 that is corresponds to the content class 330 in which the data object 335 has been classified. If it does, then one or more policies 350 may be applied to that data object 335 and if it satisfies those policies, then it may be allowed to pass. But if the data object's behavioral class 340 does not match behavioral class 340 in the corresponding DDN data structure 225, then, in various embodiments, it is prevented from passing (e.g., it is dropped from intra-network traffic 115) and the incident is recorded in log 720.

Similar to the learning phase, information gathered during the enforcement phase may be shared between DDN systems 140. In various instances, a particular DDN system 140 may be responsible for monitoring and controlling a particular type of data (e.g., PHI) while another DDN system 140 may be responsible for monitoring and controlling a different type of data (e.g., PII). Moreover, in some embodiments, a system 100 may employ DDN systems 140 that implement different roles (e.g., one may implement the learning phase while another may only implement the enforcement phase). As such, those DDN system 140 may communicate data between each other to help each other implement their own respective roles.

Figure 9:
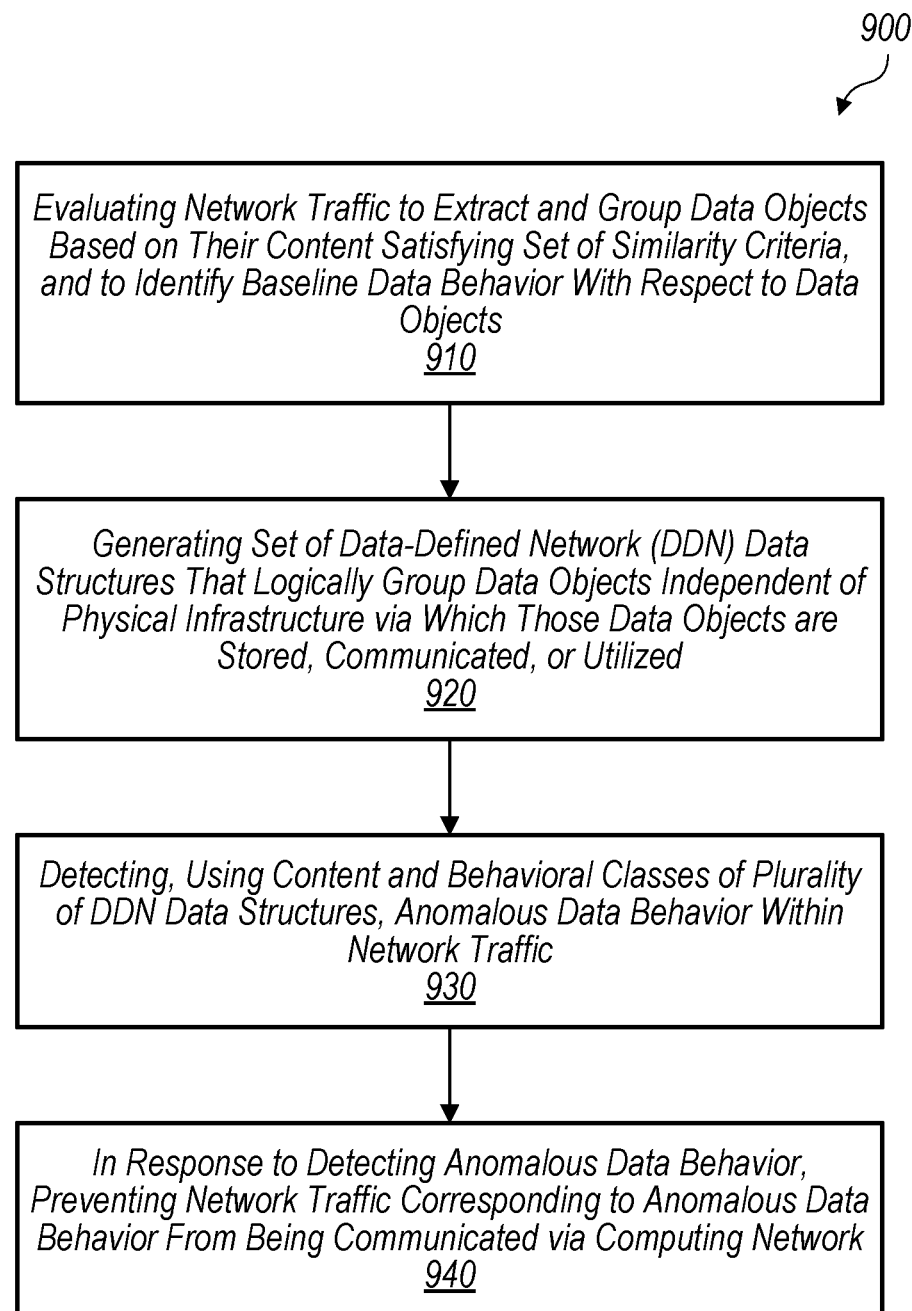
FIGS. 9-11 are flow diagrams illustrating example methods relating to managing data, according to some embodiments.

Turning now to FIG. 9, a flow diagram of a method 900 is shown. Method 900 is one embodiment of a method performed by a computer system (e.g., DDN system 140) to control data within a computing network (e.g., network of system 100). In some embodiments, method 900 may include additional steps—e.g., the computer system may present a user interface (e.g., user interface 520) to a user for configuring different aspects (e.g., user-defined policies 350) of the computer system.

Method 900 begins in step 910 with the computer system evaluating network traffic (e.g., intra-network traffic 115) to extract and group data objects (e.g., data objects 335) based on their content satisfying a set of similarity criteria, and to identify baseline data behavior with respect to the data objects. In some embodiments, the computer system receives one or more user-provided data samples (e.g., data samples 305), generates respective root hash values (e.g., root hash values 337) corresponding to the one or more user-provided data samples, and then stores the root hash values in a database (e.g., data store 220). Accordingly, the computer system may determine that the content of a given one of the data objects satisfies the set of similarity criteria by generating a data object hash value of the given data object and then by determining that the data object hash value matches a given one of the root hash values stored in the database. In some embodiments, subsequent to determining that a given one of the one or more data objects satisfies the set of similarity criteria, the computer system stores a record of behavioral features (e.g., behavioral features 345) associated with the given data object.

In step 920, the computer system generates a set of data-defined network (DDN) data structures (e.g., DDN library 222 of DDN data structures 225) that logically group data objects independent of physical infrastructure via which those data objects are stored, communicated, or utilized. A given one of the set of DDN data structures may include a content class (e.g., content class 330) and one or more behavioral classes (e.g., behavioral classes 340). The content class may be indicative of one or more of the data objects that have been grouped based on the one or more data objects satisfying the set of similarity criteria and the one or more behavioral classes may indicate baseline network behavior of the one or more data objects within the content class as determined from evaluation of the network traffic. In some embodiments, the content class of a given DDN data structure may be based upon a machine learning content classification of content of a given data object. In some embodiments, the one or more behavioral classes of the given DDN data structure may be based upon a machine learning behavioral classification the record of behavioral features associated with the given data object. The machine learning behavioral classification may involve training a set of convolutional neural networks (CNN) and recurrent neural networks (RNN) using the record of behavioral features associated with the given data object. In some cases, other networks may be used instead of CNN and RNN, such as long short-term memory (LSTM) networks.

In step 930, the computer system detects anomalous data behavior within network traffic based on the content classes and the behavioral classes of the generated set of DDN data structures. In some embodiments, the computer system may detect anomalous data behavior by identifying an extracted data object from the network traffic and evaluating the extracted data object with respect to the content class and the one or more behavioral classes of ones of the DDN data structures. Such an evaluation may include determining, based upon the machine learning behavioral classification, that the extracted data object does not exhibits expected behavior and then indicating that the extracted data object exhibits anomalous behavior based upon the extracted data object failing to exhibit the expected behavior.

In step 940, in response to detecting the anomalous data behavior, the computer system prevents network traffic corresponding to the anomalous data behavior from being communicated via the computing network.

Figure 10:
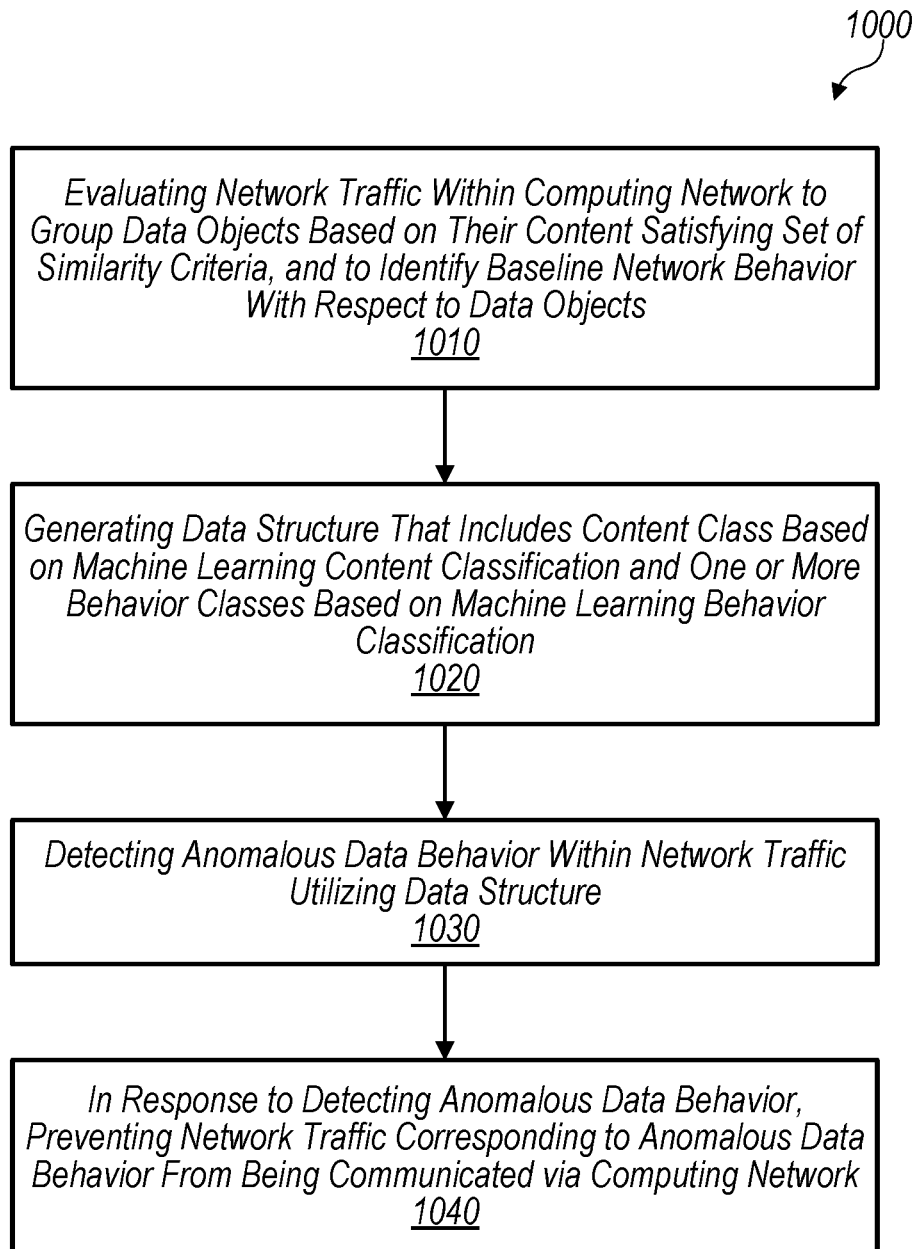

Turning now to FIG. 10, a flow diagram of a method 1000 is shown. Method 1000 is one embodiment of a method performed by a computer system (e.g., DDN system 140) to manage data. Method 1000 may, in some instances, be performed by executing a set of program instructions stored on a non-transitory computer-readable medium. In some embodiments, method 1000 may include additional steps—e.g., the computer system may present a user interface (e.g., user interface 520) to a user for configuring different aspects (e.g., user-defined policies 350) of the computer system.

Method 1000 begins in step 1010 with the computer system evaluating network traffic (e.g., intra-network traffic 115) within a computing network (e.g., a network across multiple systems 100) to group data objects (e.g., data objects 335) based on their content satisfying a set of similarity criteria, and to identify baseline network behavior with respect to the data objects. In some embodiments, the computer system retrieves a plurality of data samples (e.g., data samples 305) from one or more storage devices, generates a respective plurality of root hash values (e.g., root hash values 337) using the plurality of data samples; and then stores the plurality of root hash values within a database (e.g., data store 220). Accordingly, determining that content of a given one of the data objects satisfies the set of similarity criteria may include generating a data object hash value for the given data object and then determining that the data object hash value matches a given one of the root hash values stored in the database.

In step 1020, the computer system generates a data structure (e.g., DDN data structure 225) that includes a content class (e.g., content class 330) based on machine learning content classification and one or more behavioral classes (e.g., behavioral classes 340) based on machine learning behavioral classification. The content class may be indicative of one or more of the data objects that have been grouped based on the one or more data objects having a set of similar content and the one or more behavioral classes may be indicative of baseline network behavior of the one or more data objects within the content class as determined from evaluation of the network traffic.

In step 1030, the computer system detects anomalous data behavior within network traffic utilizing the data structure. Detecting anomalous data behavior may include identifying an extracted data object from the network traffic and evaluating the extracted data object with respect to the content class and the one or more behavioral classes of the data structure. In some cases, evaluating the extracted data object with respect to the content class and the one or more behavioral classes of the data structure may further comprise: determining, based upon the machine learning behavioral classification, that the extracted data object does not exhibits expected behavior; and indicating that the extracted data object exhibits anomalous behavior based upon the extracted data object failing to exhibit the expected behavior. In some instances, the computer system may obtain one or more user-defined rules (e.g., user-defined policies 350) regarding content or behavior of data objects and may store the one or more user-defined rules in association with the data structure. Accordingly, evaluating the extracted data object with respect to the content class and the one or more behavioral classes of the data structure may further comprise: determining, based upon the machine learning behavioral classification, that the extracted data object exhibits expected behavior; and in response to determining that the extracted data exhibits expected behavior, determining that the extracted data object fails to satisfy the one or more user-defined rules included in the data structure; and indicating that the extracted data object exhibits anomalous behavior based upon the extracted data object failing to satisfy the one or more of the user-defined rules.

In step 1040, in response to detecting the anomalous data behavior, the computer system prevents the network traffic corresponding to the anomalous data behavior from being communicated via the computing network.

Figure 11:
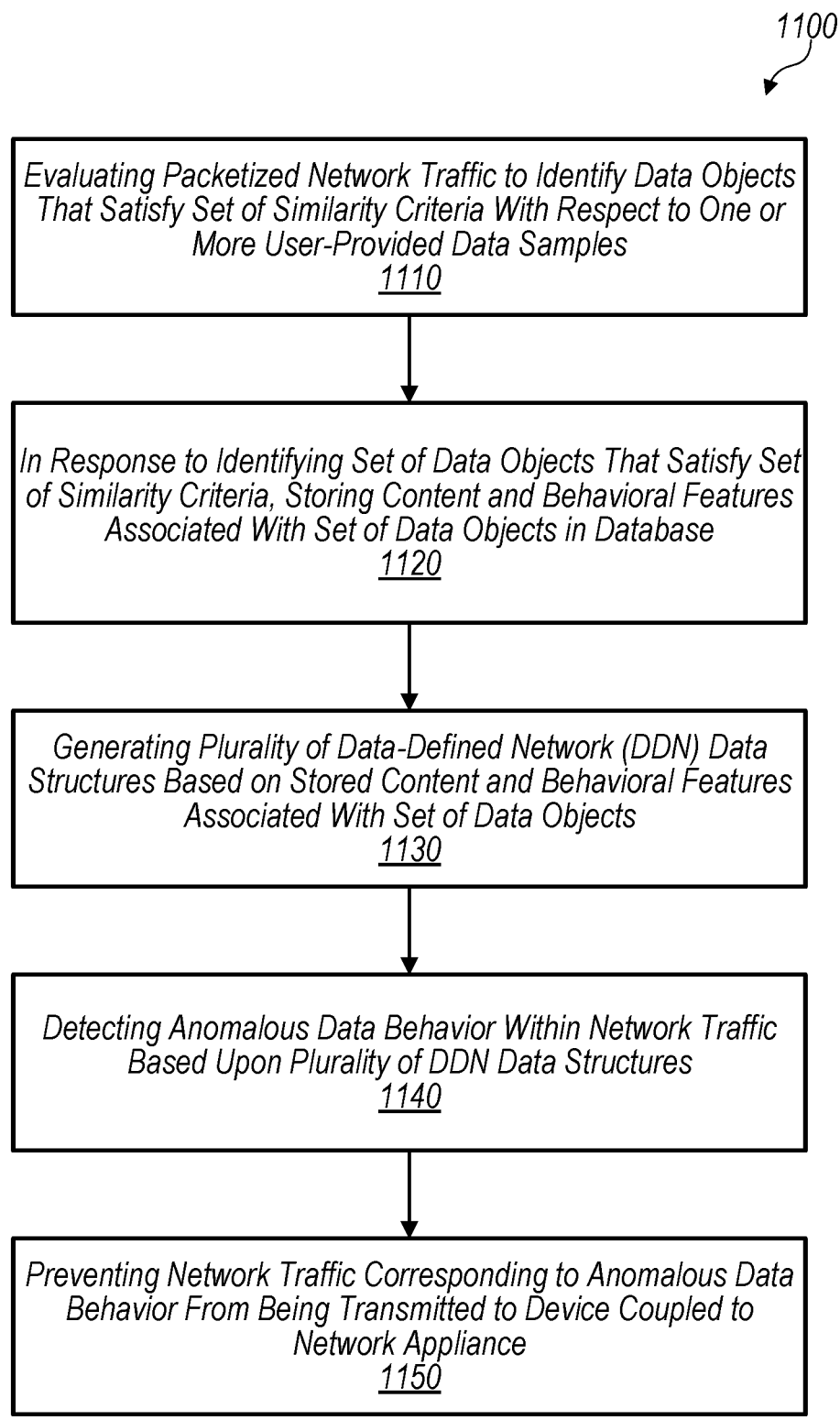

Turning now to FIG. 11, a flow diagram of a method 1100 is shown. Method 1100 is one embodiment of a method performed by a computer system (e.g., a network appliance 120) to manage data. The computer system may include a plurality of network ports configured to communicate packetized network traffic, one or more processors configured to route the packetized network traffic among the plurality of network ports; and a memory that stores program instructions executable by the one or more processors to perform method 1100. The computer system may be a network switch or a network router. In some embodiments, method 1100 includes additional steps such as implementing a firewall (e.g., firewall 130) that prevents network traffic from being transmitted to a device coupled to the network appliance based on that network traffic failing to satisfy one or more port-based rules.

Method 1100 begins in step 1110 with the computer system evaluating packetized network traffic (e.g., intra-network traffic 115) to identify data objects (e.g., data objects 335) that satisfy a set of similarity criteria with respect to one or more user-provided data samples (e.g., data samples 305). Determining that a given one of the set of data objects satisfies the set of similarity criteria may comprise generating a data object hash value (e.g., root hash value 337) of the given data object and determining that the data object hash value matches a given root hash value stored in a database, which may store one or more root hash values respectively generated from one or more user-provided data samples.

In step 1120, in response to identifying a set of data objects that satisfy the set of similarity criteria, the computer system stores content and behavioral features (e.g., behavioral features 345) associated with the set of data objects in a database.

In step 1130, the computer system generates a plurality of data-defined network (DDN) data structures (e.g., DDN data structures 225) based on the stored content and behavioral features associated with the set of data objects. A given one of the plurality of DDN data structures may include a content class (e.g., content class 330) and one or more behavioral classes (e.g., behavioral classes 340). The content class may be indicative of one or more of the set of data objects that have been grouped based on the one or more data objects having a set of similar content. The one or more behavioral classes may indicate baseline network behavior of the one or more data objects within the content class as determined from evaluation of the network traffic.

In step 1140, the computer system detects, using content and behavioral classes of the plurality of DDN data structures, anomalous data behavior within network traffic. Detecting anomalous data behavior within network traffic based upon the plurality of DDN data structures may comprise: (1) identifying an extracted data object and one or more behavioral features associated with the extracted data object from network traffic and (2) evaluating the extracted data object with respect to a content class and one or more behavioral classes of one of the plurality of DDN data structures. Determining that the extracted data object exhibits anomalous behavior may be based upon a machine learning content classification indicating that the content of the extracted data object differs from expected content.

In step 1150, the computer system prevents the network traffic corresponding to the anomalous data behavior from being transmitted to a device coupled to the network appliance.

An example use case for the techniques discussed above is presented here. It is noted that this use case is merely an example subject to numerous variations in implementation.

Many organizations have sensitive data that has a long shelf life. This data is usually formatted as structured files and stored in a local storage or in the cloud. Such files are often downloaded, accessed, and shared among the employees of the organization or sometimes with entities outside of the organization. Accordingly, it may be desirable to track the use of those files and ensure that they are handled correctly.

DDN system 140 may provide a data management solution that utilizes unsupervised machine learning to learn about data objects 335 and their behavioral features 345. By doing that, DDN system 140 may help businesses to continuously discover sensitive data usage inside their organizations, discover misuse of that sensitive data, and prevent data leakage caused by, e.g., an intentional attack or unintended misuse.

As described above, a DDN system 140 may learn about the sensitive data usage inside a customer's network environment by analyzing a set of data samples 305 and then continuing to discover the data usage and time series data updates inside the customer's networks by using a piecewise hashing algorithm or a content classification model 360. While new data is being discovered, DDN system 140 may continue to learn the usage behavior of the data through the machine learning models. Once the data use behaviors are identified, DDN system 140 may provide the protection to the sensitive data, by detecting and intercepting anomalous network traffic. The DDN architecture described above may facilitate the decoupling of data tracking and protection functions from underlying network infrastructure and further allow continuing protection of data while the underlying network infrastructure is changing.

Inside an enterprise, there are typically records of PII or sensitive personal information (SPI), e.g., of employees and customers. Such information may include, for example, address and phone number information, Social Security numbers, banking information, etc. Usually, records of this type of information are created in enterprise data storage when the customer or employee initially associates with the enterprise, although it could be created or updated at any time during the business relationship. PII/SPI-based records are normally shared by a number of different enterprise applications (e.g., Zendesk, Workday, other types of customer analytics systems or customer relationship management systems) and may be stored inside plain text files, databases, unstructured big data records, or other types of storage across the on-premise file systems or in cloud storage.

Accordingly, a DDN system 140 may classify the PII/SPI data objects 335 into DDN data structures 225 based on the observed data usage behavior. This can enable enterprise users to gain deep visibility into their PII/SPI data usage. The DDN data structures 225, along with other system 140 features such as user interface 520, may assist users in identifying PII/SPI data that may be improperly stored or used, to measure data privacy risk, to verify regulatory compliance, and to learn data relationships across data stores 111. DDN system 140 may continually refine the PII/SPI data usage behavior benchmark based on unsupervised machine learning models (e.g., models 227). Once an accurate behavioral benchmark is established, the enforcement workflow may help customers to control and protect the PII/SPI data from misuse and malicious accesses.

Figure 12:
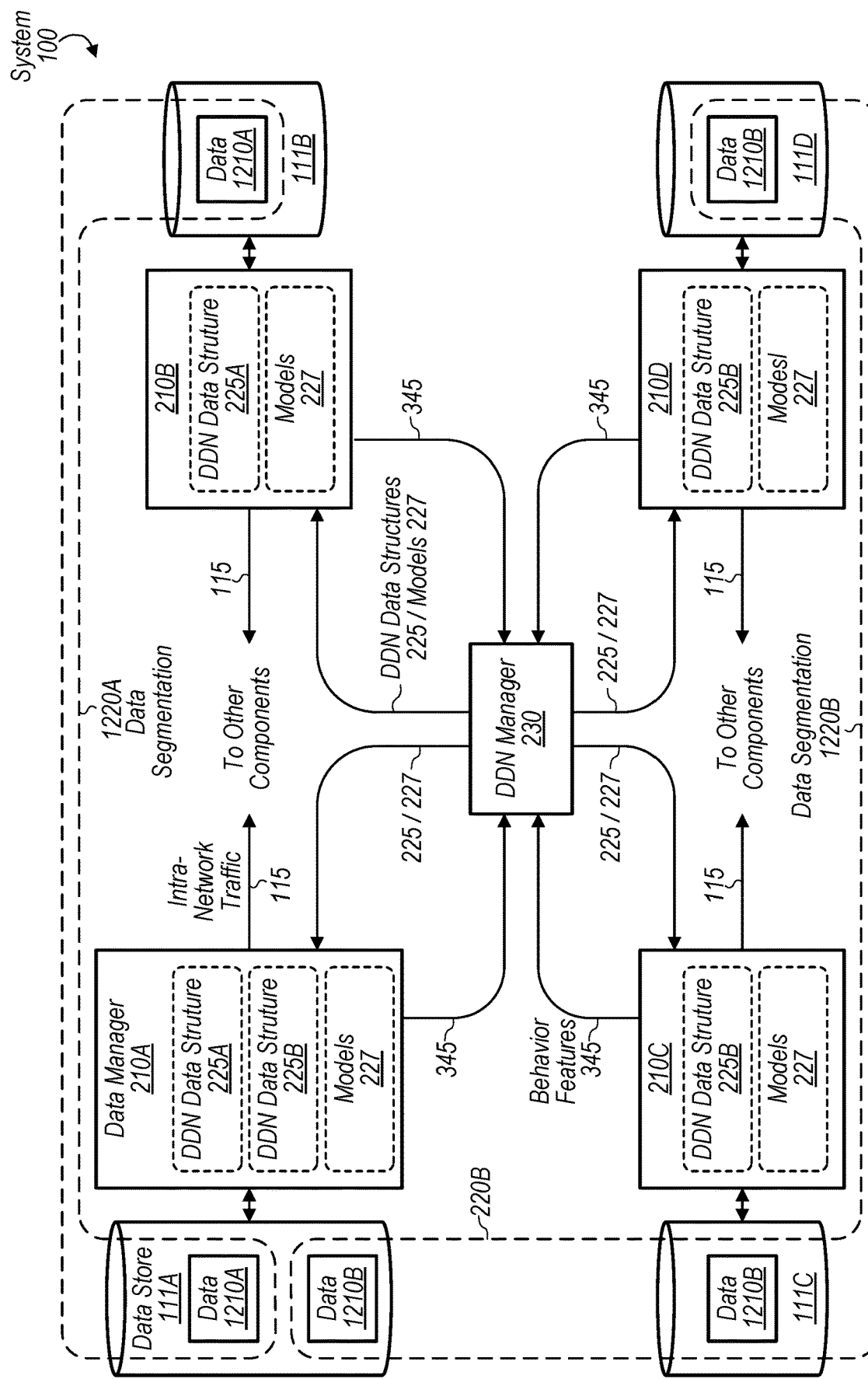
FIG. 12 is a block diagram illustrating example elements of data segmentations, according to some embodiments.

Turning now to FIG. 12, a block diagram depicting example data-based segmentations of a system 100. In the illustrated embodiment, system 100 includes data stores 111A-D, data managers 210A-D, and a DDN manager 230. As further illustrated, a data segmentation 1220A includes data 1210A maintained in data stores 111A and 111B, and a data segmentation 1220B includes data 1210B maintained in data stores 111A, 111C, and 111D. Data 1210A and 1210B may include various data objects 335 that may be used to build DDN data structures 225. Also as illustrated, data managers 210A and 210B include DDN data structure 225A and models 227, and data managers 210A, 210C, and 210D include DDN data structure 225B and models 227. In some embodiments, system 100 may be implemented differently than shown. As an example, data stores 111A-D may include different data 1210 than shown.

As mentioned earlier, the various techniques discussed in the present disclosure may be used for implementing data-based segmentation. For the sake of context, a small amount of background information about the general concept of segmentation may be useful. Many large-scale systems (or even single computer systems) include a firewall that implements a defensive perimeter around the entire system. The firewall aims to prevent malicious attacks originating from outside a system from affecting the system; however, once an attack breaches the firewall, the firewall may then be ineffective to contain the attack internally. That is, a malicious virus, for example, may move unopposed through the various systems within a large-scale system once it has passed through the firewall that protects the large-scale system.

Some individuals have turned to implementing segmentation-based concepts in which internal perimeters are built around portions of a system that protect those portions from other portions of the same system. By segmenting a system into different portions, a second layer of protection is built that can protect the system even when the firewall fails. A well-known form of segmentation is network-based segmentation. In a very traditional large-scale system, most or all of the servers and workstations of the large-scale system were located on the same local area network. This, however, allowed for a malicious actor such as malware to pivot from one system to another fairly easily. To help resolve this security issue, servers and/or workstations were segmented by physically or virtually locating those systems on different networks. As an example, servers that handle financial transactions may be located on one virtual network while servers that handle website requests may be located on another virtual network. Accordingly, if a malicious actor successfully infiltrated the virtual network of the website servers, the actor may not be able to infiltrate the virtual network of the financial servers as it can neither see nor reach the financial servers from the former virtual network. Thus, network-based segmentation allows for a second layer of protection by segmenting the internal components of a system into different networks.

Network-based segmentation (and the other known forms of segmentation), however, has drawbacks. For example, network-based segmentation suffers from scalability issues that occur when increasing the numbers of servers of a system as the restructuring of the physical connections to accommodate new servers can be overly burdensome. Accordingly, it may be desirable to perform segmentation in a way that overcomes some or all of the downsides of the currently known forms of segmentation.

The various techniques discussed in the present disclosure may be used to implement data-based segmentation in which logical perimeters are built based on and around data. Such perimeters may serve to protect data (e.g., data objects 335 in data 1210A or 1210B) from malicious attacks or unintentional misuses (for example, use of personal data that would contravene governmental privacy regulations or company policies). In contrast to the network-based segmentation where systems are segmented by placing them on different networks, data-based segmentation, in various embodiments, segments data by using DDN data structures 225 (which may include protection policies discussed below) and models 227 to manage access to data. In order to accomplish this, in some embodiments, data managers 210 are instantiated in logical proximity to data such as by being hosted on the same hypervisor as, for example, a database server that manages requests for data. Accordingly, a data manager 210 may monitor network traffic in/out of the hypervisor and detect abnormal use of data based on DDN data structures 225 and models 227 that have been pushed to that data manager by a DDN manager 230. In various cases, the logical perimeters that are built around particular data may be independent of the physical infrastructure that stores that data. As shown for example, data segmentation 1220A is built around data 1210A stored at different data stores 111 (which may be different physical storage drives that are associated with different networks).

The process for building a data segmentation 1220 may start, in various embodiments, with the learning phase/workflow explained earlier. Accordingly, a user may initially identify types of data (e.g., by providing or identifying data samples 305) that the user wishes to build a data segmentation 1220 around. For example, a user may ask DDN system 140 (which may include data managers 210A-D and DDN manager 230) to create a logical perimeter around personal financial information (PFI). For the sake of the following discussion, assume that data 1210A includes PFI. Accordingly, a user may initially identify PFI in data 1210A at data store 111A. DDN system 140 may analyze data 1210A as discussed earlier to identify other locations in system 100 where the same type of data is stored. DDN system 140 may learn of data 1210A at data store 111B.

Data managers 210A and 210B of DDN system 140 may monitor network traffic that enters and leaves data stores 111A and 111B, respectively, in order to collect information about the content and behavioral features 345 of data objects 335 having the relevant data for which the data segmentation 1220 is being built. As an example, data managers 210A and 210B may each identify, for their data store 111, the applications that are requesting data objects that have PFI. The information collected by data managers 210 (which may include behavioral features 345), in various embodiments, is sent to DDN manager 230 for further analysis. As discussed earlier, DDN manager 230 may generate DDN data structures 225 and train models 227 based on the information collected by data managers 210.

In some embodiments, when generating DDN data structures 225 and training models 227, DDN manager 230 may analyze differences in the information collected by different data managers 210. As an example, the information collected by data manager 210A may identify a particular automated teller machine (ATM) application that accesses data 1210A in data store 111A while the information collected by data manager 210B may identify a particular online banking application that accesses data 1210A in data store 111B. Accordingly, DDN manager 230 may determine that the baseline behavior exhibited by data 1210A should include being accessed by both the ATM and online banking applications. That is, DDN manager 230 may consolidate the information that is collected by different data managers 210 to generate DDN data structures 225 and to train models 227 that incorporate the various, different aspects found in that information.

After generating DDN data structures 225 and training models 227, data manager 230 may push portions or all of that information to the appropriate data managers 210. This may include storing such information in data stores 220. Continuing the example from above, data manager 230 may send DDN data structures and models 227 to data managers 210A and 210B to allow for those data managers to protect data 1210A. In some embodiments, a set of protection policies may be derived by DDN manager 230 based on DDN data structures 225 and models 227. Such protection policies might, for example, include:

Bank-customer-PFI-access-group has (online-banking-app, atm-app)

Bank-customer-PFI allows access from bank-customer-pii-access-group

These protection policies may indicate that for the places where PFI data is located (e.g., data stores 111A and 111B), only two applications (i.e., the ATM and online banking applications) are allowed to access that PFI data, access attempts by other applications will be prevented. In various embodiments, data manager 210 sends the protection policies (which may be a part of a DDN data structure 225 and may include user-defined policies 350) and models 227 to data managers 210. In some cases, such information may be sent to only data managers 210 that are monitoring network traffic of data stores 111 that include the relevant data around which a data segmentation 1220 is built. Those data managers may then enforce those policies on any traffic that travels through them. Thus, a data segmentation 1220 may be built around data. That is, by dropping network traffic that deviates from the baseline behavior observed for a particular type of data, a perimeter may effectively be built around that type of data. Furthermore, by distributing DDN data structures 225 and models 227 associated with a particular type of data to the enforcement points throughout system 100 that are relevant to that type of data, that type of data may become segmented from other components including other data, even when that type of data is distributed throughout system 100.

In various embodiments, multiple data segmentations 1220 may be built for the same system 100. As shown in FIG. 12 for example, system 100 includes a data segmentation 1220A (which contains data 1210A) and a data segmentation 1220B (which contains data 1210B). In various cases, data segmentations 1220 may each be associated with DDN data structures 225 and models 227 that are different from other data segmentations 1220. Accordingly, as shown by data manager 210A in FIG. 12, a data manager 210 may store different DDN data structures 225 (and/or models 227). In various cases, when a particular data segmentation 1220 (e.g., data segmentation 1220A) is compromised, other data segmentations 1220 (e.g., data segmentation 1220B) may remain intact. For example, if a malicious actor gains access to data 1210A stored at data store 111A, the malicious actor may not gain access to data 1210B that is stored at data store 111A since it may be segmented separately from data 1210A.

In some embodiments, DDN system 140 calculates an impact of distributing a certain DDN data structure 225 (or a portion of which that corresponds to the protection policies noted above) and/or model 227 to data managers 210. For example, PFI may be co-located with some other type of data (e.g., personal medical information) on the same data store 111. Accordingly, in some cases, a policy that limits access to the PFI to a list of systems may inadvertently limit access to the personal medical information. That is, the data store 111 may communicate with only systems on the list; all other data accesses by systems not on the list may be rejected and as such, a system that is not on the list that attempts to access the personal medical information, but not the PFI may still be rejected. This type of impact may be presented to a user so that the user may, for example, adjust the policy.

Implementing data-based segmentation may be advantageous over prior segmentation approaches as data-based segmentation may allow for easier scalability. For example, because data usage is relatively static when compared to workload usage inside of a modern data center, a user may need only a relatively small amount of data managers, which might not need to be moved between host systems very often. Moreover, segmenting systems into various networks while ensuring that those systems have access to the appropriate communication channels (as done in network-based segmentation) can be difficult and time consuming. In contrast, data-based segmentation does not have the issues of moving systems around to different networks, especially when new systems are constantly being added or removed.

Figure 13A:
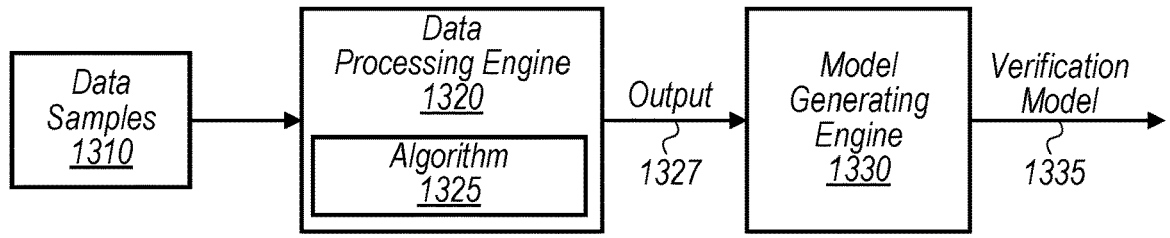
FIGS. 13A and 13B are block diagrams illustrating example elements of a setup phase that facilitates sharing among computer systems, according to some embodiments.

Turning now to FIG. 13A, a block diagram of various components of a setup phase 1300 is shown. Such components may be implemented via hardware or a combination of hardware and software routines. In the illustrated embodiment, setup phase 1300 includes data samples 1310, a data processing engine 1320, and a model generating engine 1330. As further shown, data processing engine 1320 includes an algorithm 1325. In some embodiments, setup phase 1300 may be implemented differently than shown, an example of which is discussed with respect to FIG. 13B.

One particular situation in which data is more prone to security-based issues is when data is shared between different organizations since data leakage, whether it is intentional or unintentional, happens often. Such data leakage can happen because the data provider does not have any effective tools to ensure that the data consumer is handling the data correctly (e.g., in accordance with data usage policies that are set out by the data provider). For example, a data provider cannot control what portions of the data are shared by the data consumer with other organizations. If the data consumer were to instead provide their data processing algorithm to the data provider for processing data at the data provider's system (so that the data does not have to leave the data provider's system), then the data consumer has to be concerned about potentially losing intellectual property as their data processing algorithm is exposed to the data provider. Accordingly, with limited trust between the data provider and the data consumer and with limited visibility into the algorithm being used and how the data is being used, providing data to the data consumer or providing the data processing algorithm to the data provider are both risky propositions.

The present disclosure describes techniques for implementing an architecture in which data is shared among systems in a manner that overcomes some or all of the downsides of the prior approaches. In various embodiments described below, a data provider's system provides encrypted data to a data consumer's system that processes a decrypted form of the data within a verification environment running at the data consumer's system. If an output generated based on the decrypted form complies with data usage policies defined by the data provider, then that output may be permitted to be sent outside the verification environment. In some embodiments, if the verification environment detects abnormal behavior at the data consumer's system, then the verification environment prevents subsequent processing of the data provider's data by the data consumer's system. In various embodiments, sharing data from the data provider's system to the data consumer's system occurs in two phases: a setup phase and a sharing phase.

In the setup phase, a data provider may present (e.g., by uploading at a sharing service's system) dataset information to a data consumer that describes datasets that the data provider is willing to share. If the data consumer expresses interest in some dataset, then the data provider and the data consumer may define sharing information that identifies the dataset to be shared, the algorithm(s) to be executed for processing data of that dataset, and the data usage policies that control how that data may be handled. In various embodiments, as part of the setup phase, the data provider's system may provide data samples from the dataset to the data consumer's system. The data consumer's system may then execute the algorithms (identified by the sharing information) to process the data samples in order to produce an output that corresponds to the data samples. While the algorithms are executed, input and output (I/O) operations that occur at the data consumer's system may be tracked. The output and the tracked I/O operations may then be provided back to the data provider's system for review by the data provider to ensure that they comply with the data provider's data usage policies. If the output and I/O operations are compliant, then, in various embodiments, the output, the I/O operations, the data samples, and/or the data usage policies are used by the sharing service's system to train a verification model. In some embodiments, the execution flow of the data consumer's algorithms (e.g., the order in which the algorithm's methods are called) may be tracked and used to further train the verification model. After being trained, the verification model may be used to ensure that future output from the algorithms is compliant and the data consumer's system does not exhibit any abnormal behavior (e.g., I/O operations that are not allowed by the data provider's data usage policies) with respect to the behavior that may be observed during the setup phase. In various embodiments, the data samples, the output, and the verification model are associated with the sharing information.

In the sharing phase, the data provider's system may initially encrypt blocks of data for the dataset and then may send the encrypted data to the data consumer's system for processing by the data consumer's algorithms. The data consumer's system may, in various embodiments, execute a set of software routines (which may be provided by the sharing service's system, in some cases) to instantiate a verification environment in which the data consumer's algorithms may be executed to process the data provider's data. While the data provider's data is outside of the verification environment but at the data consumer's system, it may remain encrypted; however, within the verification environment, that data may be in a decrypted form that can be processed by the data consumer's algorithms.

In some embodiments, the verification environment serves as an intermediator between the data consumer's algorithms and entities outside the verification environment. Accordingly, to process data, the algorithms executing in the verification environment may request from the verification environment blocks of the data provider's data. The verification environment may retrieve a set of blocks of the data from a local storage and a set of corresponding decryption keys from the data provider's system. The verification environment may then decrypt the set of data blocks and provide them to the algorithms for processing, which may result in an output from the algorithms. In various embodiments, before an output from the algorithms can be sent outside the verification environment, it may be verified by the verification environment using the verification model that was trained during the setup phase. If the output complies with the data usage policies (as indicated by the verification model), then the output may be written to a location outside the verification environment; otherwise, the verification environment may notify the data provider's system that abnormal behavior (e.g., the generation of the prohibited output, the performance of prohibited network and/or disk I/O operations, etc.) occurred at the data consumer's system. In some instances, if the algorithms attempt to write data to a location that is outside the verification environment by circumventing the verification environment, then the verification environment may report this abnormal behavior to the data provider's system. In response to being notified that abnormal behavior has occurred at the data consumer's system, the data provider's system may stop sending decryption keys to the data consumer's system for decrypting blocks of the data provider's data. Accordingly, the data consumer may be unable to continue processing the data.

The data sharing architecture presented in the present disclosure may be advantageous as it allows for a data consumer to process data using their own algorithms while also affording a data provider with the ability to control how that data is handled outside of the data provider's system. That is, the verification environment and the verification model may provide assurance to the data provider that their data is secured by preventing information that is non-compliant from leaving the verification environment. The data consumer may have assurance that their algorithms will not be stolen as such algorithms may not be available outside of the verification environment. Thus, the data provider may share data with the data consumer in a manner that allows the data provider to protect their data and the data consumer to protect their algorithms.

Setup phase 1300, in various embodiments, is a phase during which a data provider and a data consumer establish a framework for sharing data from the data provider's system to the data consumer's system. Accordingly, sharing information may be generated that enables that framework. In various embodiments, such information may identify a dataset to be shared, an algorithm 1325 that can be used to process data in that dataset, and/or a set of data usage policies for controlling management of that data, such policies may be defined by the data provider in some cases. A verification model 1335 may also be included in the sharing information and may be used to verify that the output generated by algorithm 1325 complies with the set of data usage policies. In various embodiments, verification model 1335 is trained based on data samples 1310, outputs 1327 from data processing engine 1320, and the behavioral features that are observed at the data consumer's system.

Data samples 1310, in various embodiments, are samples of data from a dataset that may be shared from a data provider's system to a data consumer's system. The datasets that may be shared may include various fields that store user activity information (e.g., purchases made by a user), personal information (e.g., first and last names), enterprise information (e.g., business workflows), system information (e.g., network resources), financial information (e.g., account balances), and/or other types of information. Consider an example in which a dataset identifies user personal information such as first and last names, addresses, personal preferences, Social Security numbers, etc. In such an example, a data sample 1310 may specify a particular first and last name, a particular address, etc. In various embodiments, data samples 1310 may be publicly available so that an entity may, for example, download those data samples and configure their algorithm 1325 to process those data samples. Because the data provider may not have control over the usage of data samples 1310, such data samples may include randomly generated values (or values that the data provider is not worried about being misused). In various embodiments, data samples 1310 are fed into data processing engine 1320. This may be done to test algorithm 1325 and to assist in generating verification model 1335.

Data processing engine 1320, in various embodiments, generates outputs based on data shared by a data provider's system. As shown, data processing engine 1320 includes algorithm 1325, which may process the shared data, including data samples 1310. Algorithm 1325, in various embodiments, is a set of software routines (which may be written by a data consumer) that are executable to extract or derive certain information from shared data. For example, an algorithm 1325 may be executed to process user profile data in order to output the preferences of users for certain products. As another example, an algorithm 1325 may be used to calculate the financial status of a user based on their financial history, which may be provided by the data provider's system to the data consumer's system. While only one algorithm 1325 is depicted in FIG. 13A, in various embodiments, multiple algorithms 1325 may be used.

As part of setup phase 1300, data samples 1310 may be provided to data processing engine 1320 to produce an output 1327. Output 1327, in various embodiments, is information that a data consumer (or, in some cases, a data provider) wishes to obtain from the data shared by the data provider's system. Output 1327 may, in various cases, be the result of executing algorithm 1325 on data samples 1310. As explained above, the output from algorithm 1325 may be verified using a verification model 1335; however, in setup phase 1300, output from algorithm 1325 may be used to train a verification model 1335. Accordingly, before verification model 1335 is trained based on output 1327, output 1327 may be reviewed by the data provider (or another entity) to ensure that such an output is compliant with the data usage policies set out by the data provider. For example, a data provider may not want certain information such as Social Security numbers to be identifiable from output 1327. Accordingly, output 1327 may thus be reviewed to ensure that it does not include such information. In some cases, after an output 1327 is identified to represent a valid/permissible output, it may be fed into model generating engine 1330.

As explained further below, behavioral features (e.g., input and output operations) may be collected from the system executing data processing engine 1320. For example, the locations to which algorithm 1325 writes data may be recorded. In various embodiments, the behavioral features may be sent with output 1327 to be reviewed by the data provider (or a third party). In some cases, other behavioral features such as the execution flow of algorithm 1325 may not be sent to the data provider, but instead provided (without being reviewed) to the system executing model generating engine 1330 for training verification model 1335.

Model generating engine 1330, in various embodiments, generates or trains verification models 1335 that may be used to verify the output from algorithm 1325. In various embodiments, verification model 1335 is trained using artificial intelligence algorithms such as deep learning and/or machine learning-based algorithms that may receive output 1327 and the corresponding data samples 1310 as inputs. Accordingly, verification model 1335 may be trained based on the association between output 1327 and the corresponding data samples 1310, such that verification model 1335 may be used to determine whether subsequent output matches the output expected for the data used to derive the subsequent output. Verification model 1335 may also be trained, based on the collected behavioral features, to detect abnormal behavior that might occur at the data consumer's system. After training, verification model 1335 may be included in the sharing information and used to verify subsequent output of algorithm 1325 that is based on data from the dataset being shared.

Figure 13B:
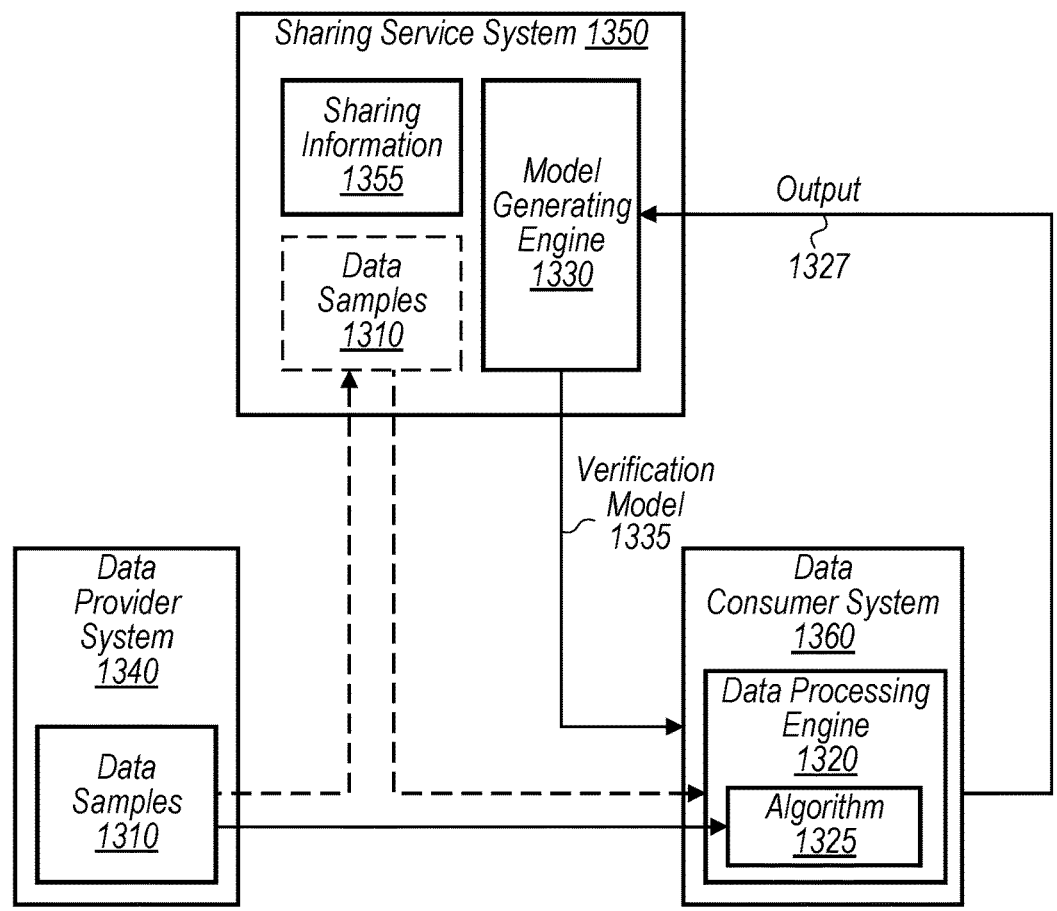

Turning now to FIG. 13B, a block diagram of various components of a setup phase 1300 is shown. In the illustrated embodiment, setup phase 1300 includes a data provider system 1340, a sharing service system 1350, and a data consumer system 1360. Also as shown, data provider system 1340 includes data samples 1310, sharing service system 1350 includes model generating engine 1330 and sharing information 1355, and data consumer system 1360 includes data processing engine 1320. In some embodiments, setup phase 1300 may be implemented differently than shown. For example, sharing service system 1350 may not be included in setup phase 1300; instead, data provider system 1340 may include model generating engine 1330.

In various embodiments such as the one illustrated in FIG. 13B, setup phase 1300 involves three parties: a data provider, a data consumer, and a sharing service. The data provider refers to an entity that shares data and the data consumer refers to an entity that processes the data in some manner. The sharing service may facilitate the sharing environment between the data provider and the data consumer by at least providing mechanisms for securing the exchange of data and the managing of that data while it is outside of data provider system 1340. In some embodiments, sharing service system 1350 provides a secured gateway software appliance (not shown) that may be downloaded and installed at data provider system 1340 and data consumer system 1360 (after registering as an organization or user at sharing service system 1350, in some cases). The secured gateway software appliance, in various embodiments, enables a computer system (e.g., data provider system 1340 or data consumer system 1360) to securely communicate with a set of other computer systems. Accordingly, the secured gateway software appliance that is installed at systems 1340 and 1360 may enable those systems to securely communicate information between themselves. In some cases, the set of computer systems may not identify systems (e.g., sharing service system 1350) other than systems 1340 and 1360. Accordingly, the secured gateway software appliance that is installed at data provider system 1340 may not communicate with any other system than data consumer system 1360 (and vice versa). This may, in some instances, prevent the data consumer from leaking confidential information (e.g., the decryption keys) provided by the data provider. The secured gateway software appliance may further maintain sharing information 1355 and may instantiate a verification environment (discussed later) in which to execute data processing engine 1320.

After the secured gateway software appliance has been installed (or, in some cases, as an independent event), data provider system 1340 may identify the various types of data that are stored by data provider system 1340. In order to identify the various types of data, data provider system 1340 may discover locations where data is maintained and build data-defined network (DDN) data structures based on the data at those locations. As an example, data provider system 1340 may receive samples of data (e.g., personal information and financial information) from a data provider that the data provider wishes to share with a data consumer. Data provider system 1340 may then use those data samples to identify locations where the same or similar data is stored. The data samples and newly located data may be used to build a DDN data structure that identifies the data and its locations. In some embodiments, data provider system 1340 creates a catalog based on the DDN data structures that it built. The catalog may identify the datasets that data provider system 1340 may share with a data consumer. Accordingly, data provider system 1340 may share the catalog with a data consumer to allow that data consumer to choose which datasets that the data consumer wants to receive. In some embodiments, data provider system 1340 publishes or uploads the catalog to sharing service system 1350, which may share the catalog with a data consumer. In some instances, data provider system 1340 may also publish data samples 1310 for the published datasets, although data provider system 1340 may, in other cases, provide data samples 1310 directly to data consumer system 1360 via the installed secured gateway software appliance. For example, data provider system 1340 may upload the catalog that indicates that the data provider is willing to share users' financial information and may include data samples 1310 of specific financial information.

When a data consumer expresses interest in a particular dataset, the data consumer and the data provider may negotiate on the details of how the data from the particular dataset may be used. This may include identifying what algorithm 1325 will be used to process the data and the data usage policies that facilitate control over how the data (which may include the outputs from algorithm 1325) may be used. Examples of data usage policies include, but are not limited to, policies defining the time period in which the data may be accessed, who (e.g., what users) can execute algorithm 1325, disk/network I/O permissions, output format, and privacy data that is to be filtered out of outputs from algorithm 1325. In some embodiments, data usage policies are expressed in a computer programming language. In various embodiments, the parties that are involved in the data sharing process, the dataset being shared, the particular algorithm 1325 being used, and/or the data usage policies are defined in sharing information 1355.

As part of setup phase 1300, data consumer system 1360 may retrieve data samples 1310 from sharing service system 1350 (or data provider system 1340 in some embodiments) for the dataset being shared. Algorithm 1325 may be customized to fit the data samples 1310 (i.e., made to be able to process them) and then tested using those data samples to ensure that it can process the types of data included in the dataset being shared. In order to test algorithm 1325, in various embodiments, data consumer system 1360 provides data processing engine 1320 to the installed secured gateway software appliance. Accordingly, the secured gateway software application may instantiate, at data consumer system 1360, a verification environment (discussed in greater detail below) in which to execute data processing engine 1320. Data samples 1310 may then be processed by algorithm 1325 to produce an output 1327 that may be provided to sharing service system 1350. In various cases, algorithm 1325 may be tested using the approaches (discussed in FIGS. 14A-D) that are actually used in the data sharing phase (expect without a verification model 1335 in various cases).

When testing algorithm 1325, the secured gateway software appliance (installed at data consumer system 1360) may monitor the behavior of data consumer system 1360 by monitoring various activities that occur at data consumer system 1360. In various cases, the secured gateway software appliance may learn the execution flow of algorithm 1325. In some embodiments, for example, algorithm 1325 may be run under a cluster-computing framework such as APACHE SPARK—data processing engine 1320 may implement APACHE SPARK. APACHE SPARK may generate directed acyclic graphs that describe the flow of execution of algorithm 1325. For example, the vertices of a directed acyclic graph may represent the resilient distributed datasets (i.e., data structures of APACHE SPARK, which are an immutable collection of objects) and the edges may represent operations (e.g., the methods defined in the program code associated with algorithms 1325) to be applied on the resilient distributed datasets. Accordingly, traversing through a directed acyclic graph generated by APACHE SPARK may represent a flow through the execution of algorithm 1325. In various cases, when testing algorithm 1325, multiple directed acyclic graphs may be generated that may include static portions that do not change between executions and dynamic portions that do change. The secured gateway software appliance may also observe disk and network I/O operations that occur when testing algorithm 1325.

Subsequent to testing algorithm 1325 based on data samples 1310, data consumer system 1360 may generate a digital signature of algorithm 1325 and output 1327 from algorithm 1325 (e.g., by hashing them). In various embodiments, data consumer system 1360 sends output 1327, the behavioral information (e.g., the directed acyclic graphs and I/O operations), and the two digital signatures to service provide system 1350 to supplement sharing information 1355 and to assist in training verification model 1335. In some cases, output 1327 and/or the information about the I/O operations may be first routed to data provider system 1340 for review by the data provider to ensure that they comply with the data usage policies (which may define the acceptable I/O operations) set out by the data provider. Once output 1327 and the I/O operations have been reviewed and approved, then they may be provided to sharing service system 1350.

Based on data samples 1310, output 1327, the behavioral information, and the data usage policies specified by sharing information 1355, model generating engine 1330 of sharing service system 1350 may generate a verification model 1335. As mentioned earlier, verification model 1335 may, in part, be a modeling of the input and output data (e.g., data samples 1310 and output 1327) that ensures that future output of algorithm 1325 complies with the data usage policies. In various embodiments, verification model 1335 includes a behavioral-based verification aspect and/or a data-defined verification aspect. The behavioral-based verification aspect may involve ensuring that the verification environment (discussed in more detail below) in which algorithm 1325 is executed has not been compromised (e.g., the kernel has not been modified), ensuring that the execution flow of algorithm 1325 is not irregular relative to the execution flow learned during setup phase 1300, and ensuring that no I/O operations occur that are invalid with respect to the data usage policies defined in sharing information 1355. The data-defined verification aspect may involve the removal of sensitive data fields in the data and enforcement of the output file format and output size limitations. After verification model 1335 has been generated, it may be included in sharing information 1355.

Thereafter, in various embodiments, sharing information 1355 may be signed (e.g., using one or more cryptographic techniques) by data provider system 1340 and data consumer system 1360. Sharing information 1355 may be maintained in the secured gateway software application at systems 1340 and 1360, respectively. An example data sharing phase will now be discussed.

Figure 14A:
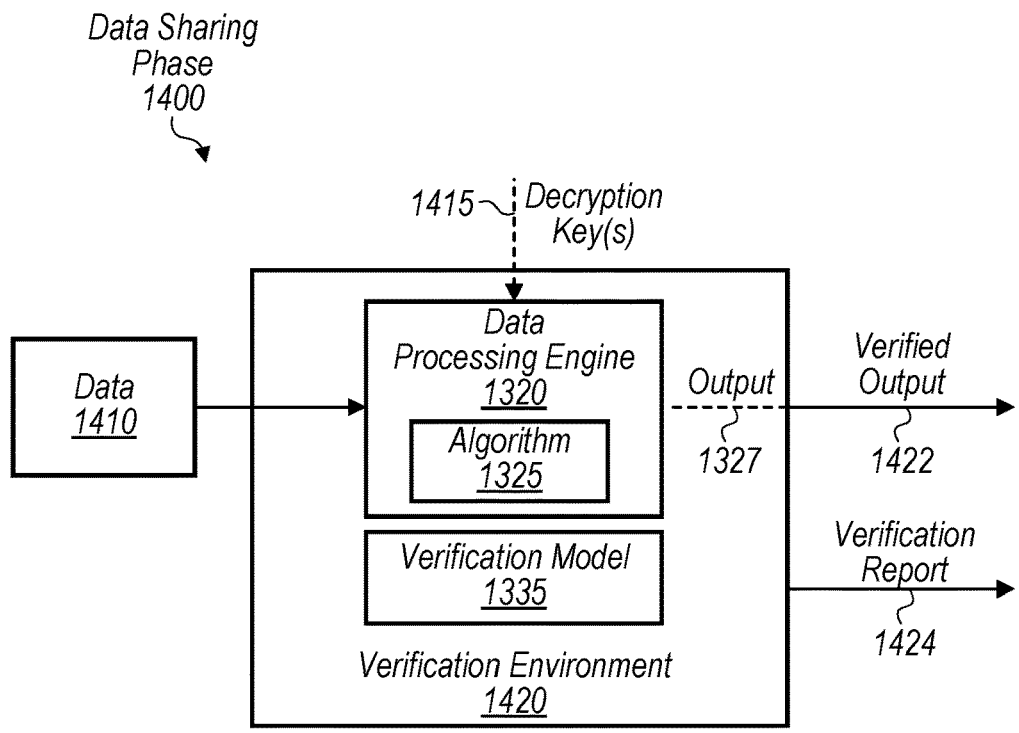
FIGS. 14A-14D are block diagrams illustrating example elements of a sharing phase where data is shared among computer systems, according to some embodiments.

Turning now to FIG. 14A, a block diagram of various components of a data sharing phase 1400 is shown. In the illustrated embodiment, data sharing phase 1400 includes data 1410 and a verification environment 1420. As further depicted, verification environment 1420 includes data processing engine 1320 (having algorithm 1325) and verification model 1335. Data sharing phase 1400, in some embodiments, may be implemented differently than shown. As illustrated in FIG. 14D for example, verification environment 1420 may be split across multiple systems.

Data sharing phase 1400, in various embodiments, is a phase in which the data provider shares data 1410 with a data consumer for processing by the data consumer's system. The data provider may progressively provide portions of data 1410 to the data consumer's system or may initially provide all of data 1410 to the data consumer's system before that data is subsequently processed. As an example, the data provider's system may enable the data consumer's system to process a first portion of data 1410 and then may verify the output from that processing (or receive an indication that the output has been verified) before enabling the data consumer's system to process a second portion of data 1410. In either case, the data provider may prevent the data consumer's system from continuing the processing of data 1410 if the data provider's system determines that the data consumer has deviated from the data usage policies specified in sharing information 1355.

Verification environment 1420, in various embodiments, is a software wrapper routine that "wraps around" data processing engine 1320 and monitors data processing engine 1320 for deviations from the data usage policies (referred to as "abnormal behavior") that are specified in sharing information 1355. Since verification environment 1420 wraps around data processing engine 1320, input/output that is directed to/from data processing engine 1320 may pass through verification environment 1420. Accordingly, when data processing engine 1320 attempts to write an output 1327 to another location, verification environment 1420 may verify that output 1327 to ensure compliance before allowing it to be written to the location (e.g., a storage device of the data consumer's system).

In some embodiments, verification environment 1420 may be a sandbox environment in which data processing engine 1320 is executed. Accordingly, verification environment 1420 may restrict what actions that data processing engine 1320 can perform while also controlling input and output into and out of the sandbox. In various cases, during setup phase 1300, verification environment 1420 may be modified/updated to support the architecture that is expected by data processing engine 1320—that is, to be able to create the environment in which data processing engine 1320 can even execute.

As illustrated in FIG. 14A, data 1410 passes through verification environment 1420 to data processing engine 1320. In various embodiments, data 1410 may be provided to data processing engine 1320 by invoking an application programming interface of verification environment 1420 that causes verification environment 1420 to provide data 1410 to data processing engine 1320. In some cases, the interface may be invoked by data processing engine 1320 itself when it wishes to process a portion or all of data 1410; in other cases, the interface may be invoked by another system such as the data provider's system. In some embodiments, while data 1410 is outside of the data provider's system, data 1410 may be in an encrypted format to protect it. Accordingly, when sending data 1410 to data processing engine 1320 for processing, verification environment 1420 may first decrypt the encrypted version of data 1410 in order to provide a decrypted version to data processing engine 1320. In order to decrypt data 1410, verification environment 1420 may obtain decryption keys 1415 that are usable to decrypt portions of data 1410—such decryption keys 1415 may be provided by the data provider's system. Accordingly, this may allow the data provider to control the data consumer's access to data 1410 as the data provider may continually provide keys 1415 to the data consumer's system for decrypting portions of data 1410 only while the data consumer's system is compliant with the data usage policies. If, for example, the data consumer's system exhibits abnormal behavior (e.g., the execution flow of algorithm 1325 has changed in a significant manner, an invalid I/O operation has been performed, etc.) with respect to some portion of data 1410, then the data provider's system may not provide a decryption key 1415 for decrypting a subsequent portion of data 1410.

Once data processing engine 1320 receives a decrypted portion of data 1410, the portion may be fed into algorithm 1325 to produce an output 1327. As mentioned above, when algorithm 1325 (or data processing engine 1320) attempts to write output 1327 to a location outside of data processing engine 1320, verification environment 1420 may verify that output to ensure that that output is compliant with the data usage policies specified in sharing information 1355. In some embodiments, verification environment 1420 verifies an output 1327 by determining whether that output falls within a certain class or matches an expected output 1327 indicated by verification model 1335 based on the portion of data 1410 that was fed into algorithm 1325. If an output 1327 is compliant, verification environment 1420 may write it (depicted as verified output 1422) to the location requested by data processing engine 1320; otherwise, that output may be discarded.

In various embodiments, verification environment 1420 may also monitor the activity of the data consumer's system for abnormal behavior. For example, verification environment 1420 may monitor I/O activity to determine if data processing engine 1320 is attempting to write an output 1327 outside of verification environment 1420 without that output being verified. In cases where abnormal behavior is detected, verification environment 1420 may report the behavior to the data provider's system (or another system). Accordingly, verification environment 1420 may send out a verification report 1424. Verification report 1424, in various embodiments, identifies whether an invalid output 1327 and/or abnormal behavior has been detected. In various cases, the data provider's system may decide to prevent data processing engine 1320 from processing additional portions of data 1410 based on verification report 1424.

Figure 14B:
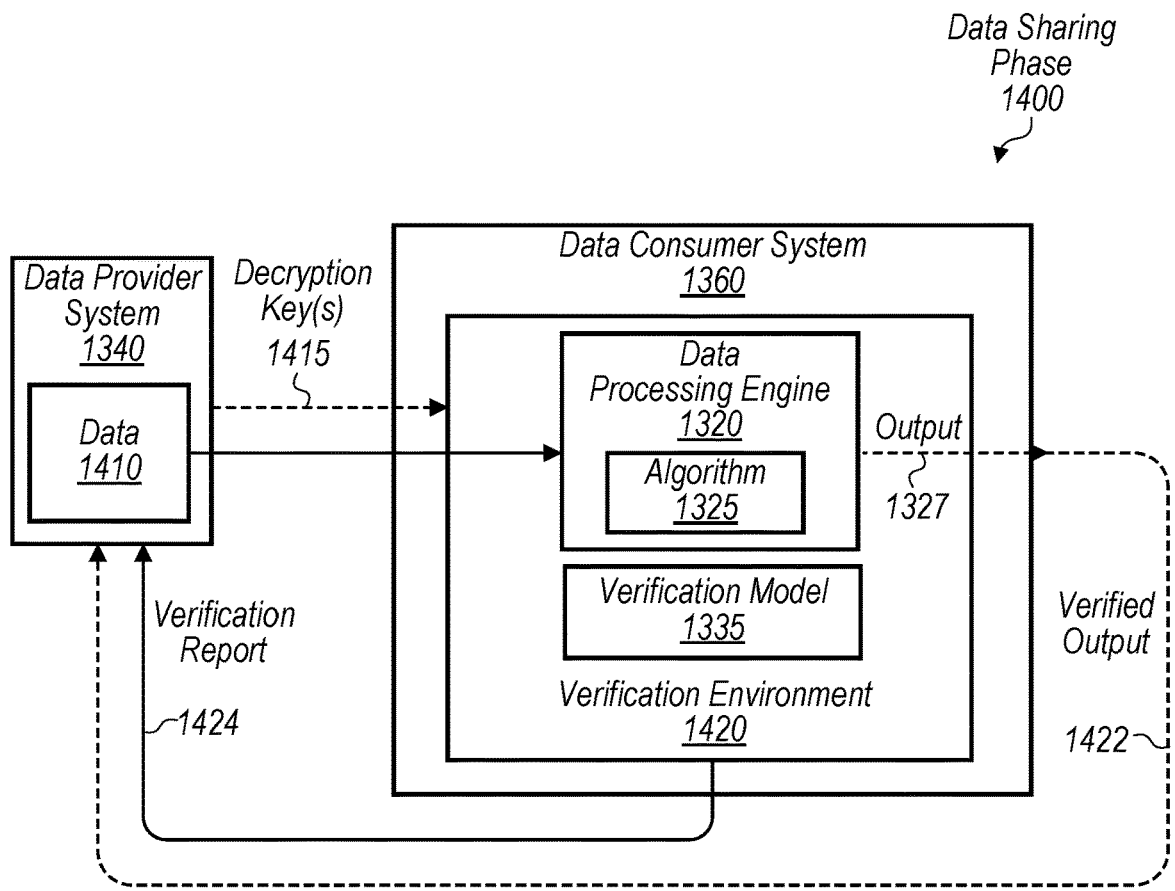

Turning now to FIG. 14B, a block diagram of various components of a data sharing phase 1400 is shown. In the illustrated embodiment, data sharing phase 1400 includes a data provider system 1340 and a data consumer system 1360. As illustrated, data provider system 1340 includes data 1410, and data consumer system 1360 includes a verification environment 1420 having a data processing engine 1320 and a verification model 1335. FIG. 14B illustrates an example layout of the various components discussed with respect to FIG. 14A. As shown, data provider system 1340 provides data 1410 and decryption keys 1415 to data consumer system 1360, and data consumer system 1360 provides verification report 1424 (and, in various cases, verified output 1422) to data provider system 1340.

Figure 14C:
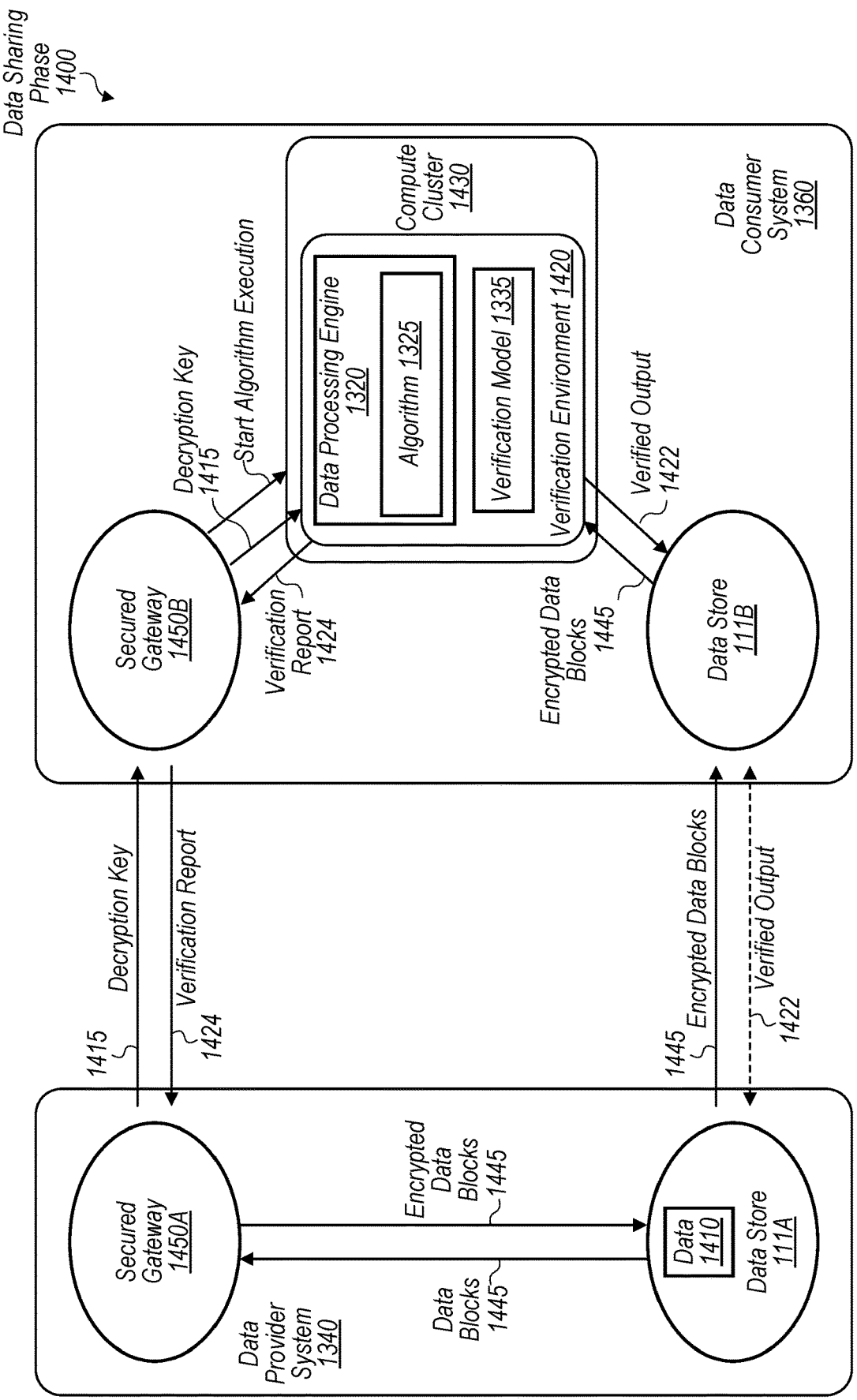
Figure 14D:
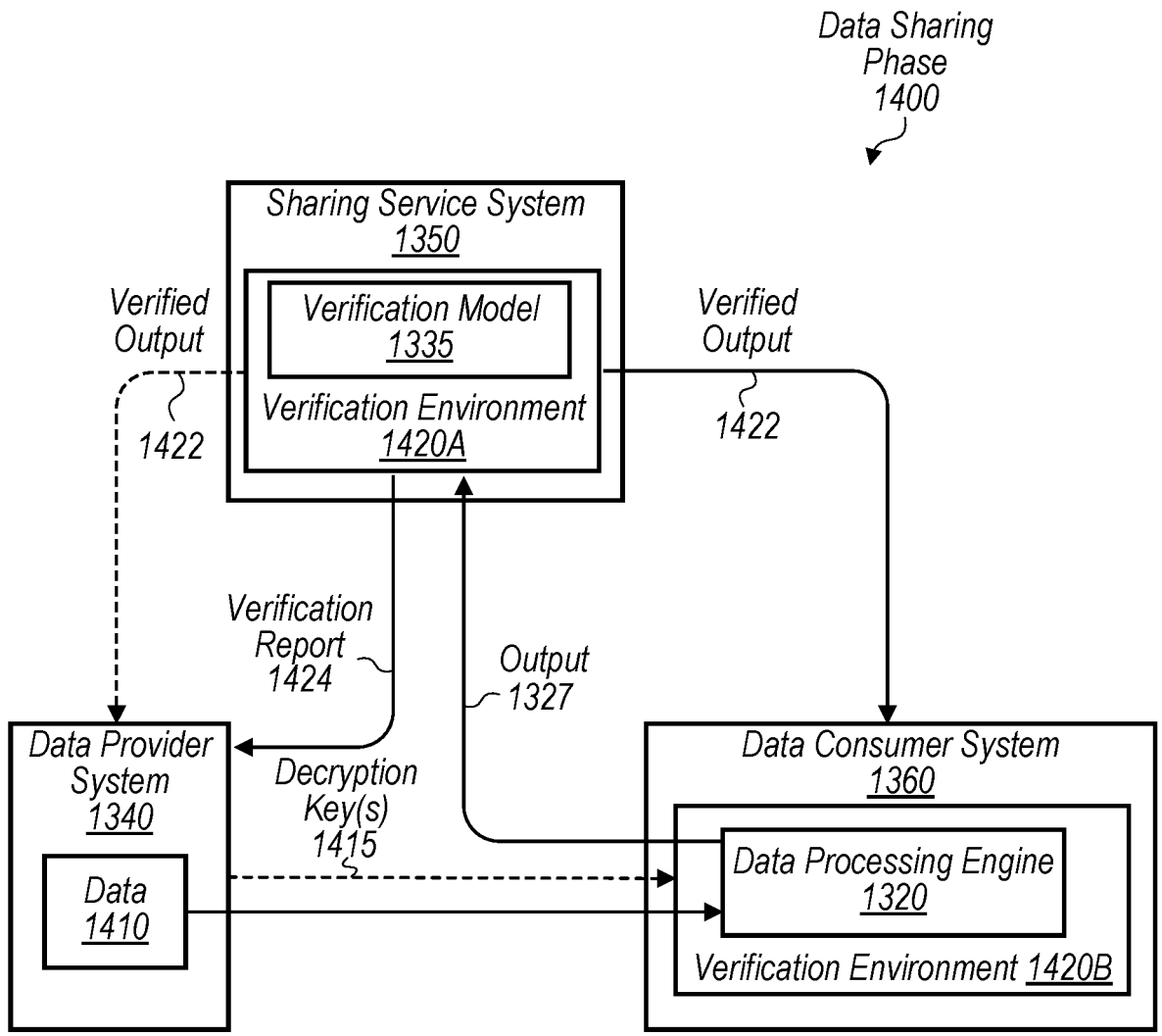

Turning now to FIG. 14C, a block diagram of various components of a data sharing phase 1400 is shown. FIG. 14C illustrates another example layout of the various components discussed within the present disclosure. In the illustrated embodiment, data sharing phase 1400 includes a data provider system 1340 and a data consumer system 1360. As illustrated, each of systems 1340 and 1360 includes a respective data store 111 and a respective secured gateway 1450. Also as depicted, data consumer system 1360 includes a compute cluster 1430 that includes a verification environment 1420 having a data processing engine 1320 and a verification model 1335. In some embodiments, data sharing phase 1400 may be implemented differently than shown, an example of which is discussed with respect to FIG. 14D.

When beginning data sharing phase 1400, in various embodiments, data provider system 1340 initially submits data blocks 1445 of data 1410 to secured gateway 1450A (which, as discussed earlier, may be software routines downloaded from a sharing service system). One data block 1445 may correspond to a specific number of bytes of physical storage on a storage device such as a hard disk drive. For example, each data block 1445 may be 2 kilobytes in size. A file may, in some cases, comprise multiple data blocks 1445. Accordingly, when sharing a given file with data consumer system 1360 for processing, data provider system 1340 may submit multiple data blocks 1445 to secured gateway 1450A. Secured gateway 1450A, in various embodiments, encrypts data blocks 1445 and then stores them at data store 111A. Secured gateway 1450A may create, for each data block 1445, a decryption key 1415 that is usable to decrypt the corresponding data block 1445, such keys 1415 may be sent to data consumer system 1360 during a later stage of data sharing phase 1400.

After the relevant data blocks 1445 have been encrypted, data provider system 1340 may send those data blocks to data consumer system 1360, which may then store them at data store 111B for subsequent retrieval. As mentioned earlier, data provider system 1340 may build DDN data structures that identify the locations of where particular types of data (e.g., user financial information) are stored within data provider system 1340. DDN data structures may, in various embodiments, store information about the history of how data is used. Accordingly, when data blocks 1445 are accessed by secured gateway 1450A and sent to data consumer system 1360, these events may be recorded in the relevant DDN data structure and may be reviewed by a user. In various cases, while data is being shared with data consumer system 1360, a DDN data structure may include policies that allow for that data to be shared. But if the data provider or a user of that data decides to not provide that data to data consumer system 1360, then the policies in the DDN data structure may be removed. Accordingly, in some embodiments, if there is an attempt to send that data to data consumer system 1360, enforcers that implement the DDN data structure will prevent that data from being sent to data consumer system 1360 (as sending that data may be considered abnormal behavior, which is explained above).

Once data consumer system 1360 has begun to receive data blocks 1445, data consumer system 1360 may submit a request to secured gateway 1450B for initiating execution of algorithm 1325. Accordingly, in various embodiments, secured gateway 1450B submits a request (depicted as "Start Algorithm Execution") to compute cluster 1430 to instantiate verification environment 1420, which (as discussed earlier) may serve as a sandbox (or other type of virtual environment) in which data processing engine 1320 (and thus algorithm 1325) is executed.

As explained above, verification environment 1420 may provide a file access application programming interface (API) that enables algorithm 1325 to access data blocks 1445 by invoking the API. In response to receiving a request from algorithm 1325 for accessing a set of data blocks 1445, verification environment 1420 may retrieve encrypted data blocks 1445 from data store 111B and may issue a key request to secured gateway 1450B for the respective decryption keys 1415 that are usable for decrypting those data blocks. In various cases, verification environment 1420 may be limited on the number of decryption keys 1415 that it may retrieve, at a given point, from secured gateway 1450B. This limit may be imposed by data provider system 1340 to control data consumer system 1360's access to data blocks 1445. As an example, in some embodiments, secured gateway 1450A may provide only one decryption key 1415 to secured gateway 1450B before secured gateway 1450B has to provide back a verification report 1424 in order to receive another decryption key 1415. By sending a limited number of decryption keys 1415 at a time to data consumer system 1360, data provider system 1340 may control data consumer system 1360's access to data blocks 1445 so that if a problem occurs (e.g., data consumer system 1360 violates a data usage policy defined in sharing information 1355), then data provider system 1340 may protect the rest of data blocks 1445 (which may be stored in data store 111B) by not allowing them to be decrypted. That is, data provider system 1340 may not initially grant data consumer system 1360 access to all the relevant encrypted data blocks 1445, but instead may incrementally provide access (e.g., by incrementally supplying decryption keys 1415) while the data consumer is compliant the data usage policies set out in sharing information 1355. Once a decryption key 1415 has been received from secured gateway 1450B, verification environment 1420 may decrypt the respective data block 1445 and provide that data block to algorithm 1325. Algorithm 1325 may then process that decrypted data block (as if it were directly loaded from a data storage).

After processing one or more data blocks 1445, algorithm 1325 may attempt to write the output to a location outside of verification environment 1420. Accordingly, algorithm 1325 may invoke an API of verification environment 1420 to write the output to the location. At that point, in various embodiments, verification environment 1420 verifies whether the output is compliant based on verification model 1335. For example, verification environment 1420 may determine if the output corresponds to an expected output derived by inputting the one or more data blocks 1445 into verification model 1335. If compliant, then verified output 1422 may be stored in a data storage (e.g., data store 111B) of data consumer system 1360. In some embodiments, output from algorithm 1325 may be encrypted (e.g., by secured gateway 1450B) and provided to data provider system 1340 for examination. Upon passing the examination, verified output 1422 may be provided back to data consumer system 1360 and stored in a decrypted format. Subsequently, algorithm 1325 may request additional data blocks 1445, which may be provided if data consumer system 1360 has not exhibited abnormal behavior. That is, data provider system 1340 may not provide additional decryption keys 1415 to enable additional data blocks 1445 to be processed if abnormal behavior is detected.

During data sharing phase 1400, verification environment 1420 may monitor the behavior of data consumer system 1360. If abnormal behavior (which may include invalid output, disk or network I/O operations that are not allowed by the data usage policies, etc.) is detected, such abnormal behavior may be reported to data provider system 1340 in verification report 1424. For example, based on verification model 1335, verification environment 1420 (or, in some instances, secured gateway 1450B) may determine that the execution flow of algorithm 1325 has deviated enough from the execution flow observed during setup phase 1300—that is, the directed acyclic graphs generated for algorithm 1325 during the data sharing phase 1400 deviate in a significant enough manner from those generated for algorithm 1325 during the setup phase 1300. This type of irregularity may be reported in a verification report 1424 that is sent to data provider system 1340. Verification report 1424 may, in some cases, be sent to data provider system 1340 in response to verifying an output from algorithm 1325. If data provider system 1340 determines, based on a verification report 1424, that abnormal behavior has occurred at data consumer system 1360, then data provider system 1340 may stop providing decryption keys 1415 to data consumer system 1360—stopping data consumer system 1360 from processing subsequent data blocks 1445. Otherwise, if no abnormal behavior has been detected, then data provider system 1340 may send subsequent decryption keys 1415 to data consumer system 1360 to enable subsequent data blocks 1445 to be processed. In some embodiments, verification environment 1420 may terminate data processing engine 1320 if abnormal behavior is detected and/or reject requests for subsequent data blocks 1445.

In some embodiments, the information provided in a verification report 1424 is recorded in the DDN data structure that corresponds to the data that was sent to data consumer system 1360. This information may become a part of the history of how that data is used. Accordingly, a user may be able to track the progress of how the data is currently being used by reviewing the history information in the DDN data structure.

Data sharing phase 1400, in some embodiments, may involve data consumer system 1360 processing data 1410, but not having access to verified output 1422. That is, the data provider, in some instances, may wish to use the data consumer's algorithm 1325 without exposing data 1410 to the data consumer. Accordingly, verified output 1422 may be encrypted (e.g., using keys 1415 that were used to decrypt data blocks 1445 for processing) and sent back to data provider system 1360.

Turning now to FIG. 14D, a block diagram of various components of a data sharing phase 1400 is shown. FIG. 14D illustrates another example layout of the various components discussed within the present disclosure. In the illustrated embodiment, data sharing phase 1400 includes a data provider system 1340, a sharing service system 1350, and a data consumer system 1360. As illustrated, data provider system 1340 includes data 1410; sharing service system 1350 includes a verification environment 1420A having a verification model 1335; and data consumer system 1360 includes a verification environment 1420B having data processing engine 1320.

In some embodiments, instead of output 1327 from algorithm 1325 being verified at data consumer system 1360, output 1327 may be sent to sharing service system 1350 for verification by verification environment 1420A. As an example, in some cases, when data processing engine 1320 attempts to write output 1327 from algorithm 1325 to a location that is outside of verification environment 1420B, then verification environment 1420B may send an encrypted version of that output to verification environment 1420A. Verification environment 1420A may then determine whether output 1327 is compliant using verification model 1335. If that output is compliant, then verification environment 1420A may send verified output 1422 to data consumer system 1360 and may send verification report 1424 to data provider system 1340 so that system 1340 may provide subsequent decryption keys 1415 to data consumer system 1360. If the output is not compliant, then verification environment 1420A may send verification report 1424 to data provider system 1340 so that system 1340 may not provide subsequent decryption keys 1415 and output 1327 may be discarded.

Figure 15:
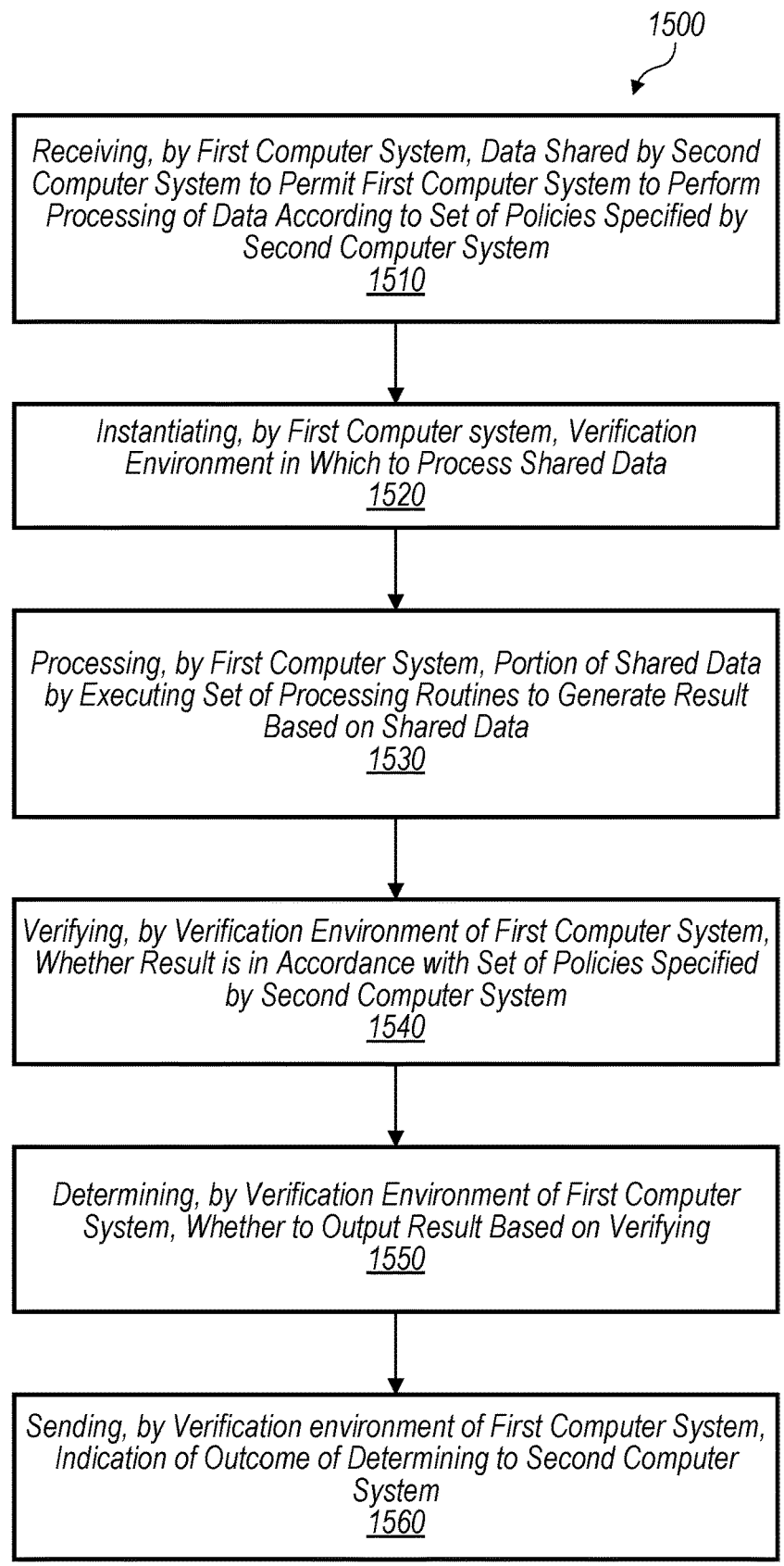
FIGS. 15 and 16 are flow diagrams illustrating example methods relating to the processing of shared data, according to some embodiments.

Turning now to FIG. 15, a flow diagram of a method 1500 is shown. Method 1500 is one embodiment of a method performed by a first computer system such as data consumer system 1360 to process data shared by a second computer system such as data provider system 1340. In some embodiments, method 1500 may include additional steps. For example, the first computer system may receive, from a third computer system (e.g., sharing service system 1350), a set of program instructions (e.g., program instructions that implement secured gateway 1450) that are executable to instantiate a verification environment (e.g., verification environment 1420) in which to process shared data.

Method 1500 begins in step 1510 with the first computer system receiving data (e.g., data 1410, which may be received as data blocks 1445) shared by a second computer system to permit the first computer system to perform processing of the data according to a set of policies (e.g., policies of sharing information 1355) specified by the second computer system. The shared data may be received in an encrypted format.

In step 1520, the first computer system instantiates a verification environment in which to process the shared data.

In step 1530, the first computer system processes a portion of the shared data (e.g., a set of data blocks 1445) by executing a set of processing routines (e.g., algorithm 1325) to generate a result (e.g., output 1327) based on the shared data. In some embodiments, processing a portion of the shared data includes requesting, from the verification environment by one of the set of processing routines, a set of data blocks included in the shared data and accessing, by the verification environment, a set of decryption keys (e.g., decryption keys 1415) from the second computer system for decrypting the set of data blocks. Processing a portion of the shared data may also include generating, by the verification environment using the set of decryption keys, decrypted versions of the set of data blocks and processing, by ones of the set of processing routines, the decrypted versions within the verification environment.

In step 1540, the verification environment of the first computer system verifies whether the result is in accordance with the set of policies specified by the second computer system. In various embodiments, the verification environment of the first computer system may determine whether the set of processing routines have exhibited abnormal behavior according to the set of policies specified by the second computer system. Such abnormal behavior may include a given one of the set of processing routines performing an input/output-based operation that is not permitted by the set of policies specified by the second computer system. In some instances, in response to determining that the set of processing routines exhibited abnormal behavior, the verification environment may terminate the set of processing routines. In some instances, in response to determining that the set of processing routines have exhibited abnormal behavior, the verification environment may reject subsequent requests by the set of processing routines for data blocks included in the shared data.

In step 1550, the verification environment of the first computer system determines whether to output (e.g., as verified output 1422) the result based on the verifying.

In step 1560, the verification environment of the first computer system sends an indication (e.g., verification report 1424) of an outcome of the determining to the second computer system. The indication may be usable by the second computer system to determine whether to provide the first computer system with continued access to the shared data (e.g., to determine whether to provide subsequent decryption keys 1415).

In various embodiments, the first computer system receives an initial set of data (e.g., data samples 1310) that is shared by the second computer system. The first computer system may process the initial set of data by executing the set of processing routines to generate a particular result that is based on the initial set of data. The particular result may be usable to derive a verification model (e.g., verification model 1335) for verifying whether a given result generated based on the data shared by the second computer system is in accordance with the set of policies specified by the second computer system. The first computer system may provide the particular result to a third computer system, which may be is configured to derive a particular verification model based on the set of initial data, the particular result, and the set of policies. The first computer system may then receive, from the third computer system, the particular verification model. Accordingly, verifying whether the result is in accordance with the set of policies may include determining whether the result corresponds to an acceptable result that is indicated by the particular verification model based on the portion of the shared data.

Figure 16:
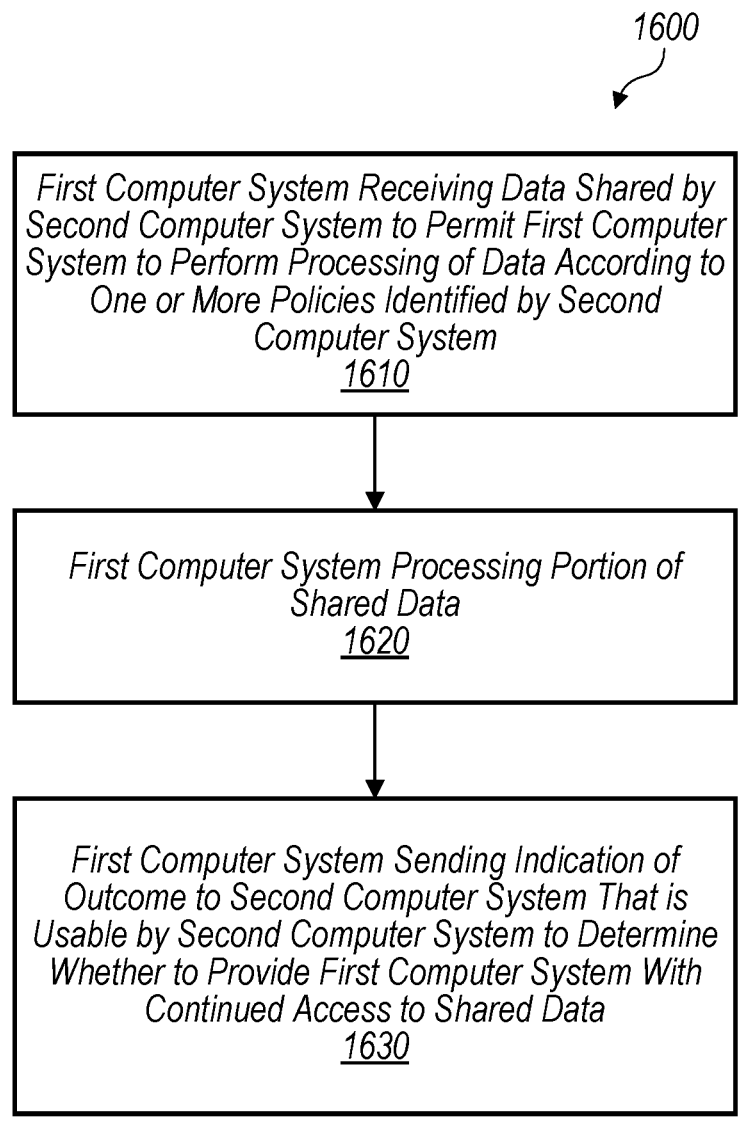

Turning now to FIG. 16, a flow diagram of a method 1600 is shown. Method 1600 is one embodiment of a method performed by a first computer system such as data consumer system 1360 to process data shared by a second computer system such as data provider system 1340. In some embodiments, method 1600 may be performed by executing a set of program instructions stored on a non-transitory computer-readable medium. In some embodiments, method 300 may include additional steps. For example, the data shared by the second computer system may be in an encrypted format and thus first computer system may receive, from the second computer system, a set of decryption keys (e.g., decryption keys 1415) usable to decrypt a portion of the shared data.

Method 1600 begins in step 1610 with the first computer system receiving data (e.g., data 1410) shared by a second computer system to permit the first computer system to perform processing of the data according to one or more policies identified by the second computer system.

In step 1620, the first computer system processes a portion of the shared data. In various embodiments, processing the portion includes instantiating a verification environment (e.g., verification environment 1420) in which to process the portion of the shared data and causing execution of a set of processing routines (e.g., algorithm 1325) in the verification environment to generate a result (e.g., output 1327) based on the shared data. Processing the portion may also include verifying whether the result is in accordance with the one or more policies and determining whether to enable the result to be written outside the verification environment based on the verifying. In some embodiments, verifying whether the result is in accordance with the one or more policies may include verifying the result based on one or more machine learning-based models (e.g., verification model 1335) trained based on the one or more policies and previous output (e.g., output 1327 based on data samples 1310) from the set of processing routines.

In step 1630, the first computer system sends an indication (e.g., verification report 1424) of an outcome of the determining to the second computer system. The indication may be usable by the second computer system to determine whether to provide the first computer system with continued access to the shared data. In some cases, the indication may indicate a determination to enable the result to be written outside the verification environment.

In some embodiments, the first computer system monitors the first computer system for behavior that deviates from behavior indicated by the one or more policies. In response to detecting that the first computer system has exhibited behavior that deviates from behavior indicated by the one or more policies, the first computer system may prevent the set of processing routines from processing subsequent portions of the shared data.

Figure 17:
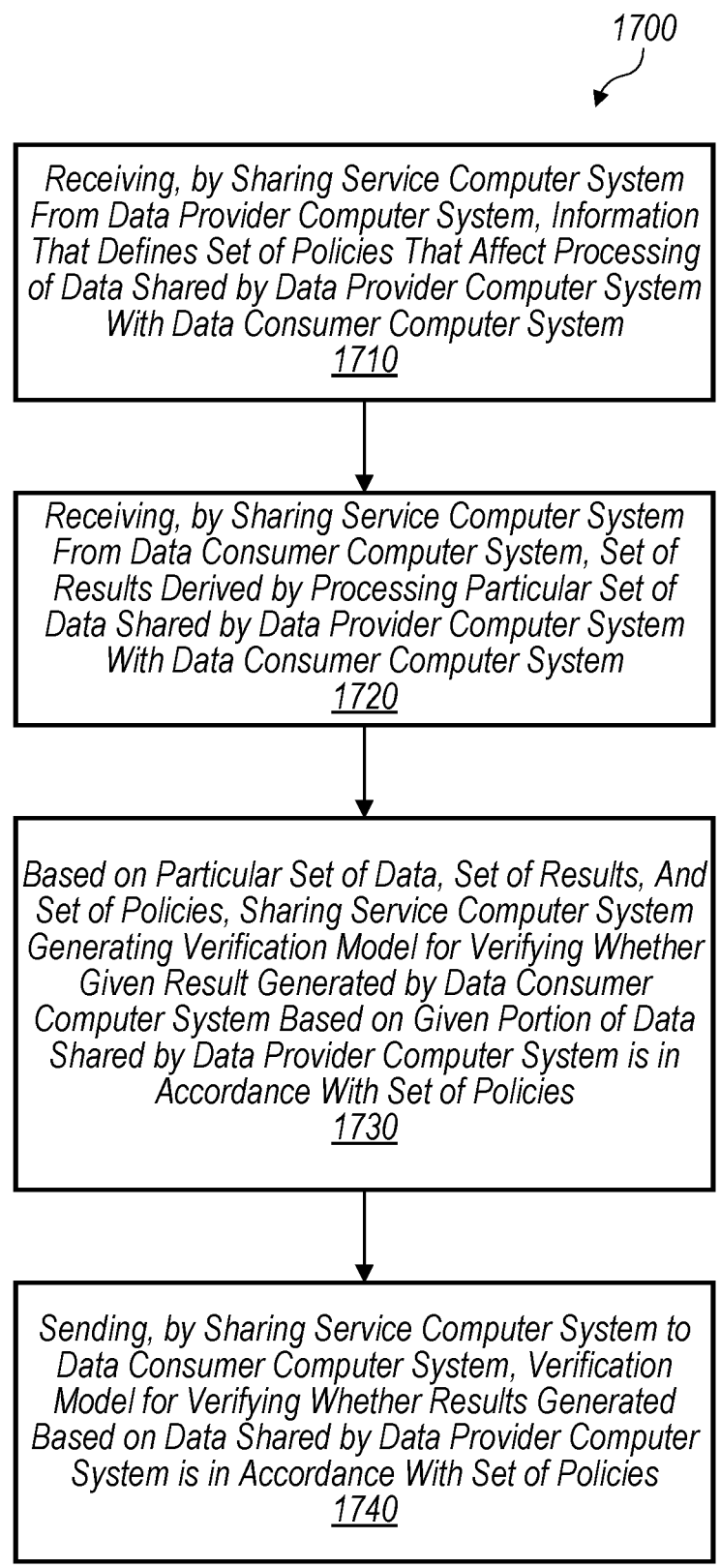
FIG. 17 is a flow diagram illustrating an example method relating to providing a verification model for verifying output, according to some embodiments.

Turning now to FIG. 17, a flow diagram of a method 500 is shown. Method 500 is one embodiment of a method performed by a sharing service computer system (e.g., sharing service system 1350) to provide a verification model (e.g., verification model 1335) usable to verify output from a data consumer computer system (e.g., data consumer system 1360). In some embodiments, method 500 may include additional steps. For example, the sharing service computer system may send sharing information (e.g., sharing information 1355) to the data consumer computer system and a data provider computer system (e.g., data provider system 1340).

Method 500 begins in step 1710 with the sharing service computer system receiving, from the data provider computer system, information that defines a set of policies that affect processing of data (e.g., data 1410) that is shared by the data provider computer system with the data consumer computer system.

In step 1720, the sharing service computer system receives, from the data consumer computer system, a set of results (e.g., output 1327) derived by processing a particular set of data (e.g., data samples 1310) shared by the data provider computer system with the data consumer computer system. In some embodiments, the particular set of data is shared by the data provider computer system with the data consumer computer system via the sharing service computer system. Accordingly, the sharing service computer system may receive, from the data provider computer system, the particular set of data and may send, to the data consumer computer system, the particular set of data for deriving the set of results.

In step 1730, based on the particular set of data, the set of results, and the set of policies, the sharing service computer system generates a verification model for verifying whether a given result generated by the data consumer computer system based on a given portion of data shared by the data provider computer system is in accordance with the set of policies.

In step 1740, the sharing service computer system sends, to the data consumer computer system, the verification model for verifying whether results generated based on data shared by the data provider computer system is in accordance with the set of policies. The sharing service computer system, in some embodiments, sends, to the data consumer computer system, a set of program instructions that are executable to instantiate a verification environment in which to process data shared by the data provider computer system with the data consumer computer system. The verification environment may be operable to prevent results generated based on data shared by the data provider computer system that are not in accordance with the set of policies from being sent outside of the verification environment. The verification environment may also be operable to monitor the data consumer computer system for abnormal behavior and to provide an indication (e.g., verification report 1424) to the data provider computer system of abnormal behavior detected at the data consumer computer system.

Figure 18:
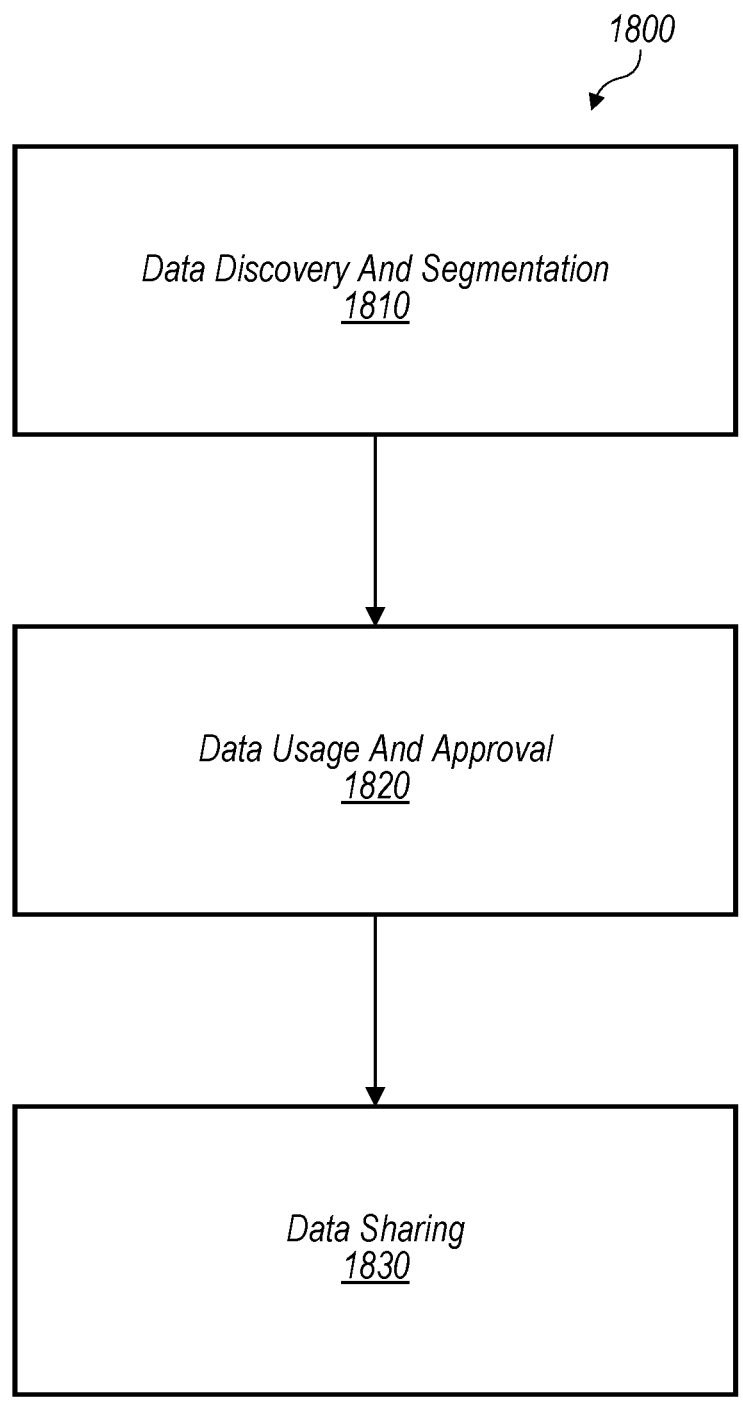
FIG. 18 is a block diagram illustrating example elements of a method flow that involves data management, according to some embodiments.

Turning now to FIG. 18, a block diagram of a method flow 1800 is shown. In the illustrated embodiment, method flow 1800 includes data discovery and segmentation stage 1810, data usage and approval stage 1820, and data sharing stage 1830. In some embodiments, method flow 1800 may be implemented differently than depicted. For example, method flow 1800 may include a behavior learning stage that may occur at a data provider system.

Method flow 1800, in various embodiments, is a series of stages implemented to enable a data provider system to identify data managed by the data provider system and to enable the use of the data (e.g., by sharing with a data consumer system) in accordance with authorizations obtained from users of that data. As explained further below, method flow 1800 may enable the data provider to comply with data ownership and privacy regulations (such as the European Union's General Data Protection Regulation 2016/679 (GDPR)) by facilitating an environment in which users may control the usage of their data.

In various embodiments, method flow 1800 starts with data discovery and segmentation stage 1810. As explained in greater detail with respect to FIGS. 1-12, a user's data may often be scattered around different layers of a network with poor structuring and visibility. The user data may take many forms, including personally identifiable information (PII) of the user, medical or financial data of the user, data stored by a social media website such as FACEBOOK, TWITTER, LINKEDIN, or INSTAGRAM, etc. Personal user information may be stored in structured formats (e.g., stored in database tables) or unstructured formats (e.g., stored in PDFs, WORD documents, etc.) across different storage devices. Thus, in many cases, data providers lack an understanding of the different types of data (e.g., medical data, financial data, etc.) that they have and where that data is stored. Various techniques are discussed with respect to FIGS. 1-12 for discovering what data is stored at a data provider system and for segmenting that data into different data segmentations that may be used to protect the data within those data segmentations. Some of the techniques will be briefly discussed here, but a fuller description is provided with respect to FIGS. 1-12.

As explained with respect to FIGS. 1-12, similarity detection and machine learning techniques may be used to identify data objects (e.g., files such as PDFs, WORD documents, etc.) having similar data content (e.g., similar data fields). In various embodiments, a user associated with a data provider system provides or identifies samples of data objects that serve as a basis for discovering similar data managed by the data provider system. For example, a user may be presented with an interface through which the user may specify samples of user personal data (e.g., by identifying locations of data objects that store user personal data). Various techniques may be used to identify other data objects having the same or similar content. Such techniques may include using a piecewise hashing technique to compare hash values between data objects (where similar hash values may indicate that data objects have similar content) and/or training content classification models based on content features of data objects in order for the models to be able to identify other data objects with the same or similar content features.

As part of the data discovery process, the network traffic of a data provider system may be evaluated to extract data objects and to identify whether the data objects are similar to other data objects (e.g., by using the techniques mentioned above) that have been classified. In some embodiments, when similar data objects are discovered, the locations where those data objects originated from may be evaluated to determine if there are other similar data objects. As such, locations that were previously unknown by the data provider to store relevant data objects may be discovered and revealed to the data provider. In some embodiments, the data managers that monitor network traffic may include network scanners that may be used to scan the data stores throughout the data provider system for relevant data objects.

During data discovery and segmentation stage 1810, data-defined network (DDN) data structures may be generated that incorporate multiple dimensions of relevant data attributes to logically group data objects that have similar content. As noted with respect to FIGS. 1-12, a DDN data structure indicates a set of data that matches some similarity criteria (in this particular context, that set of data might be all data of a particular user on a data provider's computer systems, although a DDN data structure may be created for each type of data that is associated with that particular user), along with indicating content features such as data fields and values, as well as a set of behaviors (uses) that are permitted for that data. For example, a DDN data structure may identify a protection policy indicating that the associated data objects can be accessed by only certain applications or systems. The use of the DDN paradigm may facilitate enforcement of the protection policy by pushing the DDN data structure (or portions of it such as the policy) to data managers that enforce the policy on data objects extracted from network traffic belonging to the DDN data structure associated with the policy. For example, if a data object is being sent to a prohibited application, then it may be dropped from the network traffic by a data manager. By dropping data objects from network traffic that deviate from the protection policies, a data segmentation may effectively be built around data associated with a user. Such a data segmentation may protect data objects from, for example, malicious use, unintentional misuse, or uses that deviate from management policies such as those defined by corporations or governmental entities.

In some applications described with respect to FIGS. 1-12, the data discovery stage 1810 may seek to understand typical uses of data within a computer network in order to populate the behavioral portion of a DDN data structure. But in method 1800, the behavioral portions of a various DDN data structure may be defined with a desired set of behaviors or protection. Thus, after a user's personal data is discovered, a DDN data structure for that user may be populated with a set of behaviors that are desired for that user's data. For example, a DDN data structure for that user may be defined to comply with governmental regulations such as GDPR. As will be described below, a user may be presented with a number of different proposed data usage proposals, each of which may be set up to correspond to a different DDN data structure that may be defined for that user. The user may accept or reject various ones of these data usage proposals and as a result, protection policies may be created that restrict or allow for the flow of particular data objects associated with the user to data consumer systems and/or within the data provider system. Data discovery, DDN data structures, policies, and data segmentation are discussed in greater detail with respect to FIGS. 1-12.

In the data usage and approval stage 1820, users may be presented with the data that the data provider system stores for that user. For example, a user may be presented with their own personal data, which may include, but is not limited to, contact data, geolocation data, various application usage data, browsing data, call data, etc. The user may, in some cases, select the various data items to acquire further transparency into the discovered and collected data. In various embodiments, the one or more DDN data structures created for a particular user may be used in determining what data is stored for that user and can presented to the user upon request.

In some instances, particular data may be erroneously associated with a particular user when discovered or that data may be inconsistent. For example, two files may be discovered where one of them indicates that the particular user is a male while the other indicates that the user is a female. Accordingly, in various embodiments, a user or data subject may be presented with a user interface that allows for the user to confirm the correctness or accuracy of data that is identified as belonging to that user. That user may correct any incorrect data associations or data inconsistencies. Continuing with the above example, the user may indicate that she is a female. In some cases, a user may not be able to view or accept data usage proposals (discussed below) until the user has reviewed the particular instances flagged by the data provider system as potentially being incorrect data associations or inconsistent. Corrections that the user makes to these data associations or inconsistencies may be used to further train the models used in the discovery stage 1810, to correct the appropriate DDN data structures, and/or to correct the data objects themselves.

In various embodiments, user may be presented with data usage proposals (or products) that define an arrangement in which particular data of the user may be used by the data provider or a data consumer to achieve a particular end. Such data usage proposals may define the types of data that will be used, how that data will be used, who will use that data, how long that data may be used for, who will be compensated for that data, what the compensation will be, how that data will be secured and shared with a data consumer (if applicable), and other information that may be used to assess whether to approve a data usage proposal. These data products can be considered analogous to financial products or instruments, with the definition of the data product being considered equivalent to the prospectus for a financial product. In some cases, the definition of a data product that specifies how a user's data will be used might constitute a binding legal document.

For example, a data usage proposal may be presented to a user indicating that the user's geolocation data will be shared with a telecommunication service provider and that the user will be compensated with a particular amount of money (e.g., $5 per month, for a period of one year). The compensation may be in different forms, which may include a financial credit, a service credit (e.g., a new feature associated with the telecommunications company), and/or a product credit (e.g., a new telecommunications device or accessory). A user may accept or reject certain data usage proposals that are presented to the user. As such, a user may have control over how their data is used. Once a user makes one or more choices during stage 1820, DDN data structures may be updated to define permissible data usages. This paradigm allows a user such as a telecommunications provider with millions of users to effectively segment user data, for example by creating a DDN data structure for each individual user, and allowing different usages for each individual user by tailoring the behavioral specifications of each of these numerous DDN data structures (based on particular users selecting different data products that are presented to them).

Stage 1820 may be accomplished through any suitable user interface. For example, the user interface may be presented to the user as part of their already-existing account login with the data provider. Alternately, a third-party website might be used to present the user with the various available data products. Note that the user assent for proposed data usages may be given in various forms, including paper signatures, biometric authorization, text message authorization, etc.

During data sharing stage 1830, data objects that were authorized by a user may thus be used according to the approved usages. Such usage may either be internal or external to the data provider. As explained with respect to FIGS. 13-17, data sharing may occur in two phases: a setup phase and a sharing phase. In some embodiments, during the setup phase, the data provider system provides samples of data to one or more data consumer systems. Such samples may correspond to the various types of data that were discovered during stage 1810. The data consumer system may process the samples (e.g., by executing algorithms as discussed with respect to FIGS. 13-17) to produce outputs. The samples, the outputs, and a set of policies (which were agreed to by the data provider and the data consumer) may be used to train a verification model that can be used to verify subsequent outputs by the data consumer system for compliance with the set of policies. In the context of method 1800, such policies will have previously presented to a user as part of a data usage proposal.

During the sharing phase, the data provider system may provide the data (indicated by a data usage proposal) to a data consumer system in an encrypted format. The data consumer system, in some embodiments, instantiates a verification environment in which to process the provided data using the data consumer's algorithms. While the data is within the verification environment, it may be in a decrypted format that can be processed to produce an output. The output may be verified by the verification environment using the verification model trained in the setup phase. The verification environment may also check the execution flow of the data consumer's algorithm to ensure that the execution flow is similar to what was observed in the setup phase. If the verification environment detects a prohibited output or abnormal behavior (e.g., a change to the execution flow of the consumer's algorithm, invalid input and/or output operations, etc.), the verification environment may notify the data provider system. In response to such a notification, the data provider system may stop providing decryption keys that are usable for decrypting the data, stopping the data consumer system from continuing processing of the provided data. In this manner, the data provider system may ensure that the user's data is protected in accordance with the data usage proposal that the user accepted. This process is described in detail with respect to FIGS. 13-17.

It is noted that in many instances, it is desirable for secure data sharing to have the following four characteristics: 1) data usage can be monitored and audited in real time across infrastructure both internally and externally; 2) data usage cannot be use for a non-specified purpose; 3) data cannot be copied and redistributed except as specified; and 4) data usage history will be automatically recorded in a manner that is tamper-proof (e.g., by writing to a blockchain ledger).

Figure 19:
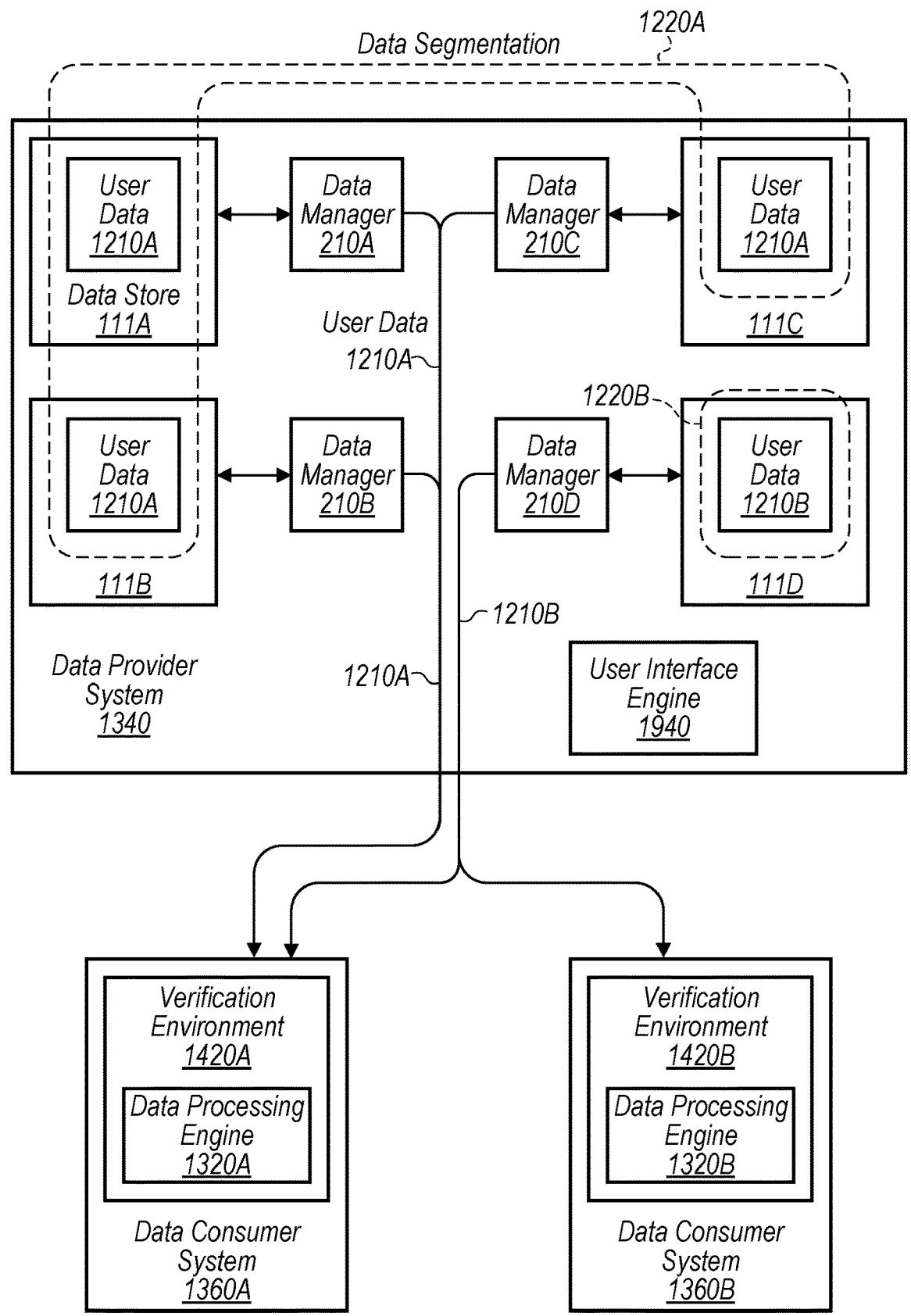
FIG. 19 is a block diagram illustrating example elements of a data provider system and a data consumer system, according to some embodiments.

Turning now to FIG. 19, a block diagram of an example architecture for implementing method 1800 is shown. In the illustrated embodiments, the architecture includes a data provider system 1340 and two data consumer systems 1360A and 1360B. As further shown, data provider system 1340 includes data stores 111A, 111B, and 111C that store user data 1210A and a data store 111D that stores user data 1210B. Data provider system 1340 also includes data managers 210A-D that manage access to data stores 111A-D, respectively. As shown, data segmentations 1220A and 1220B encompass user data 1210A and 1210B, respectively. As shown, data consumer system 1360A may include a verification environment 1420A having a data processing engine 1320A while data consume system 1360B may include a verification environment 1420B having a data processing engine 1320A. In some embodiments, the example architecture may be implemented differently than shown—e.g., the architecture may include a sharing service system that may provide at least a verification model.

As explained earlier, a data provider system may be evaluated to determine what user data is stored by that system. Data provider system 1340 may discover user data 1210A stored at data stores 111A, 111B, and 111C. Accordingly, a DDN data structure may be generated that identifies user data 1210A at those data stores 111. In a similar way, a DDN data structure may be generated that identifies user data 1210B at data store 111D. Users associated with the DDN data structures may be presented with data usage proposals in which data consumer systems 1360A and 1360B wish to process user data 1210A and 1210B.

User interface engine 1940, in various embodiments, generates user interfaces that may be presented to users.

Such user interfaces may include elements that display information about a user's data (e.g., user data 1210A) within data provider system 1340 and about proposed usages of that data. For example, one user interface may display what types of data that data provider system 1340 stores for a particular user. That user interface may allow a user to create policies around the user's data, including what systems may access and use that data. In various cases, user interface engine 1940 may generate user interfaces that present data usage proposals to users that may decide to accept or reject those proposals.

A user of user data 1210A may allow for data consumer system 1360A to process user data 1210A, but not allow for data consumer system 1360B to process that data. Accordingly, protection policies may be generated and sent to data managers 210A-C, which may permit user data 1210 to be sent to data consumer system 1360A, but data consumer system 1360B as shown in the illustrated embodiment. A user of user data 1210B, however, may allow for both data consumer systems 1360A and 1360B to process data 1210B.

Figure 20:
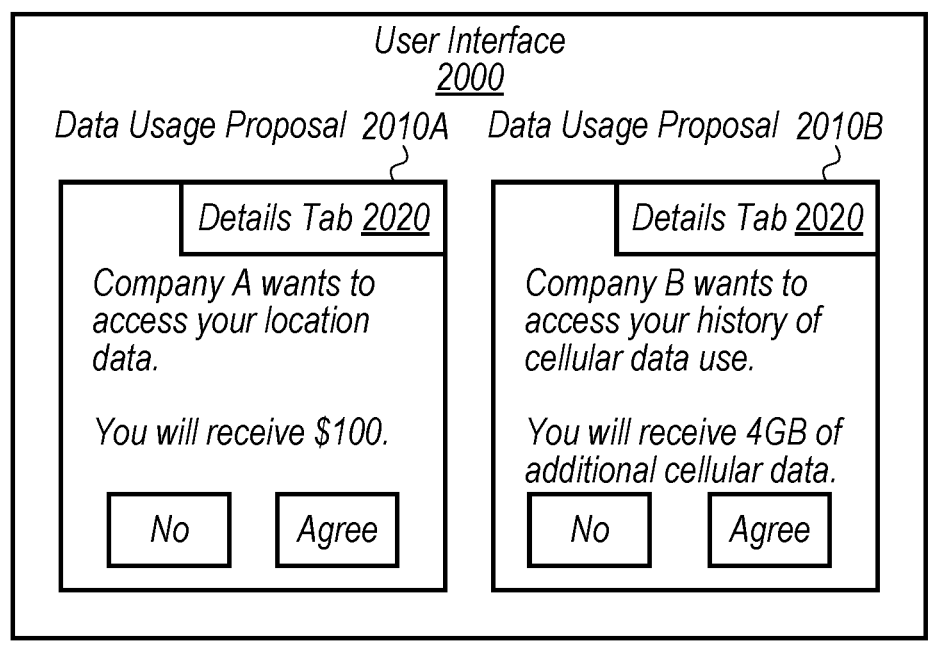
FIG. 20 is a block diagram illustrating example elements of a user interface that allows for users to control data usage, according to some embodiments.

Turning now to FIG. 20, a block diagram of an example user interface 2000 that displays data usage proposals is shown. In the illustrated embodiment, user interface 2000 includes data usage proposals 2010A and 2010B. As depicted, data usage proposal 2010A indicates that a data consumer (company A) wants to access particular data (location data) of the user and that the user will be financially compensated with $100. As further depicted, data usage proposal 2010B indicates that another data consumer (company B) wants to access another particular type of data (history of cellular data usage) of the user and that the user will be compensated with 4 GB of cellular data. The user may select, for each data usage proposal 2010, whether the user agrees or rejects the data usage proposal. The user may also select a detail tab 2020 on each data usage proposal 2010 in order to see details about the proposal. Such details may include those listed in the above description of data usage proposals—e.g., how the data will be used, how long the data will be used for, etc. In some cases, if a user rejects data usage proposal, a protection policy may be created prevents a particular data consumer from accessing the requested data. That protection policy may be included in the relevant DDN data structure and then distributed data managers throughout the data provider system to enforce the protection policy. In some cases, if the user accepts a data usage proposal, then a protection policy may be created that allows for particular data to be sent to a particular data consumer.

The paradigm of method 1800 has several benefits. Discovery stage 1810 allows entities to fully discover and encapsulate each individual user's data independent of location and infrastructure within their distributed networks. Approval stage 1820 allows users and data providers to clarify data ownership and permissible usages by creating legally binding contracts as specified by detailed data product prospectuses that are agreed to by the consumer. This creates greater transparency for the users as to the precise nature of the data stored by the data provider, as well as how (if at all) that data is legally permitted to be used. The usages agreed to in stage 1820 allow for the creation of various DDN data structures that are set up to have permissible behaviors that correspond to those usages agreed to in stage 1820. By precisely defining data and its permitted uses, this allows data providers and consumers to then use this data with confidence in stage 1830, as usage will be in accordance with data security considerations, any internal data usage policies, and any applicable governmental or third-party regulations.

This approach thus has the potential to stimulate a true data economy. Big Data currently exists, but such data is unfortunately used only for the benefit of a few select data providers, without any recompense for the individual users themselves. Current regulatory approaches have shifted this paradigm, and the methods described herein address this problem by providing an incentive to establish data identification, ownership, and agreed-upon data usage policies. Data can thus be sold or rented to third parties, with the proceeds going to the data owner, and possibly a portion going to the data provider. In the current approach, social media sites and the like have accumulated massive amounts of user data—right now, such data is being marketed to third parties without any financial benefit to the users themselves. Unfortunately, users will ultimately bear the costs of such sharing if there is ultimately a misuse or breach of this data. This paradigm helps ensure that when data is shared, there is a sound technical approach in place to make sure that the sharing is in accordance with agreed-upon data usage specifications. This method will thus help foster sharing of data when it is permitted, while ensuring that such sharing is in compliance with corporate or governmental regulations.

Figure 21:
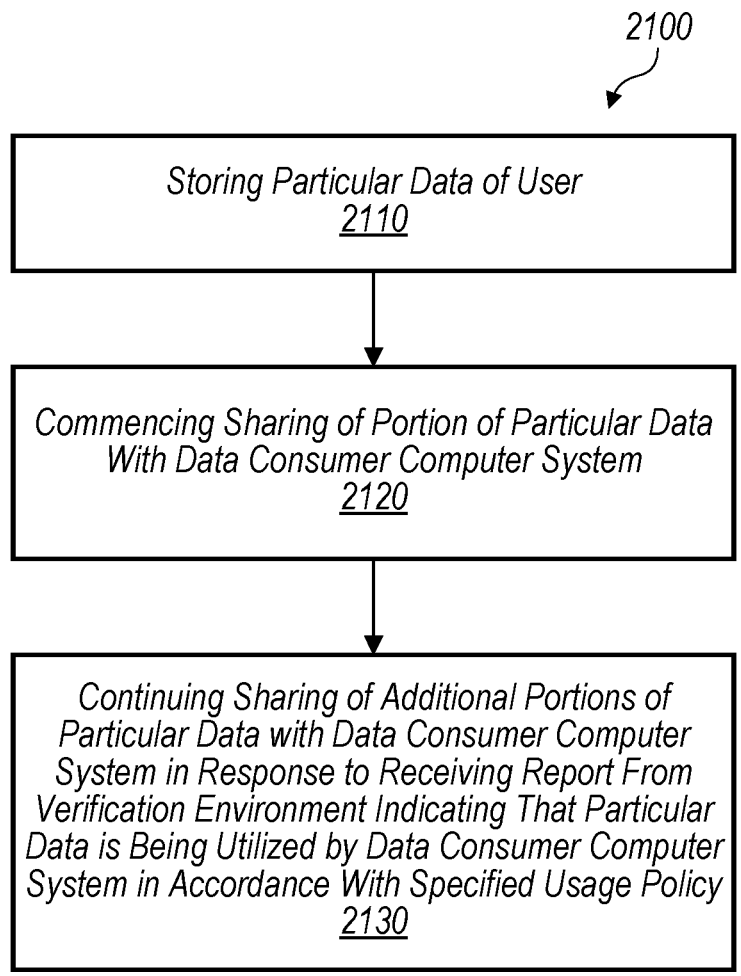
FIGS. 21 and 22 are block diagrams illustrating example methods relating to sharing user data with a data consumer system, according to some embodiments.

Turning now to FIG. 21, a flow diagram of a method 2100 is shown. Method 2100 is one embodiment of a method performed by a computer system (e.g., a data provider computer system 1340) to facilitate the sharing of user data according to a usage policy. Method 2100 may be performed by executing a set of program instructions stored on a non-transitory computer-readable medium. In some embodiments, method 2100 may include additional steps. For example, the computer system may present a user interface (e.g., a user interface 520) to a user for configuring different aspects (e.g., user-defined policies 350) of the computer system.

Method 2100 begins in step 2110 with the computer system storing particular data (e.g., user data 1210) of a user. The computer system may identify the particular data as corresponding to the user, including by evaluating one or more databases (e.g., data stores 111) to group data objects (e.g., data objects 335) based on content of those data objects satisfying a set of similarity criteria. A particular group of data objects may correspond to the particular data of the user. In some embodiments, the computer system generates a set of data-defined network (DDN) data structures (e.g., DDN data structures 225) that logically groups the data objects of the particular group independent of physical infrastructure via which those data objects are stored, communicated, or utilized.

In step 2120, the computer system commences sharing of a portion of the particular data with a data consumer computer system (e.g., data consumer system 1360). The set of data-defined network (DDN) data structures may construct a data segmentation (e.g., a data segmentation 1220) having the data objects of the particular group. The data segmentation may be associated with a set of usage policies (e.g., user-defined policies 350) defining permissible types of access to data objects within the data segmentation. In response to receiving permission to perform the sharing, the computer system may add a particular usage policy to the set of usage policies that permits portions of the particular data to be sent to the data consumer computer system. In response to being denied permission to continue sharing portions of the particular data, the computer system may add a particular usage policy to the set of usage policies that prevents portions of the particular data from being sent to the data consumer computer system.

In some embodiments, the computer system presents a user interface (e.g., a user interface 2000) indicating a proposed usage of the particular data by the data consumer computer system according to the specified usage policy. The computer system may receive, from the user via the user interface, permission for the data consumer computer system to utilize the particular data according to the specified usage policy and the commencing sharing may be performed based on receiving the permission.

In step 2130, the computer system continues sharing of additional portions of the particular data with the data consumer computer system in response to receiving a report (e.g., a verification report 1424) from a verification environment (e.g., a verification environment 1420) indicating that the particular data is being utilized by the data consumer computer system in accordance with a specified usage policy. The computer system may send, to the data consumer computer system, the additional portions of the particular data in an encrypted format. In some cases, continuing sharing of additional portions of the particular data may include: in response to receiving the report that indicates that the particular data is being utilized in accordance with the specified usage policy, the computer system sending, to the data consumer computer system, a set of decryption keys (e.g., decryption keys 1415) usable for decrypting the encrypted additional portions of the particular data. The computer system may receive a second report from the verification environment indicating that the particular data is not being utilized by the data consumer computer system in accordance with the specified usage policy. As such, the computer system may discontinue sharing of subsequent additional portions of the particular data with the data consumer computer system. The specified usage policy specifies a length of time that the particular data may be used by the data consumer computer system.

Figure 22:
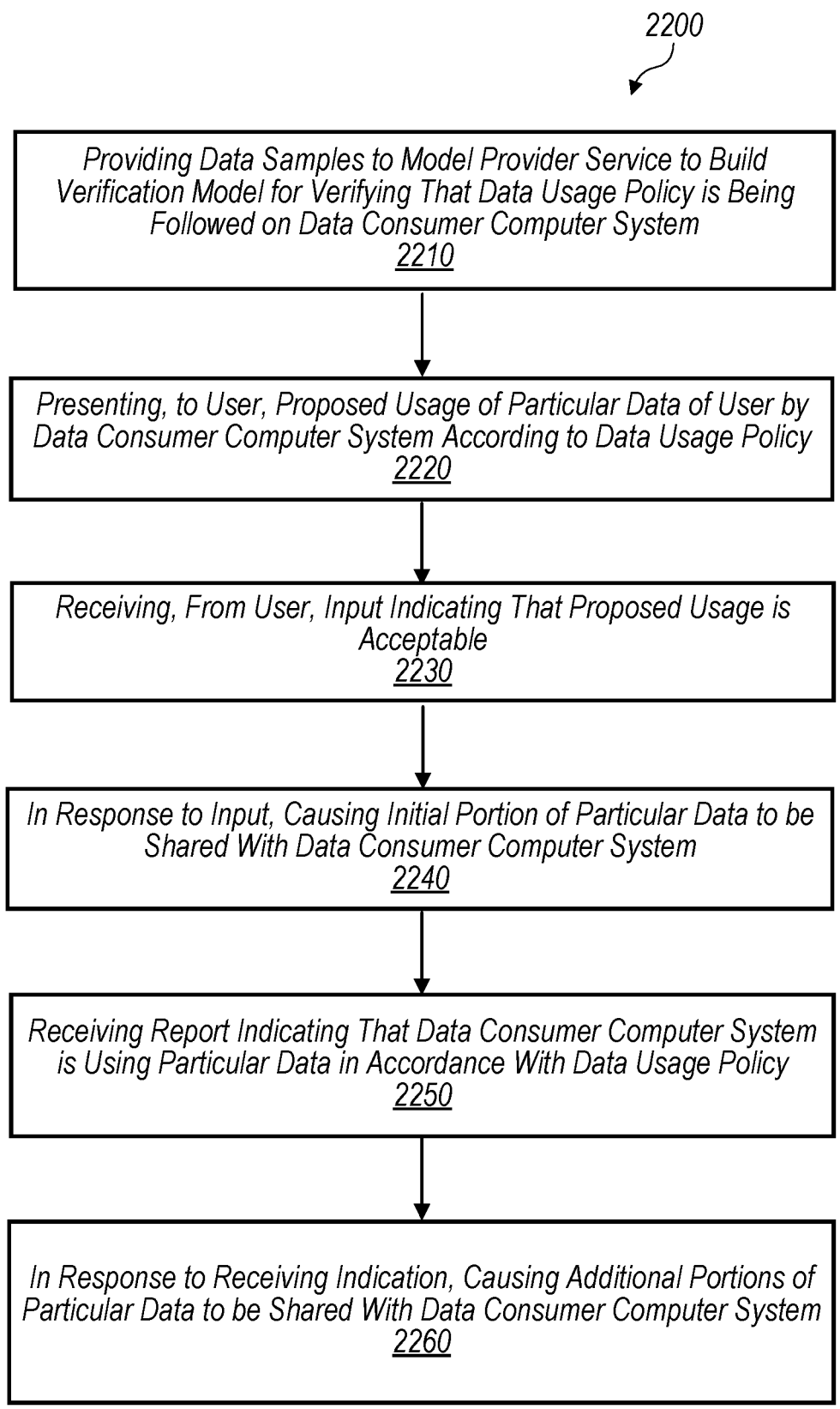

Turning now to FIG. 22, a flow diagram of a method 2200 is shown. Method 2200 is one embodiment of a method performed by a computer system (e.g., a data provider computer system 1340) to facilitate the sharing of user data according to a usage policy. Method 2200 begins in step 2210 with the computer system providing data samples (e.g., data samples 1310) to a model provider service (e.g., a sharing service system 1350) to build a verification model (e.g., a verification model 1335) for verifying that a data usage policy is being followed on a data consumer computer system (e.g., a data consumer system 1360). In step 2220, the computer system presents, to a user, a proposed usage (e.g., a data usage proposal 2010) of particular data (e.g., user data 1210) of the user by the data consumer computer system according to the data usage policy. In step 2230, the computer system receives, from the user, input indicating that the proposed usage is acceptable. In step 2240, in response to the input, the computer system causes an initial portion of the particular data (e.g., encrypted data blocks 1445) to be shared with the data consumer computer system. In step 2250, the computer system receives a report (e.g., verification report 1424) indicating that the data consumer computer system is using the particular data in accordance with the data usage policy. The report may be generated based on the verification model. In step 2260, in response to receiving the indication, causing additional portions of the particular data to be shared with the data consumer computer system.

Exemplary Computer System

Figure 23:
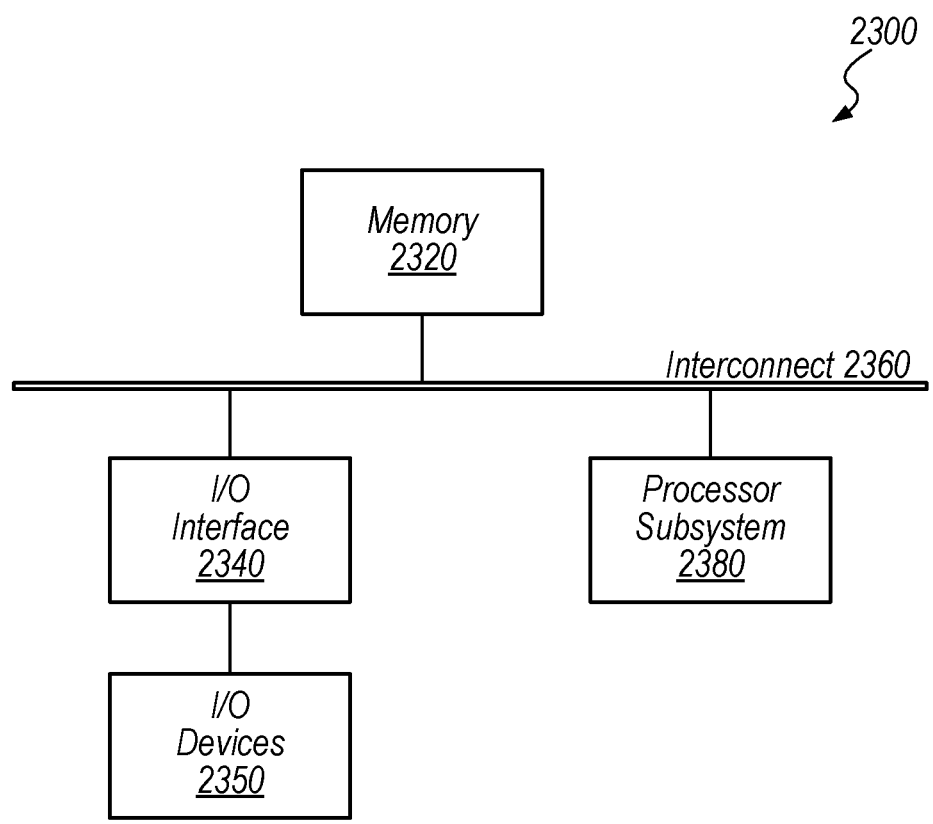
FIG. 23 is a block diagram illustrating an example computer system, according to some embodiments.

Turning now to FIG. 23, a block diagram of an exemplary computer system 2300, which may implement system 100, data provider system 1340, sharing service system 1350, and/or data consumer system 1360, is depicted. Computer system 2300 includes a processor subsystem 2380 that is coupled to a system memory 2320 and I/O interfaces(s) 2340 via an interconnect 2360 (e.g., a system bus). I/O interface(s) 2340 is coupled to one or more I/O devices 2350. Computer system 2300 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 2300 is shown in FIG. 23 for convenience, system 2300 may also be implemented as two or more computer systems operating together.

Processor subsystem 2380 may include one or more processors or processing units. In various embodiments of computer system 2300, multiple instances of processor subsystem 2380 may be coupled to interconnect 2360. In various embodiments, processor subsystem 2380 (or each processor unit within 2380) may contain a cache or other form of on-board memory.

System memory 2320 is usable store program instructions executable by processor subsystem 2380 to cause system 2300 perform various operations described herein. System memory 2320 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 2300 is not limited to primary storage such as memory 2320. Rather, computer system 2300 may also include other forms of storage such as cache memory in processor subsystem 2380 and secondary storage on I/O Devices 2350 (e.g., a hard drive, storage array, etc.). In some embodiments, these other forms of storage may also store program instructions executable by processor subsystem 2380. In some embodiments, program instructions that when executed implement data store 111, data manager 210, user interface engine 1940, verification environment 1420, and data processing engine 1320 may be included/stored within system memory 2320.

I/O interfaces 2340 may be any of various types of interfaces configured to couple to and communicate with other devices, according to various embodiments. In one embodiment, I/O interface 2340 is a bridge chip (e.g., Southbridge) from a front-side to one or more back-side buses. I/O interfaces 2340 may be coupled to one or more I/O devices 2350 via one or more corresponding buses or other interfaces. Examples of I/O devices 2350 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 2300 is coupled to a network via a network interface device 2350 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   storing, at a data provider computer system, particular data of a user;
   presenting, by the data provider computer system, a user interface indicating a proposed usage of the particular data by a data consumer computer system according to a specified usage policy;
   receiving, by the data provider computer system from the user via the user interface, permission for the data consumer computer system to utilize the particular data according to the specified usage policy;
   based on receiving the permission, commencing, by the data provider computer system, sharing of a portion of the particular data with the data consumer computer system; and
   continuing, by the data provider computer system, sharing of additional portions of the particular data with the data consumer computer system in response to receiving a report from a verification environment indicating that the particular data is being utilized by the data consumer computer system in accordance with the specified usage policy.

2. The method of claim 1, further comprising:
   sending, to the data consumer computer system by the data provider computer system, the additional portions of the particular data in an encrypted format,
   wherein continuing sharing of additional portions of the particular data includes:
      in response to receiving the report that indicates that the particular data is being utilized in accordance with the specified usage policy, the data provider computer system sending, to the data consumer computer system, a set of decryption keys usable for decrypting the encrypted additional portions of the particular data.

3. The method of claim 1, further comprising:
   receiving, by the data provider computer system, a second report from the verification environment indicating that the particular data is not being utilized by the data consumer computer system in accordance with the specified usage policy; and
   discontinuing, by the data provider computer system, sharing of subsequent additional portions of the particular data with the data consumer computer system.

4. The method of claim 1, further comprising:
   sending, to the data consumer computer system by the data provider computer system, a set of data samples that corresponds to the particular data, wherein the set of data samples is usable to derive an output, and wherein the set of data samples and the output are usable to train a verification model to identify whether the particular data is being utilized in accordance with the specified usage policy.

5. The method of claim 1, further comprising:
   identifying, by the data provider computer system, the particular data as corresponding to the user, wherein identifying the particular data as corresponding to the user includes:
      evaluating, by the data provider computer system, one or more databases to group data objects based on content of those data objects satisfying a set of similarity criteria, wherein a particular group of data objects corresponds to the particular data of the user.

6. The method of claim 5, further comprising:
   generating a set of data-defined network (DDN) data structures that logically groups the data objects of the particular group independent of physical infrastructure via which those data objects are stored, communicated, or utilized.

7. The method of claim 6, wherein the set of data-defined network (DDN) data structures constructs a data segmentation having the data objects of the particular group, wherein the data segmentation is associated with a set of usage policies defining permissible types of access to data objects within the data segmentation.

8. The method of claim 7, further comprising:
   in response to receiving permission to perform the sharing, adding a particular usage policy to the set of usage policies that permits portions of the particular data to be sent to the data consumer computer system.

9. The method of claim 7, further comprising:
   in response to being denied permission to continue sharing portions of the particular data, adding a particular usage policy to the set of usage policies that prevents portions of the particular data from being sent to the data consumer computer system.

10. The method of claim 1, wherein the specified usage policy specifies a length of time that the particular data may be used by the data consumer computer system.

11. A non-transitory computer-readable medium having program instructions stored thereon that are executable by a computer system to perform operations comprising:
    storing particular data of a user;
    presenting a user interface indicating a proposed usage of the particular data by a data consumer computer system according to a specified usage policy;
    receiving, from the user via the user interface, permission for the data consumer computer system to utilize the particular data according to the specified usage policy;
    based on receiving the permission, commencing sharing of a portion of the particular data with the data consumer computer system; and
    continuing sharing of additional portions of the particular data with the data consumer computer system in response to receiving a report from a verification environment indicating that the particular data is being utilized by the data consumer computer system in accordance with the specified usage policy.

12. The non-transitory computer-readable medium of claim 11, wherein the operations further comprise:
    evaluating one or more databases to group data objects based on content of those data objects satisfying a set of similarity criteria, wherein a particular group of data objects corresponds to the particular data.

13. The non-transitory computer-readable medium of claim 12, wherein the operations further comprise:
generating a set of data-defined network (DDN) data structures that logically groups the data objects of the particular group independent of physical infrastructure via which those data objects are stored, communicated, or utilized.

14. The non-transitory computer-readable medium of claim 13, wherein the set of data-defined network (DDN) data structures constructs a data segmentation having the data objects of the particular group, wherein the data segmentation is associated with a set of usage policies defining permissible types of access to data objects within the data segmentation.

15. The non-transitory computer-readable medium of claim 14, wherein the operations further comprise:
in response to receiving permission to perform the sharing, adding a particular usage policy to the set of usage policies that permits portions of the particular data to be sent to the data consumer computer system.

16. The non-transitory computer-readable medium of claim 11, wherein the operations further comprise:
using information in the report from the verification environment to update a ledger of a blockchain to record data usage history of the particular data by the data consumer computer system.

17. A method, comprising:
providing, by a data provider computer system, data samples to a model provider service to build a verification model for verifying that a data usage policy is being followed on a data consumer computer system;
presenting, by the data provider computer system to a user, a user interface indicating a proposed usage of particular data of the user by the data consumer computer system according to the data usage policy;
receiving, by the data provider computer system from the user via the user interface, permission for the data consumer computer system to utilize the particular data according to the data usage policy; and
based on receiving the permission, the data provider computer system:
causing an initial portion of the particular data to be shared with the data consumer computer system;
receiving a report indicating that the data consumer computer system is using the particular data in accordance with the data usage policy, wherein the report is generated based on the verification model; and
in response to receiving the indication, causing additional portions of the particular data to be shared with the data consumer computer system.

18. The method of claim 17, further comprising:
evaluating one or more databases to group data objects based on content of those data objects satisfying a set of similarity criteria, wherein a particular group of data objects corresponds to the particular data.

19. The method of claim 18, further comprising:
generating a set of data-defined network (DDN) data structures that logically groups the data objects of the particular group independent of physical infrastructure via which those data objects are stored, communicated, or utilized.

20. The method of claim 19, wherein the set of data-defined network (DDN) data structures constructs a data segmentation having the data objects of the particular group, wherein the data segmentation is associated with a set of usage policies defining permissible types of access to data objects within the data segmentation.

21. The method of claim 20, further comprising:
in response to receiving input indicating that the proposed usage is acceptable, adding a particular usage policy to the set of usage policies that permits portions of the particular data to be sent to the data consumer computer system.

* * * * *